US010419051B2

(12) United States Patent
Cho et al.

(10) Patent No.: US 10,419,051 B2
(45) Date of Patent: Sep. 17, 2019

(54) MOBILE COMMUNICATION SYSTEM, DIFFERENT MOBILE DEVICES SHARING SAME PHONE NUMBER ON MOBILE COMMUNICATION SYSTEM, AND METHOD OF PROVIDING MOBILE COMMUNICATION SERVICE BETWEEN DIFFERENT MOBILE DEVICES SHARING SAME PHONE NUMBER

(71) Applicant: SAMSUNG ELECTRONICS CO., LTD., Suwon-si (KR)

(72) Inventors: Shi-yun Cho, Anyang-si (KR); Moon-joo Lee, Suwon-si (KR); Hee-seok Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/812,541

(22) Filed: Jul. 29, 2015

(65) Prior Publication Data

US 2016/0036476 A1 Feb. 4, 2016

(30) Foreign Application Priority Data

Jul. 31, 2014 (KR) .................. 10-2014-0098585
Jun. 5, 2015 (KR) .................. 10-2015-0080030

(51) Int. Cl.
*H04M 1/00* (2006.01)
*H04B 1/38* (2015.01)
(Continued)

(52) U.S. Cl.
CPC ............ *H04B 1/3816* (2013.01); *H04W 4/50* (2018.02); *H04W 8/26* (2013.01); *H04W 8/183* (2013.01)

(58) Field of Classification Search
CPC ...... H04B 1/3816; H04W 4/001; H04W 8/26; H04W 8/183
(Continued)

(56) References Cited

U.S. PATENT DOCUMENTS 5,657,373 A  8/1997 Hermansson et al.
7,603,107 B2 10/2009 Ratert et al.
(Continued)

FOREIGN PATENT DOCUMENTS

CN  1356834 A  7/2002
CN  1864421 A  11/2006
(Continued)

OTHER PUBLICATIONS

Communication dated Apr. 6, 2016, issued by the European Patent Office in counterpart European Application No. 15178380.0.
(Continued)

*Primary Examiner* — Rafael Pérez-Gutiérrez
*Assistant Examiner* — Mark G. Pannell
(74) *Attorney, Agent, or Firm* — Sughrue Mion, PLLC

(57) ABSTRACT

A mobile device configured to share a phone number of another mobile device on a mobile communication system, the mobile device including: a controller configured to, after determining that a phone function of the another mobile device is deactivated, activate a phone function of the mobile device to which the phone number of the another mobile device is assigned; and a communicator configured to perform a mobile communication function using the phone number when the phone function of the mobile device is activated.

7 Claims, 66 Drawing Sheets

(51) Int. Cl.
*H04M 1/66* (2006.01)
*H04M 1/68* (2006.01)
*H04M 3/16* (2006.01)
*H04N 7/16* (2011.01)
*H04B 1/3816* (2015.01)
*H04W 4/50* (2018.01)
*H04W 8/26* (2009.01)
*H04W 8/18* (2009.01)

(58) Field of Classification Search
USPC ........................................................ 455/558
See application file for complete search history.

(56) References Cited

U.S. PATENT DOCUMENTS

| | | | |
|---|---|---|---|
| 9,426,644 B2 | 8/2016 | Zhao et al. | |
| 2001/0027117 A1* | 10/2001 | Alanara | H04W 8/26 455/551 |
| 2002/0072395 A1* | 6/2002 | Miramontes | H04M 1/0214 455/566 |
| 2002/0077129 A1 | 6/2002 | Kikuta et al. | |
| 2004/0196796 A1 | 10/2004 | Bajko et al. | |
| 2005/0220080 A1 | 10/2005 | Ronkainen et al. | |
| 2005/0255885 A1* | 11/2005 | Majewski | H04W 76/023 455/558 |
| 2006/0035631 A1* | 2/2006 | White | H04M 3/382 455/418 |
| 2006/0154659 A1* | 7/2006 | Roter | H04W 8/205 455/422.1 |
| 2006/0166695 A1* | 7/2006 | Morich | H04W 8/06 455/550.1 |
| 2007/0149178 A1* | 6/2007 | Thorson | H04W 8/265 455/414.1 |
| 2007/0153768 A1* | 7/2007 | Jagadesan | H04M 1/2535 370/352 |
| 2008/0102816 A1 | 5/2008 | Shan et al. | |
| 2008/0261561 A1* | 10/2008 | Gehrmann | H04W 8/205 455/411 |
| 2008/0287064 A1* | 11/2008 | Weiss | H04W 8/005 455/41.2 |
| 2009/0264070 A1* | 10/2009 | Lim | G06Q 30/0261 455/41.2 |
| 2011/0059738 A1 | 3/2011 | Waller | |
| 2013/0288750 A1* | 10/2013 | Itoh | H04L 12/2856 455/558 |
| 2014/0042873 A1 | 2/2014 | Shen et al. | |
| 2014/0055101 A1 | 2/2014 | Ferrario | |
| 2014/0065948 A1 | 3/2014 | Huang | |
| 2014/0134986 A1 | 5/2014 | Yasumoto | |
| 2015/0017950 A1* | 1/2015 | Zhao | H04W 12/04 455/411 |

FOREIGN PATENT DOCUMENTS

| | | |
|---|---|---|
| CN | 103380613 A | 10/2013 |
| CN | 103813314 A | 5/2014 |
| EP | 1465450 A2 | 10/2004 |
| EP | 1617694 A1 | 1/2006 |
| EP | 1449395 B1 | 6/2008 |
| EP | 2750472 A1 | 7/2014 |
| EP | 2919497 A1 | 9/2015 |
| JP | 2011-160599 A | 8/2011 |
| KR | 10-2013-0107426 A | 10/2013 |
| RU | 2005134227 A | 5/2007 |
| TW | 200603582 A | 1/2006 |
| WO | 2006079944 A2 | 8/2006 |
| WO | 2012163436 A1 | 12/2012 |
| WO | 2013093574 A1 | 6/2013 |
| WO | 2013097177 A1 | 7/2013 |

OTHER PUBLICATIONS

Communication dated Jan. 8, 2016, issued by the European Patent Office in counterpart European Application No. 15178380.0.
Communication dated Nov. 27, 2015, issued by the International Searching Authority in counterpart International Application No. PCT/KR2015/007785 (PCT/ISA/210 & PCT/ISA/237).
Communication dated Sep. 28, 2017, issued by the State Intellectual Property Office of the People's Republic of China in counterpart Chinese Patent Application No. 201510463462.1.
Communication dated Oct. 6, 2017, issued by the Australian Patent Office in counterpart Australian Patent Application No. 2015297192.
Communication dated May 22, 2018, issued by the State Intellectual Property Office of the People's Republic of China in counterpart Chinese Patent Application No. 201510463462.1.
Communication dated Feb. 26, 2018, from the Intellectual Property Office of Taiwan in counterpart application No. 105143741.
Communication dated Apr. 25, 2018 from the Russian Patent Office in counterpart Russian Application No. 2017106249/07.
Communication dated Oct. 15, 2018, from the State Intellectual Property Office of People's Republic of China in counterpart Application No. 201510463462.1.
Communication dated Aug. 15, 2018, from the Taiwanese Patent Office in counterpart application No. 105143741.
Communication dated Mar. 11, 2019, issued by the Chinese Patent Office in counterpart Chinese Patent Application No. 201510463462.1.

\* cited by examiner

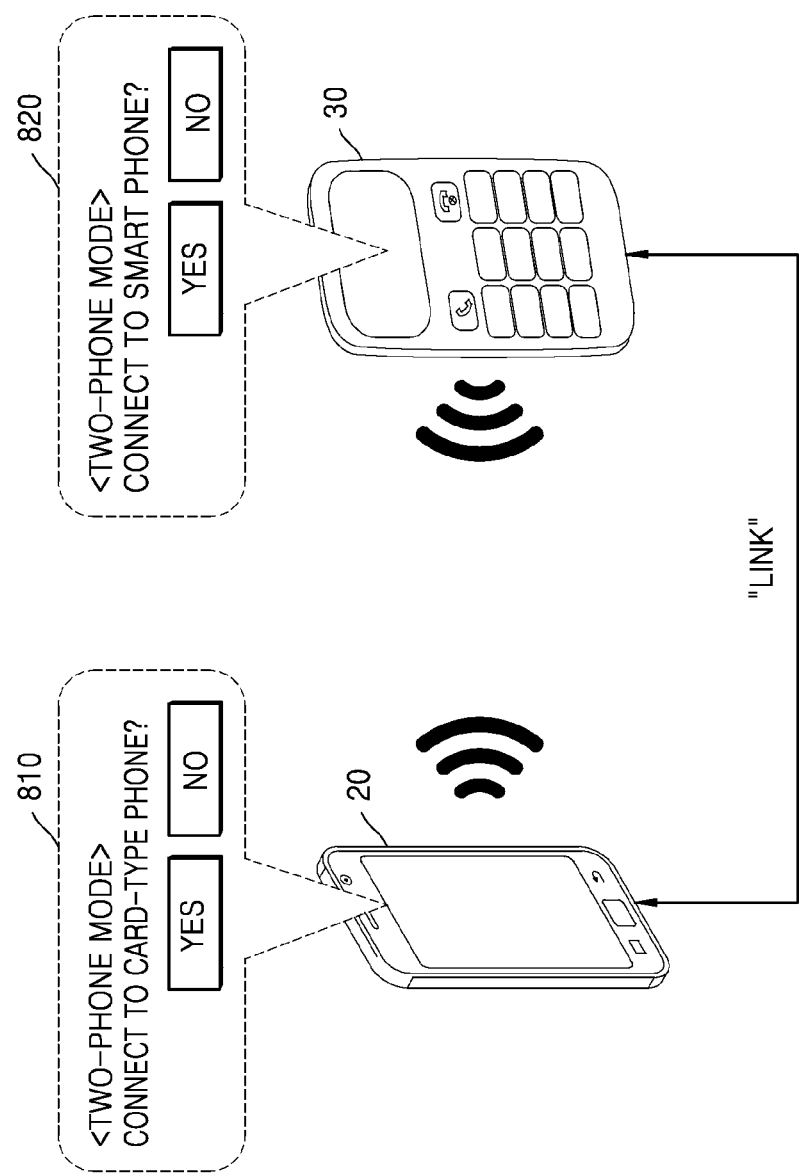

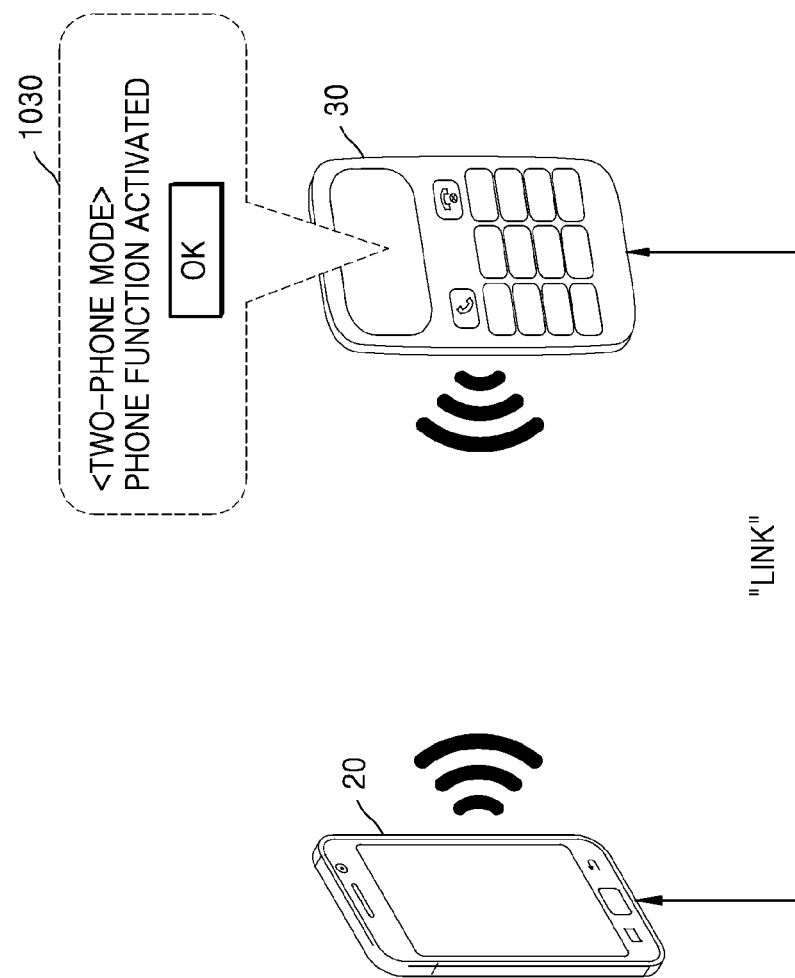

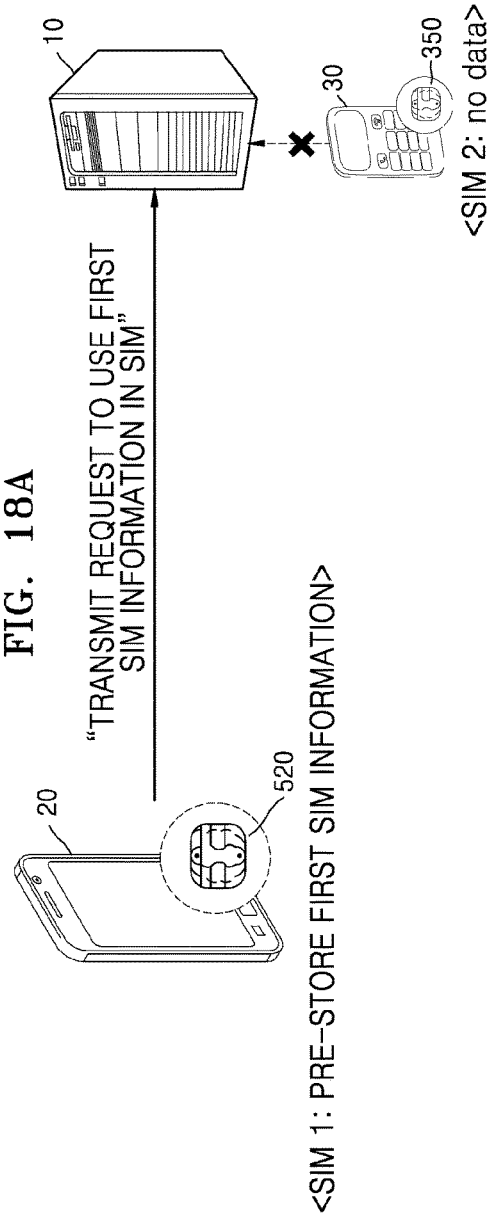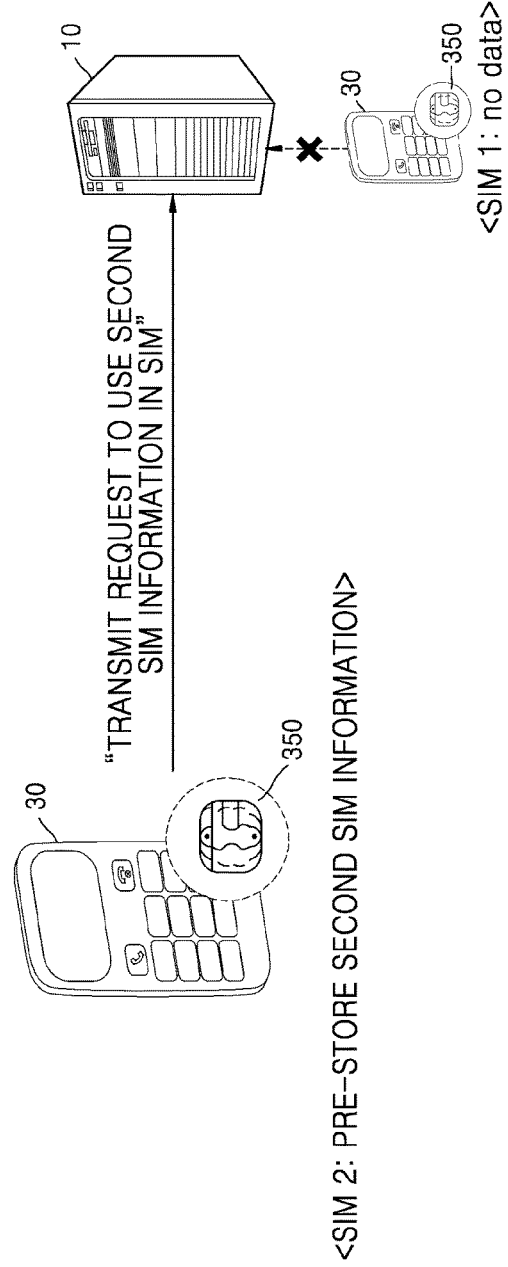

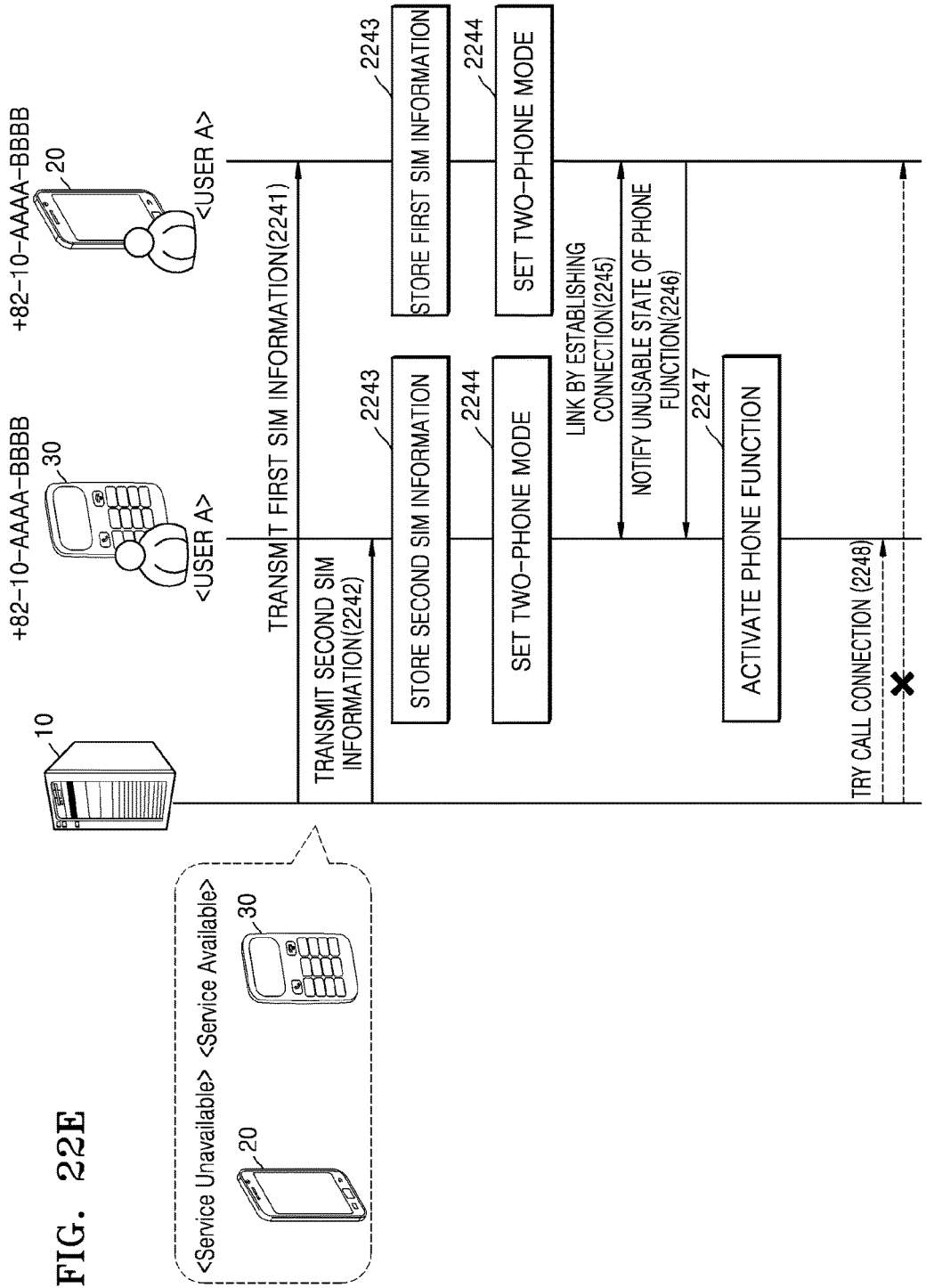

FIG. 27

| NAME | PHONE NUMBER | TIME OF OUTGOING CALL | TIME OF INCOMING CALL | ... | SYNC INDEX |
|---|---|---|---|---|---|
| Serina KIM | +82-10-1585-XXXX | 2015.04.28. PM05:45 | N/A | ... | DH258XXXX892 |
| Jeanette Chung | +82-10-3225-YYYY | N/A | 2015.04.28. PM05:42 | ... | DH258XXXX891 |
| John Doe | +82-10-4253-XXXX | N/A | 2015.04.28. PM03:33 | ... | DH258XXXX890 |
| Jane Doe | +82-10-6235-YYYY | N/A | 2015.04.28. AM09:12 | ... | DH258XXXX889 |
| ... | ... | | | ... | ... |

2700

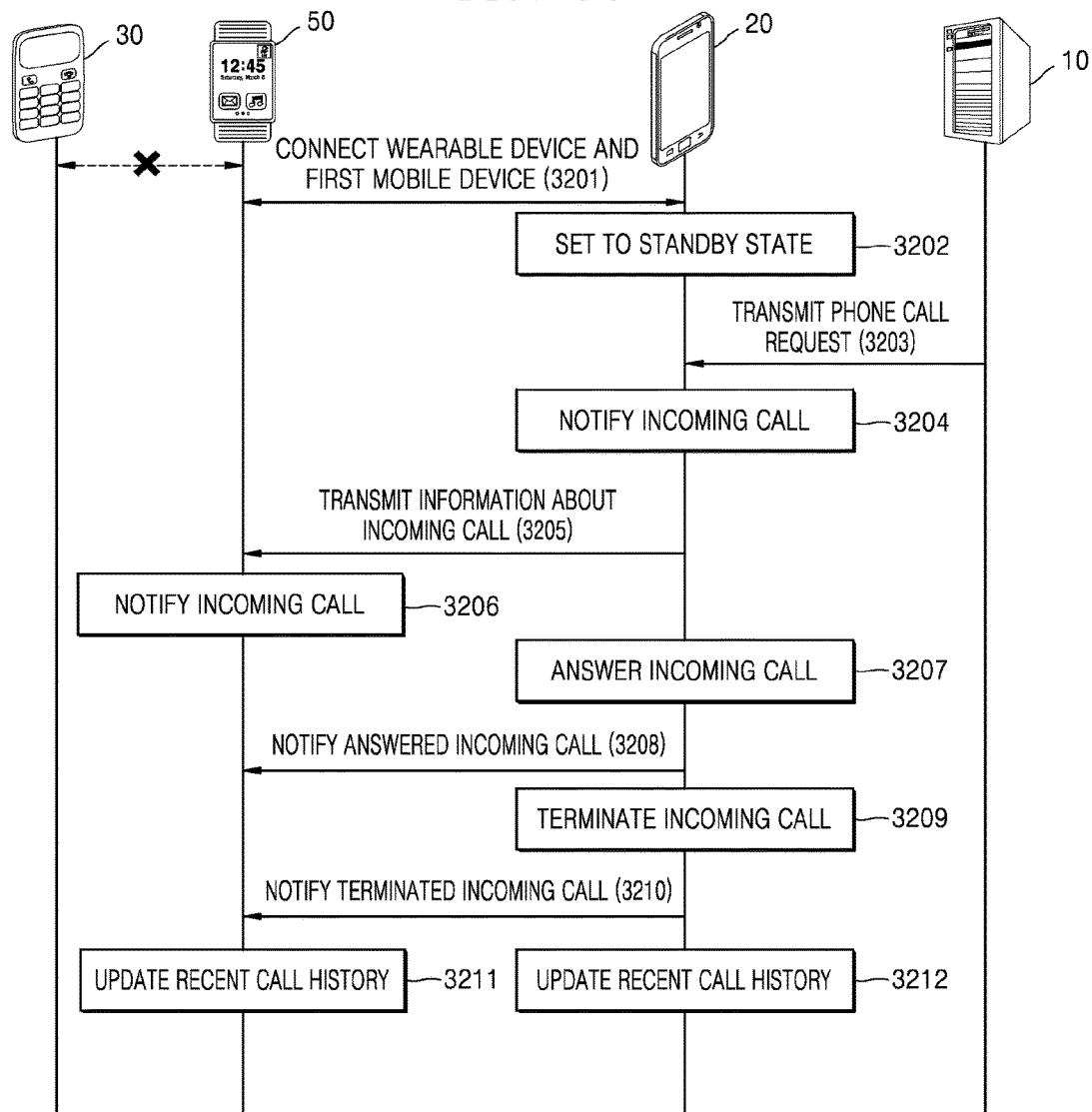

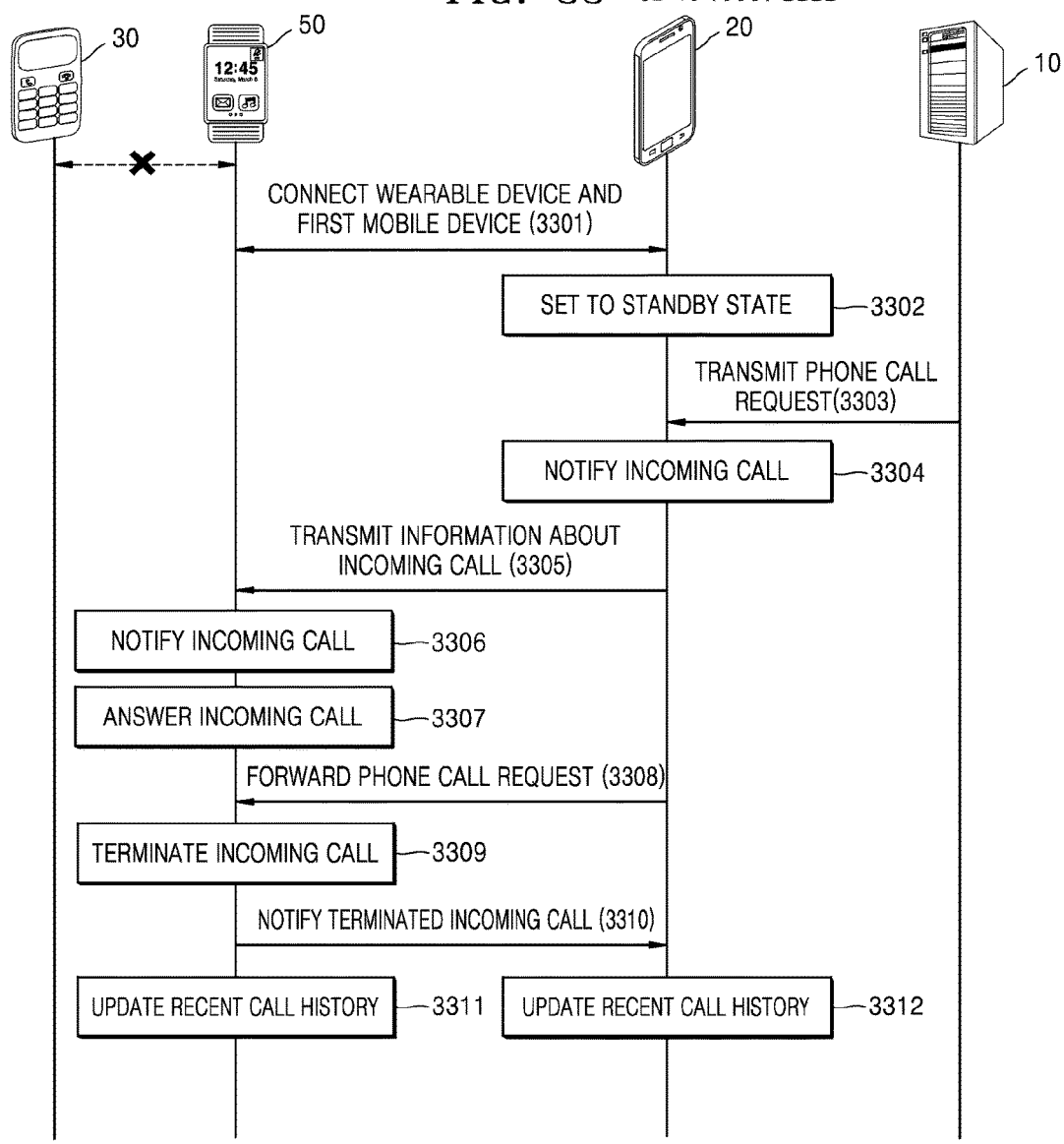
FIG. 33 <+82-10-AAAA-BBBB>

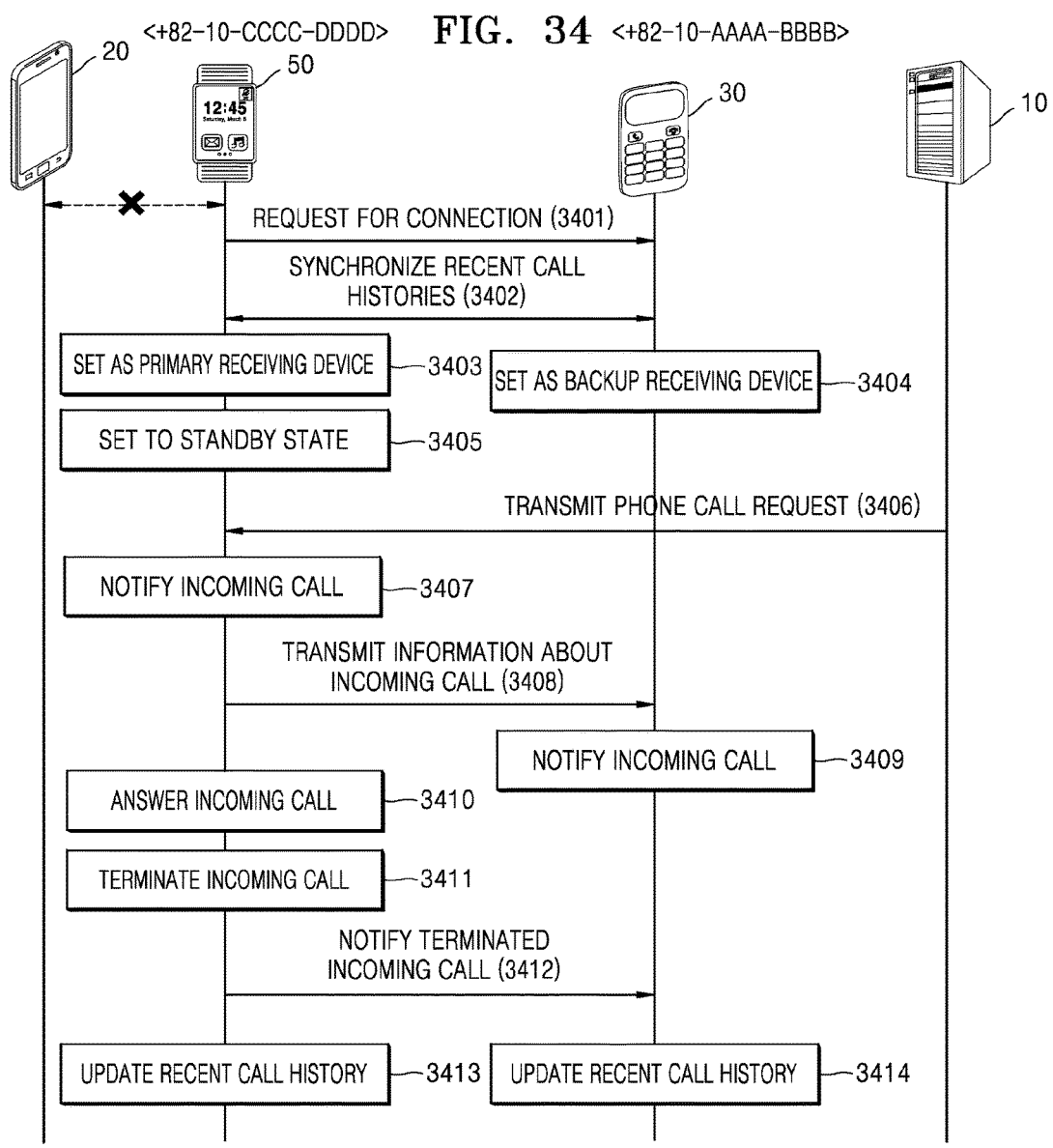

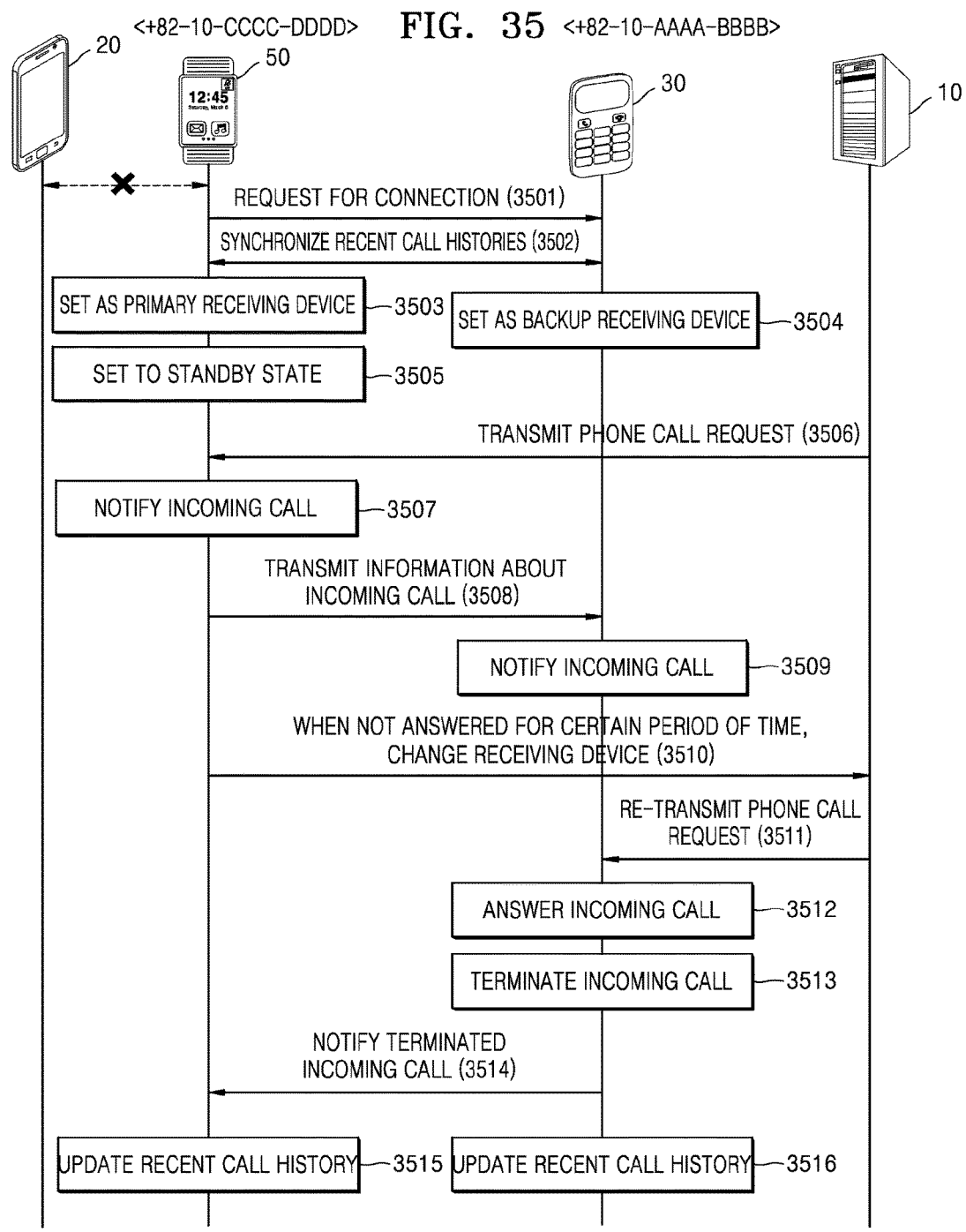

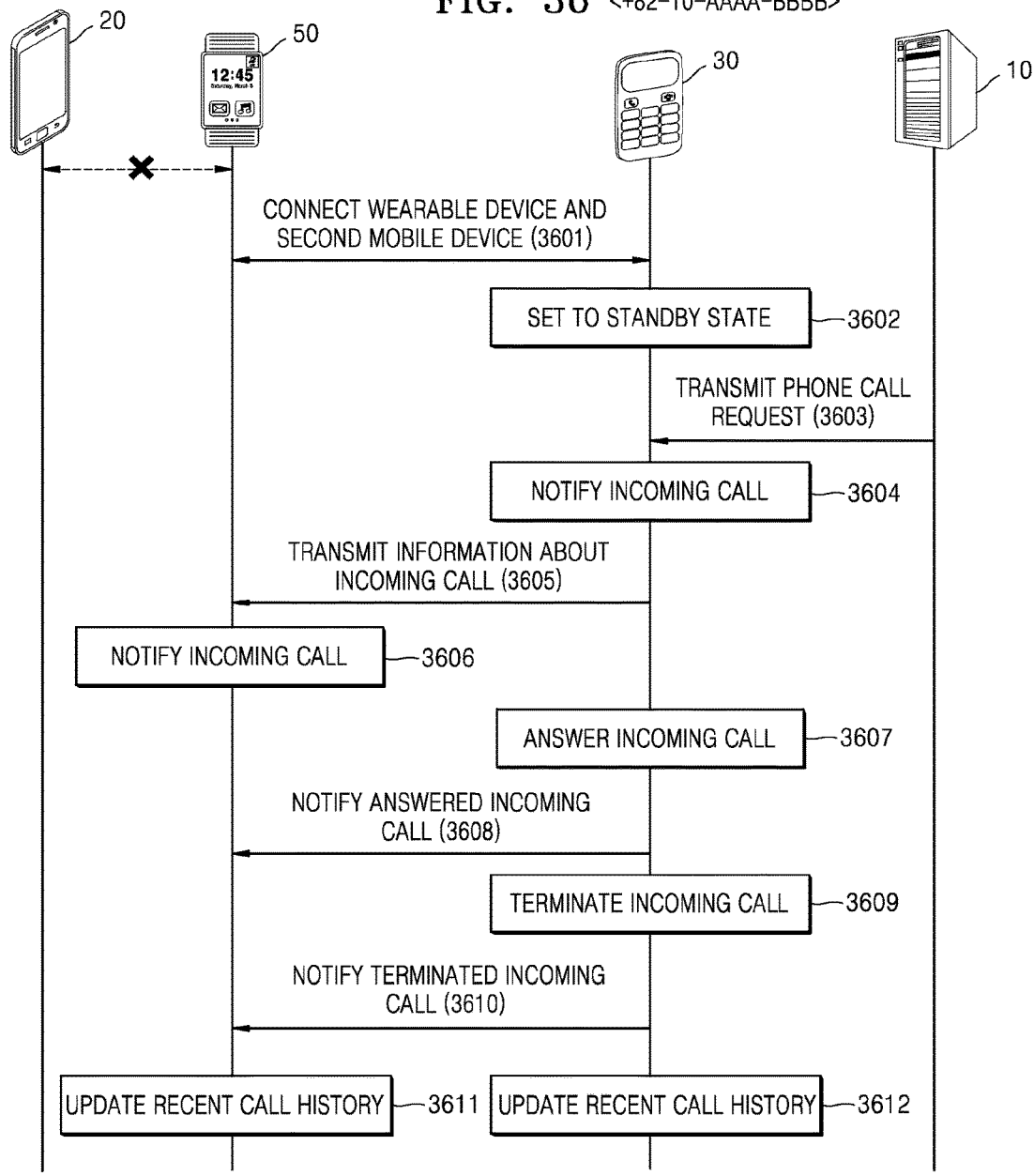

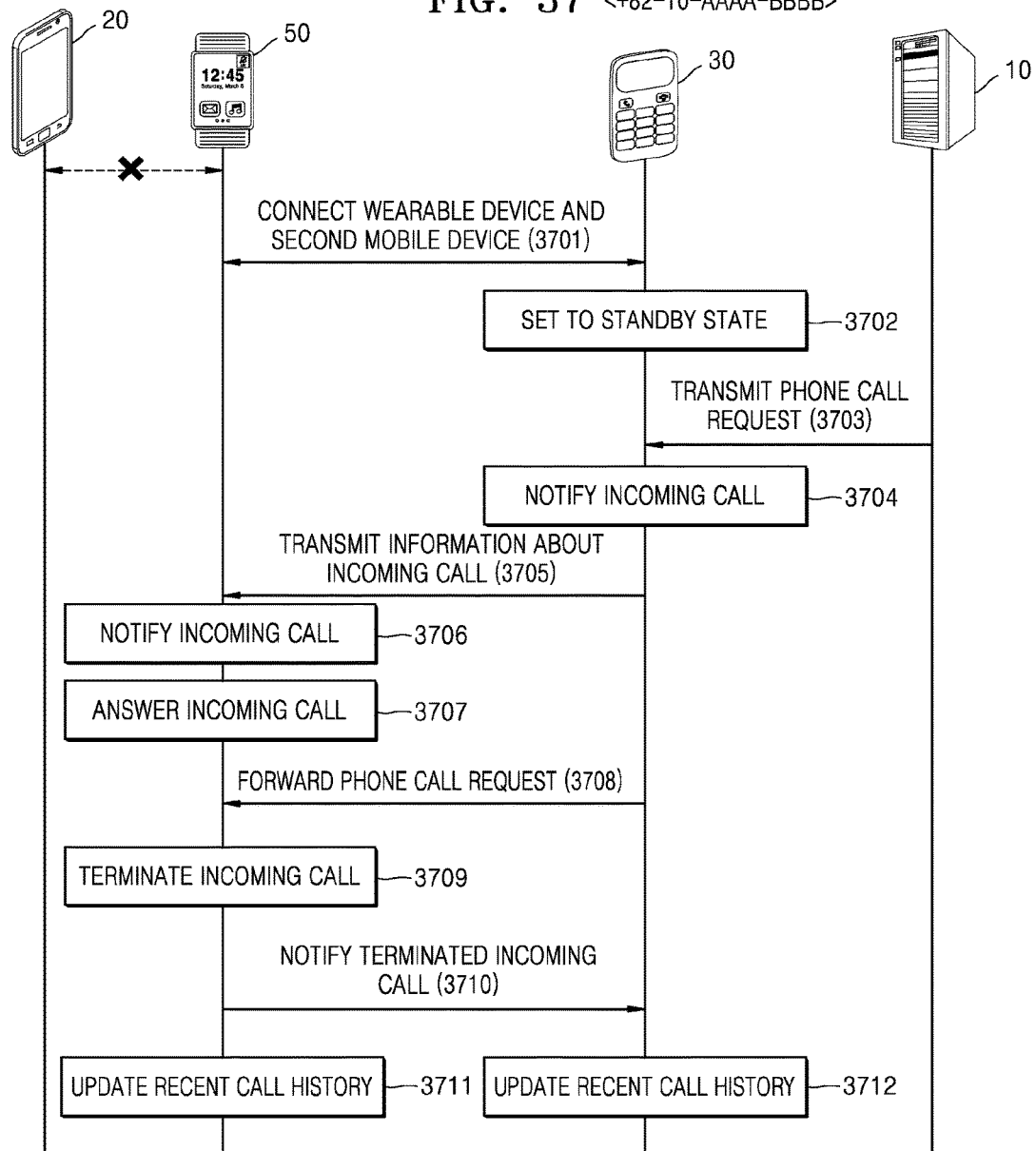

MOBILE COMMUNICATION SYSTEM, DIFFERENT MOBILE DEVICES SHARING SAME PHONE NUMBER ON MOBILE COMMUNICATION SYSTEM, AND METHOD OF PROVIDING MOBILE COMMUNICATION SERVICE BETWEEN DIFFERENT MOBILE DEVICES SHARING SAME PHONE NUMBER

RELATED APPLICATION

This application claims the benefit of Korean Patent Application No. 10-2014-0098585, filed on Jul. 31, 2014, in the Korean Intellectual Property Office, and Korean Patent Application No. 10-2015-0080030, filed on Jun. 5, 2015, in the Korean Intellectual Property Office, the disclosures of which are incorporated herein in their entireties by reference.

BACKGROUND

1. Field

Aspects of one or more exemplary embodiments relate to a mobile communication system and different mobile devices sharing the same phone number on a mobile communication system.

2. Description of the Related Art

Digital-based information and communication technology is rapidly developing. Information innovation spread by mobile phones and the Internet, and smart phones and tablet devices, in which functions of mobile phones and the Internet are combined, are increasingly common. Devices using new paradigms, such as wearable devices, have appeared. Consumers who already own a smart phone want to use such new paradigm devices. Thus, studies have been conducted into ways for new types of devices or new paradigm devices to merge with existing smart phones and tablet devices and permeate into consumers' daily lives.

SUMMARY

Aspects of one or more exemplary embodiments include a mobile communication system and different mobile devices sharing the same phone number on a mobile communication system.

Additional aspects will be set forth in part in the description which follows and, in part, will be apparent from the description, or may be learned by practice of the presented exemplary embodiments.

According to an aspect of one or more exemplary embodiments, there is provided a mobile device configured to share a phone number of another mobile device on a mobile communication system, the mobile device including: a controller configured to, after determining that a phone function of the another mobile device is deactivated, activate a phone function of the mobile device to which the phone number of the another mobile device is assigned; and a communicator configured to perform a mobile communication function using the phone number when the phone function of the mobile device is activated.

The mobile device may further include a subscriber identification module (SIM) configured to receive SIM information from a server and store the SIM information.

The SIM information may include subscription information of the mobile device corresponding to the phone number on the mobile communication system on which the another mobile device and the mobile device exist.

The communicator may be further configured to receive the SIM information from the server when the phone function of the mobile device is activated.

The communicator may be further configured to: transmit a request to the server for the SIM information in response to the phone function of the mobile device being activated, and receive the SIM information in response to the request for the SIM information.

The communicator may be further configured to: transmit a request to use the SIM information to the server when the SIM information is received, and perform the mobile communication function in response to receiving an approval from the server.

The mobile device may further include a storage having stored thereon device identification (ID) information having a different value from a device ID information of the another mobile device.

The device ID information of the another mobile device may include at least one of a serial number and an international mobile equipment identity (IMEI) of the another mobile device, and the device ID information of the mobile device may include at least one of a serial number and an IMEI of the mobile device.

The communicator may be further configured to: connect to the another mobile device using short-range wireless communication, and exchange information about an activation state of the phone function of the another mobile device and an activation state of the phone function of the mobile device with the another mobile device.

The controller may be further configured to activate the phone function of the mobile device based on the exchanged information.

The controller may be further configured to, in response to it being determined that the phone function of the another mobile device is deactivated, automatically activate the phone function of the mobile device.

The mobile device may further include a user interface (UI) configured to provide a popup UI for setting an activation state of the phone function of the mobile device.

The controller may be further configured to, in response to a user input to set the activation state of the phone function of the mobile device to active being input through the popup UI, activate the phone function of the mobile device.

The mobile device may further include a subscriber identification module (SIM) configured to: receive, from the server, SIM information regardless of an activation state of the phone function of the mobile device, and pre-store the received SIM information.

The communicator may be further configured to, in response to the phone function of the mobile device being activated, transmit a request to use the pre-stored SIM information and perform the mobile communication function in response to receiving an approval from the server.

The communicator may be further configured to, in response to the phone function of the mobile device being activated, receive subscriber identification module (SIM) information from the another mobile device.

The communicator may be further configured to, in response to the SIM information being received from the another mobile device, transmit a request to use the received SIM information to the server and perform the mobile communication function in response to receiving an approval from the server.

The communicator may be further configured to, in response to the phone function of the another mobile device being activated while the SIM information is stored in the SIM, transmit the stored SIM information to the another mobile device.

The controller may be further configured to control the SIM to delete SIM information after the SIM information is transmitted.

According to an aspect of one or more exemplary embodiments, there is provided a mobile communication system including: a first mobile device configured to perform a mobile communication function using first subscriber identification module (SIM) information comprising subscription information of a phone number registered with the mobile communication system; a second mobile device configured to perform the mobile communication function using second SIM information comprising the subscription information of the phone number; and a server configured to: receive requests to use the first SIM information and requests to use the second SIM, and connect, in response to the phone number being requested to be called, the phone call to a mobile device corresponding to the requested first SIM information or the requested second SIM information.

The first mobile device may be configured to: transmit a request that the server transmit the first SIM information in response to a phone function of the first mobile device being activated; and transmit a request to use the first SIM information to the server when the first SIM information is received.

The second mobile device may be configured to: transmit a request that the server transmit the second SIM information in response to a phone function of the second mobile device being activated; and transmit a request to use the second SIM information to the server when the second SIM information is received.

The first mobile device may be further configured to receive, from the server, the first SIM information regardless of an activation state of a phone function of the first mobile device, and transmit a request to use the first SIM information to the server in response to the phone function being activated in the first mobile device.

The second mobile device may be further configured to receive, from the server, the second SIM information regardless of an activation state of a phone function of the second mobile device, and transmit a request to use the second SIM information to the server in response to the phone function being activated in the second mobile device.

At least one of the first mobile device may be further configured to receive, from the server, the first SIM information regardless of activation of a phone function of the first mobile device, and the second mobile device may be further configured to receive, from the server, the second SIM information regardless of activation of a phone function of the second mobile device.

The first mobile device and the second mobile device may be further configured to exchange the pre-stored first SIM information or the pre-stored second SIM information between the first mobile device and the second mobile device.

According to an aspect of one or more exemplary embodiments, there is provided a method of providing, by a mobile device sharing a phone number of another mobile device, a mobile communication service, the method including: determining whether a phone function of the another mobile device is deactivated; activating a phone function of the mobile device based on a result of the determining; and performing, in response to the phone function of the second mobile device being activated, a mobile communication function using the phone number.

According to an aspect of one or more exemplary embodiments, there is provided a mobile device including: a controller configured to: control the mobile device to share a phone number with another mobile device, and control an activation state of a phone function of the mobile device; and a communicator configured to perform a mobile communication function using the phone number in accordance with the activation state of the phone function.

The communicator may be further configured to communicate with the another mobile device, and the controller may be further configured to: control the communicator to exchange subscriber identification module (SIM) information with the another mobile device, and control the activation state of the phone function based on the exchanged SIM information.

The communicator may be further configured to communicate with a server, and the controller may be further configured to control the communicator to transmit a SIM information use request to the server based on the exchanged SIM information.

The SIM information use request may indicate that the mobile device is to use the phone number.

The SIM information use request may indicate that the another mobile device is to use the phone number.

The another mobile device may be a companion mobile device.

The communicator may be further configured to communicate with the companion mobile device, and the controller may be further configured to: link to the companion mobile device, and control the communicator to, in response to receiving a phone call, forward the phone call to the linked companion mobile device.

BRIEF DESCRIPTION OF THE DRAWINGS

These and/or other aspects will become apparent and more readily appreciated from the following description of certain exemplary embodiments, taken in conjunction with the accompanying drawings in which:

FIG. 8A is a diagram for describing linking the first mobile device and the second mobile device in a two-phone mode, according to an exemplary embodiment;

FIG. 10C is a diagram for describing a case in which the phone function of the second mobile device is activated from among the first mobile device and the second mobile device, which are linked to each other in the two-phone mode, according to an exemplary embodiment;

FIGS. 18A and 18B are diagrams for describing a concept of a third scenario in which SIM information is pre-stored in any one of the first mobile device and the second mobile device, according to an exemplary embodiment;

FIG. 22E is a timing diagram of a method of performing a mobile communication function by the second mobile device, when the device ID information of the first mobile device and the device ID information of the second mobile device are the same and only the phone function of the second mobile device is usable, according to an exemplary embodiment;

FIG. 27 is a table of a database of recent call histories stored in a device, according to an exemplary embodiment;

FIG. 32 is a timing diagram of a method of performing a phone call by the first mobile device connected to a wearable device of a companion type, according to an exemplary embodiment;

FIG. 33 is a timing diagram of a method of receiving a call made to the first mobile device by the wearable device of the companion type, according to an exemplary embodiment;

FIG. 34 is a timing diagram of a method of performing a phone call by the wearable device of the standalone type instead of the second mobile device that is a card-type phone, according to an exemplary embodiment;

FIG. 35 is a timing diagram of a method of performing a phone call instead of the second mobile device when the wearable device is unable to receive a call, according to an exemplary embodiment;

FIG. 36 is a timing diagram of a method of performing a phone call by the second mobile device connected to the wearable device of the companion type, according to an exemplary embodiment; and FIG. 37 is a timing diagram of a method of receiving a call made to the second mobile device by the wearable device of the companion type, according to an exemplary embodiment.

DETAILED DESCRIPTION

Figure 1:
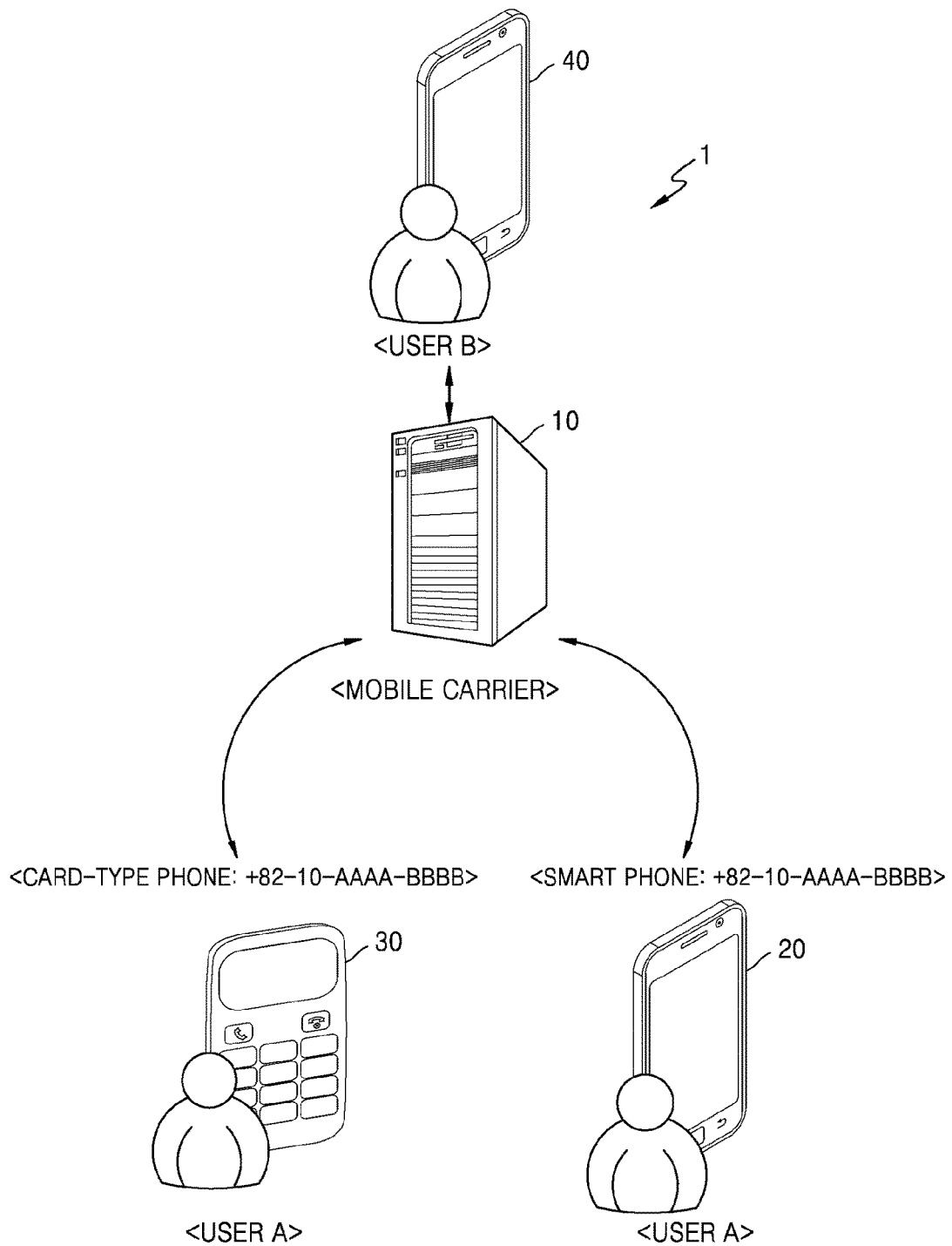
FIG. 1 is a diagram for describing a mobile communication system in which different mobile devices make a call using a same phone number, according to an exemplary embodiment.

Certain exemplary embodiments will now be described more fully with reference to the accompanying drawings. However, one or more exemplary embodiments may be embodied in many different forms, and should not be construed as being limited to the exemplary embodiments set forth herein. Rather, the exemplary embodiments described herein are provided so that this disclosure will be thorough and complete, and will fully convey the concept of one or more exemplary embodiments to those of ordinary skill in the art. In the following description, well-known functions or constructions may not be described in detail since they would obscure the description of one or more exemplary embodiments with unnecessary detail, and like reference numerals in the drawings denote like or similar elements throughout the specification.

In the specification, when a region is "connected" to another region, the regions may not only be "directly connected," but may also be "electrically connected" via another device therebetween. Also, when a region "includes" an element, the region may further include other elements.

As used herein, the term "and/or" includes any and all combinations of one or more of the associated listed items. Expressions such as "at least one of" when preceding a list of elements, modify the entire list of elements and do not modify the individual elements of the list.

In the specification, performing of a phone call includes both receiving a call and making a call.

Hereinafter, one or more exemplary embodiments will be described in detail with reference to accompanying drawings.

FIG. 1 is a diagram for describing a mobile communication system 1 in which different mobile devices make a call using a same phone number, according to an exemplary embodiment.

Referring to FIG. 1, the mobile communication system 1 includes a server 10 of a mobile carrier, a first mobile device 20 of a user A, a second mobile device 30 of the user A, and a mobile device 40 of a user B. In the mobile communication system 1, the first mobile device 20, the second mobile device 30, and the mobile device 40 may each be a device having a mobile communication function, such as a smart phone, a tablet device, or a personal digital assistant (PDA). For example, the first and second mobile devices 20 and 30 may be two types of device. Hereinafter, for example, it is assumed that the first mobile device 20 is a smart phone and the second mobile device 30 is a card-type phone, but one or more exemplary embodiments are not limited thereto. The card-type phone will be described in detail with reference to accompanying drawings.

The user A may own the first mobile device 20 that is a smart phone and the second mobile device 30 that is a card-type phone. In the mobile communication system 1, a phone number of the first mobile device 20 and a phone number of the second mobile device 30 are the same, i.e., "+82-10-AAAA-BBBB." In other words, the first mobile device 20 and the second mobile device 30 may share a certain phone number.

Accordingly, when the user B dials "+82-10-AAAA-BBBB" using the mobile device 40, the user A may talk to the user B using the first mobile device 20 or the second mobile device 30.

The mobile carrier denotes any entity capable of providing mobile communication services, such as SK Telecom and KT in the Republic of Korea, and Verizon Wireless, AT&T, Sprint Nextel, and T-Mobile USA in the United States of America. The server 10 of the mobile carrier may denote a server operated by the mobile carrier to provide a mobile communication service to consumers.

The server 10 of the mobile carrier may determine that a phone number "+82-10-XXXX-XXXX" is currently assigned to the mobile device 40 of the user B. Also, the server 10 of the mobile carrier may determine that one phone number "+82-10-AAAA-BBBB" is currently assigned to both the first mobile device 20 and the second mobile device 30 of the user A.

When the mobile device 40 assigned with the phone number "+82-10-XXXX-XXXX" calls the phone number "+82-10-AAAA-BBBB," the server 10 of the mobile carrier may relay a phone call to the first mobile device 20 or the second mobile device 30 assigned with the phone number "+82-10-AAAA-BBBB".

In other words, the first and second mobile devices 20 and 30 may both perform a mobile communication function by being subscribed to the mobile communication system 1, without having to be assigned different phone numbers by the server 10 of the mobile carrier. Meanwhile, in FIG. 1, the number of mobile devices owned by the user A is two, i.e., the first and second mobile devices 20 and 30, but this is only an example, and the user A may own two or more mobile devices having the same phone number.

Figure 2:
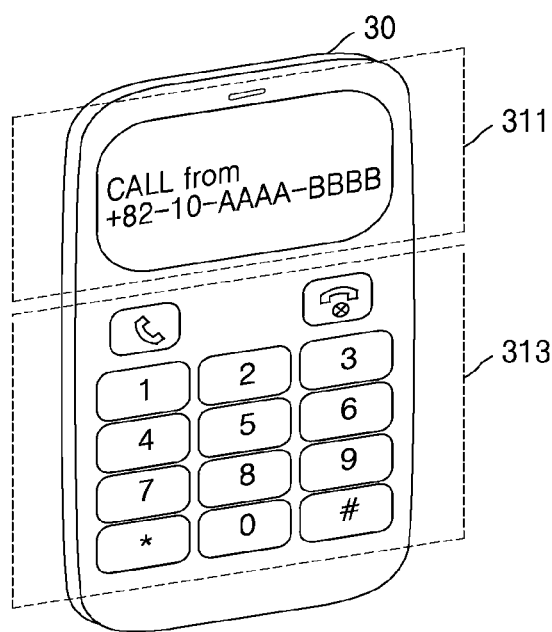
FIG. 2 is a diagram for describing a second mobile device of a user A, according to an exemplary embodiment.

FIG. 2 is a diagram of the second mobile device 30 of the user A, according to an exemplary embodiment.

Referring to FIG. 2, the second mobile device 30 may be a card-type phone having a different shape from a smart phone. The card-type phone may denote a mobile device having a mobile communication function like a smart phone, while having an ultra-slim or ultra-thin shape like a credit card or a transportation card. In other words, like a smart phone, the card-type phone may be assigned with a phone number and perform a phone call with another phone through the mobile communication system 1. For example, since only subminiature modules are mounted on the card-type phone such that the card-type phone is ultra-slim, the card-type phone may only perform simple functions, such as a phone function or input/output functions, from among various functions of a smart phone, but one or more exemplary embodiments are not limited thereto.

The second mobile device 30 realized as the card-type phone may include, for example, a display 311, e.g., a display unit, and an input interface 313, e.g., an input unit, on a front surface.

The display 311 may display information input through the input interface 313. For example, the display 311 may display numbers input through a keypad of the input interface 313, a contact list stored in the second mobile device 30, or caller information of a received phone call. The display device 311 may perform a function of displaying various types of information processed by the second mobile device 30.

The input interface 313 may be a keypad having physical buttons. The input interface 313 may be a keypad including, as non-limiting examples, number buttons, a call connection button, and a call termination button, and the like.

Figure 3:
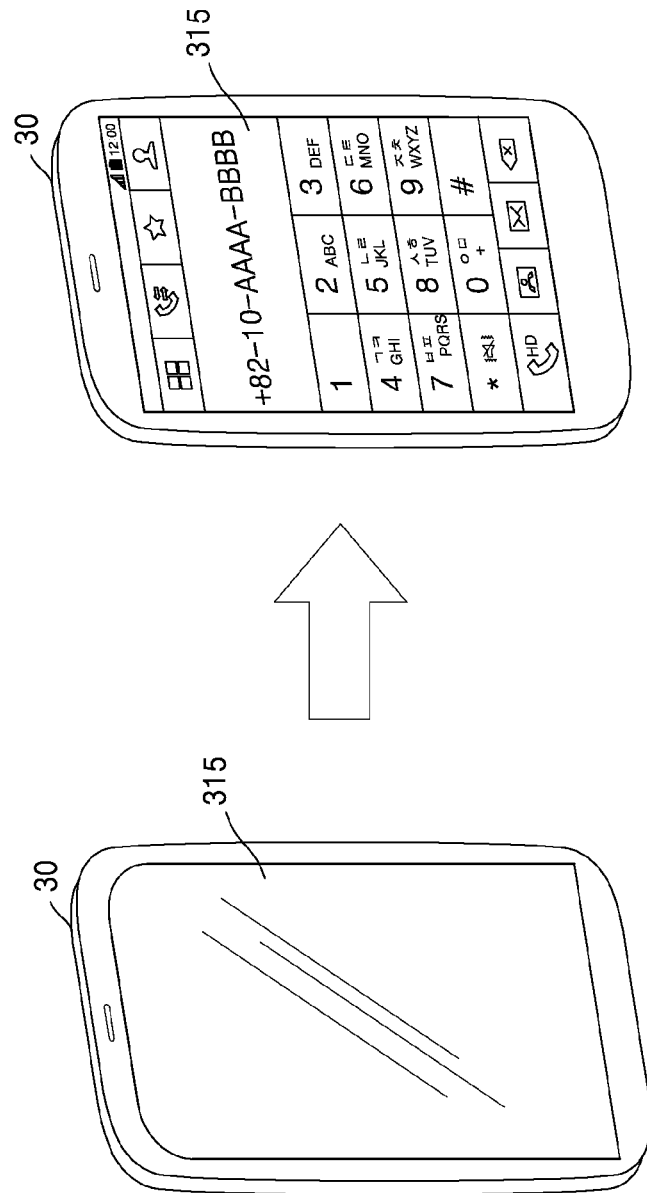
FIG. 3 is a diagram for describing the second mobile device of the user A, according to another exemplary embodiment.

FIG. 3 is a diagram of the second mobile device 30 of the user A, according to another exemplary embodiment.

Referring to FIG. 3, the second mobile device 30 of FIG. 3 may include a touch screen 315 on a front surface. The second mobile device 30 of FIG. 3 is realized as a card-type phone that includes the touch screen 315 in which functions of the display 311 and the input interface 313 are integrated.

Accordingly, the second mobile device 30 of FIG. 3 realized as the card-type phone may receive a number or a character via a soft keyboard displayed on the touch screen 315, and may display various types of information processed by the second mobile device 30, such as a contact list or caller information of a received phone call, through the touch screen 315.

A card-type phone is not limited to the above description, and may be realized with various elements and features.

Figure 4:
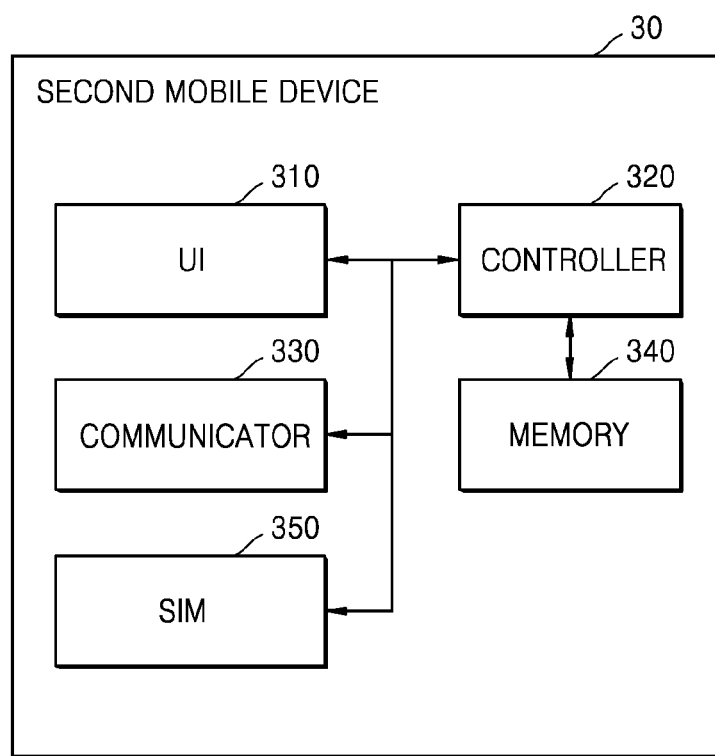
FIG. 4 is a block diagram of the second mobile device, according to an exemplary embodiment.

FIG. 4 is a block diagram of the second mobile device 30, according to an exemplary embodiment.

Referring to FIG. 4, the second mobile device 30 includes a user interface (UI) 310, e.g., a UI unit, a controller 320, a communicator 330, e.g., a communication unit, a memory 340, e.g., a storage or a memory unit, and a subscriber identity module (SIM) 350. The second mobile device 30 according to one or more exemplary embodiments may include additional hardware components, or may be missing of some the hardware components shown in FIG. 4. Meanwhile, the second mobile device 30 may be the card-type phone described above, but is not limited thereto.

The UI 30 may be a hardware used by the user A to input data to control the second mobile device 30. For example, the UI 310 may be a keypad, a dome switch, a touch screen (a contact capacitance type, a pressure resistance film type, an infrared ray detecting type, a surface ultrasonic conducting type, an integral tension measuring type, or a Piezo-effect type), a jog wheel, or a jog switch, but is not limited thereto.

The UI 310 may include the display 311, the input interface 313, and the touch screen 315 described above with reference to FIGS. 2 and 3. In addition, the UI 310 may include an interface, e.g., an interfacing unit, for notifying the user A about information processed by the second mobile device 30, such as a speaker or a buzzer outputting an audio signal or a voice signal, or a vibration motor outputting a vibration signal. For example, the UI 310 may receive inputs of the user A by providing UI screens for setting various functions, such as a popup UI for activating or deactivating a phone function of the second mobile device 30, a popup UI for activating or deactivating a two-phone mode, and a popup UI for activating or deactivating a short-range wireless communication function.

The controller 320 may control overall operations of the second mobile device 30. The controller 320 may execute programs stored in the memory 340 to control functions and operations of the UI 310, the communicator 330, the memory 340, and the SIM 350. The controller 320 may activate the phone function of the second mobile device 30 after determining whether the phone function of the first mobile device 20 is deactivated, and also, control the communicator 330 to transmit a SIM information transmit request or a SIM information use request to the server 10 of the mobile carrier.

The communicator 330 may include at least one hardware component enabling the second mobile device 30 to be connected to another mobile device, such as the mobile device 40 of FIG. 1, or the server 10 of the mobile carrier wirelessly or via wires. For example, the communicator 330 may include a short-range wireless communication module and a mobile communication module.

The short-range wireless communication module of the communicator 330 may include a Bluetooth communication module, a Bluetooth low energy (BLE) communication module, a near field communication (NFC) module, a Wi-Fi communication module, a Wi-Fi direct (WFD) communication module, a Zigbee communication module, an infrared data association (IrDA) communication module, or an ultra wideband (UWB) communication module, but is not limited thereto.

The mobile communication module of the communicator 330 is a module for performing a mobile communication with another mobile device through a base station provided by the mobile carrier according to any one of various communication methods, such as 2G mobile communication, 3G mobile communication, and 4G mobile communication, on the mobile communication system 1 of FIG. 1, and may be a module for receiving data in any type according to a transmission and reception of a voice call, a video call, or a text/multimedia message. For example, the communicator 330 may receive SIM information from the server 10 of the mobile carrier of FIG. 1.

When the phone function of the second mobile device 30 is activated, the communicator 330 may communicate various types of information with the server 10 of the mobile carrier or other mobile devices, such as the first mobile device 20 and the mobile device 40, such that the second mobile device 30 performs the mobile communication function. For example, the communicator 330 may transmit the SIM information transmit request or the SIM information use request to the server 10 of the mobile carrier. Also, the communicator 330 may exchange the SIM information with the first mobile device 20, and receive various types of information about the first mobile device, such as an activated state of the phone function of the first mobile device 20, from the first mobile device 20.

The memory 340 may store programs for processes and controls of the controller 320, and store data input to or output from the second mobile device 30. For example, the memory 340 may store device identification (ID) information, contact information, text message information, credit card information, or transportation card information of the second mobile device 30. The device ID information may include a serial number and an IMEI of the second mobile device 30, which are intrinsic to the second mobile device 30, and may also include various types of information, such as a model number and manufacturer information of the second mobile device 30.

The memory 340 may include at least one type of storage medium from among a flash memory type memory, a hard disk type memory, a multimedia card micro type memory, a card type memory (for example, a secure digital (SD) memory or an extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The SIM 350 is a module that stores the SIM information including information related to a mobile communication service provided by the mobile carrier, such as an integrated circuit card identifier (ICCID), an international mobile subscriber identity (IMSI), an authentication key, and a location area identity. The SIM 350 may be a downloadable SIM type module that stores the SIM information received from the server 10 of the mobile carrier. For example, the SIM 350 may receive, from the server 10, and store SIM information including subscription information of a certain phone number registered with the mobile communication system 1. One or more exemplary embodiments are not limited thereto, and, alternatively, the SIM 350 may be a module that reads and stores information stored in a SIM card or a universal SIM (USIM) card when the SIM card or the USIM card is inserted into the SIM 350.

Figure 5:
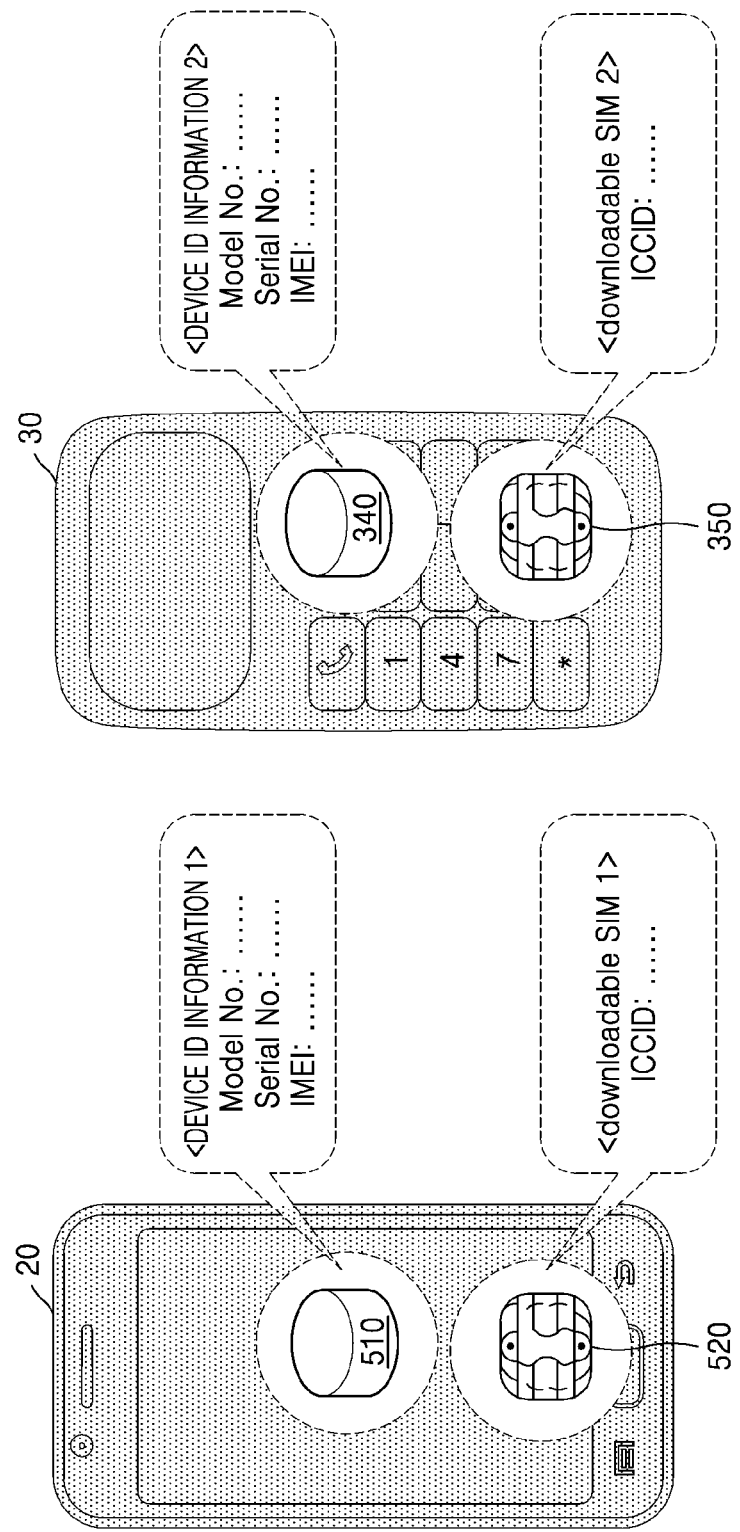
FIG. 5 is a diagram for describing device identification (ID) information and subscriber identification module (SIM) information, which are stored in each of a first mobile device and the second mobile device, according to an exemplary embodiment.

FIG. 5 is a diagram for describing device ID information and SIM information, which are stored in each of the first mobile device 20 and the second mobile device 30, according to an exemplary embodiment.

Referring to FIG. 5, a memory 510 of the first mobile device 20 may store device ID information about the first mobile device 20. The device ID information may include a serial number and an international mobile equipment identity (IMEI) of the first mobile device 20, which are intrinsic to the first mobile device 20. Also, the device ID information may include various types of information, such as a model number and manufacturer information of the first mobile device 20. Here, the serial number and the IMEI of the first mobile device 20 are intrinsic to the first mobile device as described above, and generally have combinations of different numbers according to mobile devices.

A SIM 520 of the first mobile device 20 is a downloadable SIM, and may include phone number information and an ICCID. Here, the ICCID stored in the SIM 520 of the first mobile device 20 may correspond to information mapped to a certain phone number assigned by the mobile carrier. Accordingly, the server 10 of FIG. 1 of the mobile carrier may identify the user A of the first mobile device 20 and the phone number of the first mobile device 20 using the ICCID stored in the SIM 520.

The SIM 350 of the second mobile device 30 is a downloadable SIM, and may include phone number information and an ICCID. Here, the ICCID stored in the SIM 350 of the second mobile device 30 may correspond to information mapped to a certain phone number assigned by the mobile carrier. Accordingly, the server 10 of FIG. 1 of the mobile carrier may identify the user A of the second mobile device 30 and the phone number of the second mobile device 30 using the ICCID stored in the SIM 350.

As described above with reference to FIG. 1, in the mobile communication system 1, the phone number "+10-82-AAAA-BBBB" may be assigned to the first and second mobile devices 20 and 30. Also, the ICCID of the SIM 350 or 520 is mapped to a certain phone number. Accordingly, the server 10 of the mobile carrier may manage the ICCID of the SIM 350 and the ICCID of the SIM 520 as the same. Alternatively, the server 10 of the mobile carrier may manage the ICCID of the SIM 350 and the ICCID of the SIM 520 as different from each other.

Hereinafter, for convenience of description, the device ID information and the SIM information of the first mobile device 20 will be respectively referred to as first device ID information and first SIM information, and the device ID information and the SIM information of the second mobile device 30 will be respectively referred to as second device ID information and second SIM information.

Figure 6:
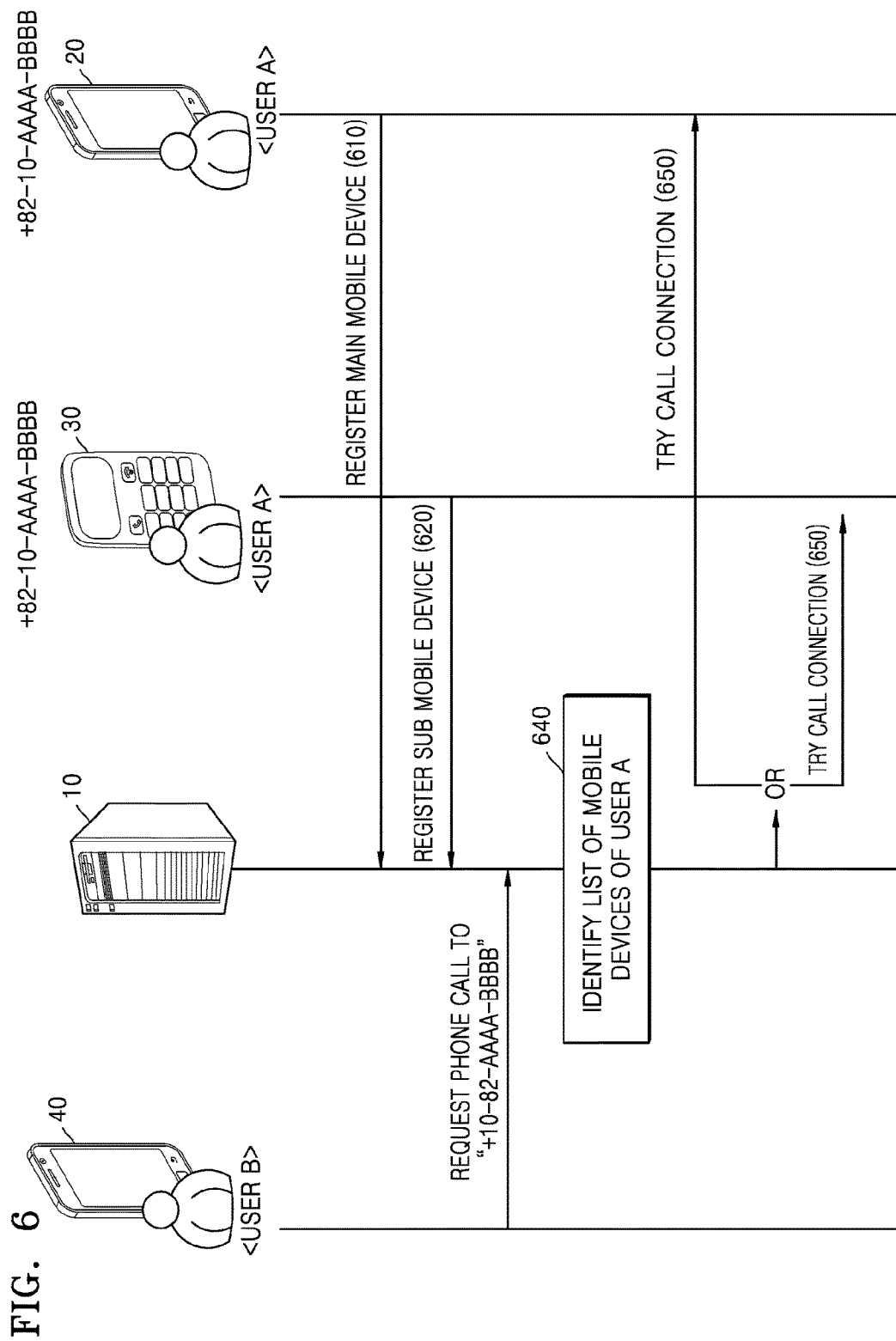
FIG. 6 is a timing diagram of a method of making a call from a first mobile device and the second mobile device, which have a same phone number and are owned by the user A, to a mobile device of a user B, on the mobile communication system, according to an exemplary embodiment.

FIG. 6 is a timing diagram of a method of making a call from the first mobile device 20 and the second mobile device 30, which have the same phone number and are owned by the user A, to the mobile device 40 of the user B, on the mobile communication system 1, according to an exemplary embodiment.

Referring to FIG. 6, the phone number "+10-82-AAAA-BBBB" may be assigned to the first and second mobile devices 20 and 30 by the server 10 of the mobile carrier.

In operation 610, the server 10 of the mobile carrier registers the first mobile device 20, as a main mobile device.

In operation 620, the server 10 of the mobile device registers the second mobile device 30, as a sub mobile device.

In operation 630, the user B requests a phone call to the phone number "+10-82-AAAA-BBBB" using the mobile device 40.

In operation 640, the server 10 of the mobile carrier identifies a list of the first and second mobile devices 20 and 30 owned by the user A.

In operation 650, if the user A activated the phone function of the first mobile device 20 that is the main mobile device, the server 10 of the mobile carrier may transmit a request of the mobile device 40 for the phone call to the first mobile device 20. However, if the user A activated the phone function of the second mobile device 30 that is the sub mobile device, the server 10 of the mobile carrier may transmit the request of the mobile device 40 for the phone call to the second mobile device 30.

In other words, when the same phone number "+10-82-AAAA-BBBB" is assigned to the first and second mobile devices 20 and 30, the user A may talk to the user B using any one of the first and second mobile devices 20 and 30.

Figure 7:
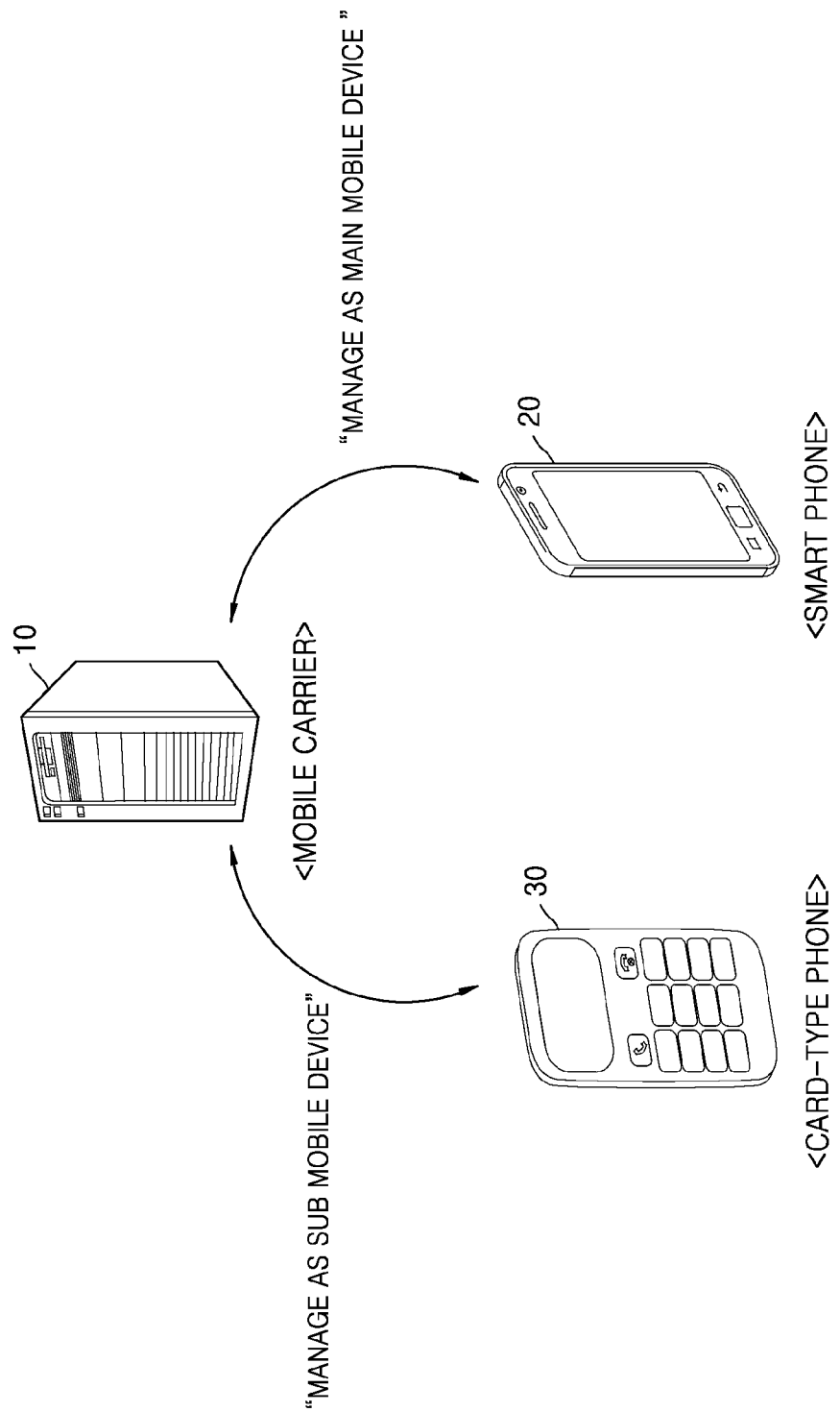
FIG. 7 is a diagram for describing a server of a mobile carrier managing mobile devices owned by user A, according to an exemplary embodiment.

FIG. 7 is a diagram for describing the server 10 of the mobile carrier managing mobile devices owned by the user A, according to an exemplary embodiment.

Referring to FIG. 7, the server 10 of the mobile carrier may identify the first and second mobile devices 20 and 30 owned by the user A. The server 10 of the mobile carrier may identify the first and second mobile devices 20 and 30 using the first and second device ID information and first and second SIM information stored in the first and second mobile devices 20 and 30. As described above, the first mobile device 20 may be a smart phone and the second mobile device 30 may be a card type phone. Accordingly, the user A may register the first mobile device 20, which has greater functionality than the second mobile device 30, as a main mobile device. Also, the user A may register the second mobile device 30 as a sub mobile device. The server 10 of the mobile carrier may identify and manage the main mobile device and the sub mobile device using the first and second device ID information of the first and second mobile devices 20 and 30.

Figure 8B:
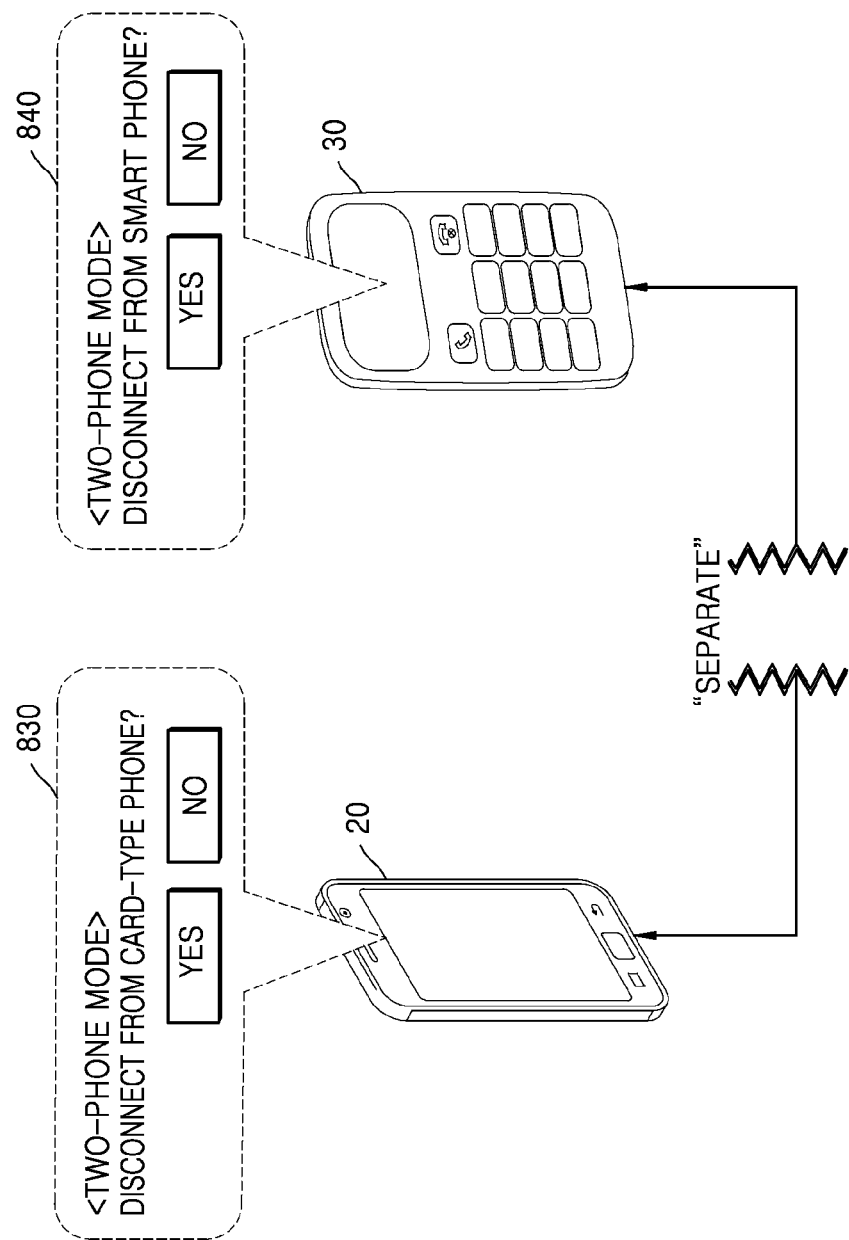
FIG. 8B is a diagram for describing separating the first mobile device and the second mobile device in the two-phone mode, according to an exemplary embodiment.

FIG. 8A is a diagram for describing linking, e.g., connecting or combining, the first mobile device 20 and the second mobile device 30 in a two-phone mode, according to an exemplary embodiment, and FIG. 8B is a diagram for describing separating, e.g., disconnecting, the first mobile device 20 and the second mobile device 30 in the two-phone mode, according to an exemplary embodiment.

The two-phone mode may be a mode for using two different mobile devices assigned with the same phone number, such as the first and second mobile devices 20 and 30 assigned with the phone number "+10-82-AAAA-BBBB," on the mobile communication system 1 of FIG. 1. Here, the two-phone mode is a term used to indicate that two devices exist as described in one or more exemplary embodiments. Thus, the term two-phone mode may be replaced by another term, such as an N-phone mode or a multi-phone mode, when N devices having the same phone number are to be used on the mobile communication system 1 of FIG. 1, wherein N is a natural number greater than or equal to 2. In other words, the term two-phone mode may be variously changed and is not limited thereto.

Referring to FIG. 8A, the first and second mobile devices 20 and 30 may be linked to each other by establishing a connection through short-range wireless communication. Examples of the short-range wireless communication include wireless communications, such as a Bluetooth communication, an NFC, and a Wi-Fi communication.

With regard to the first mobile device 20, when the two-phone mode is to be activated, the first mobile device 20 may be linked to the second mobile device 30 through the short-range wireless communication, using a UI 810 inquiring whether to connect to the second mobile device 30. Similarly, with regard to the second mobile device 30, when the two-phone mode is to be activated, the second mobile device 30 may be linked to the first mobile device 20 through the short-range wireless communication, using a UI 820 inquiring whether to connect to the first mobile device 20.

Referring to FIG. 8B, with regard to the first mobile device 20, when the two-phone mode is activated, the first mobile device 20 may be disconnected from the second mobile device 30 using a UI 830 inquiring whether to be disconnected from the second mobile device 30. Similarly, with regard to the second mobile device 30, when the two-phone mode is activated, the second mobile device 30 may be disconnected from the first mobile device 20 using a UI 840 inquiring whether to be disconnected from the first mobile device 20. Separating the first and second mobile devices 20 and 30 by disconnection does not mean that the two-phone mode is deactivated, but may mean that the user A wants to use either one of the first and second mobile devices 20 and 30 while the two-phone mode is activated.

Figure 9:
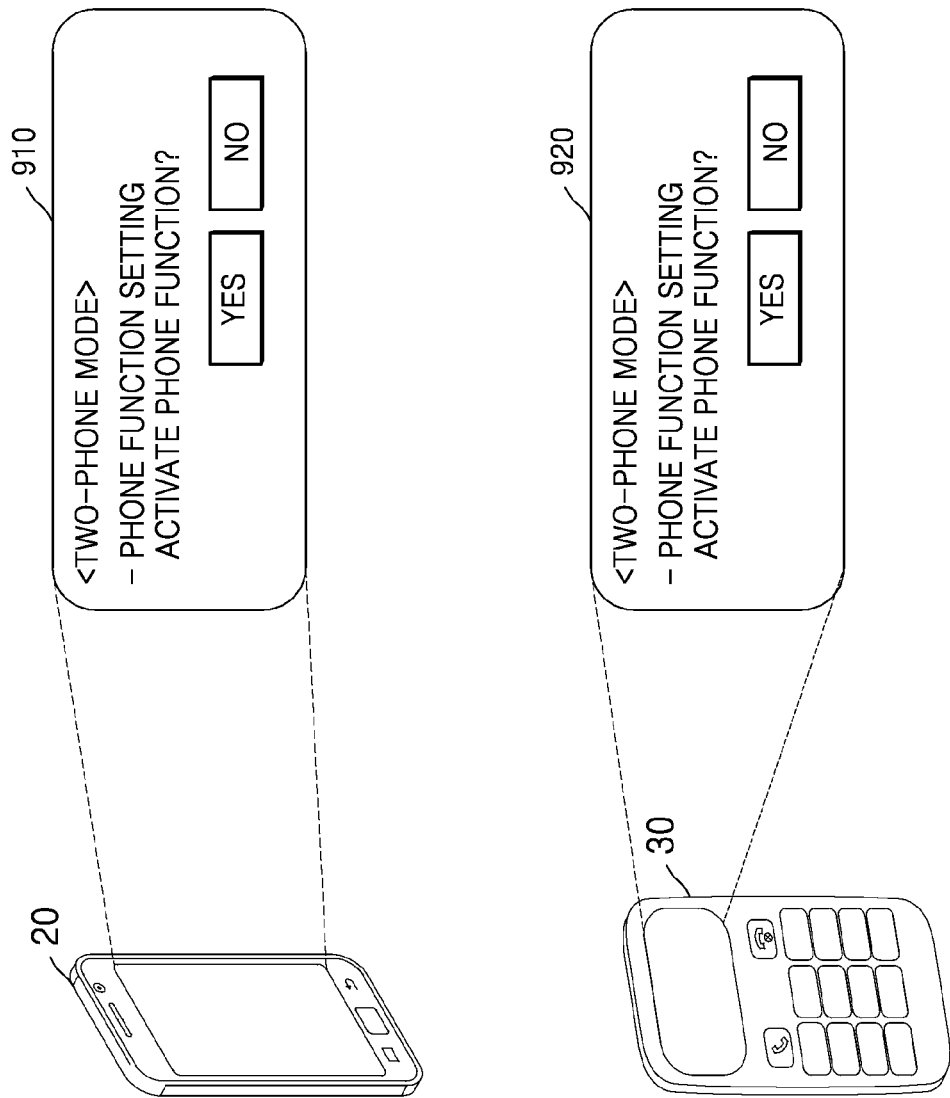
FIG. 9 is a diagram for describing manually activating a phone function of the first mobile device or a phone function of the second mobile device in the two-phone mode, according to an exemplary embodiment.

FIG. 9 is a diagram for describing manually activating the phone function of the first mobile device 20 or the phone function of the second mobile device 30 in the two-phone mode, according to an exemplary embodiment.

In the two-phone mode, the user A may want to make a call to another mobile device using one of the first and second mobile devices 20 and 30. In other words, in the two-phone mode, the user A may input information for activating the phone function of one of the first and second mobile devices 20 and 30 to select the one of the first and second mobile devices 20 and 30. For example, referring to FIG. 9, the user A may input information for activating the phone function of the first mobile device 20 using a UI 910 inquiring whether to activate the phone function of the first mobile device 20, which is displayed on the first mobile device 20. Alternatively, the user A may input information for activating the phone function of the second mobile device 30 using a UI 920 inquiring whether to activate the phone function of the second mobile device 30, which is displayed on the second mobile device 30.

When the phone function of the first mobile device 20 is activated, the phone function of the second mobile device 30 may be automatically deactivated. Similarly, when the phone function of the second mobile device 30 is activated, the phone function of the first mobile device 20 may be automatically deactivated.

Figure 10A:
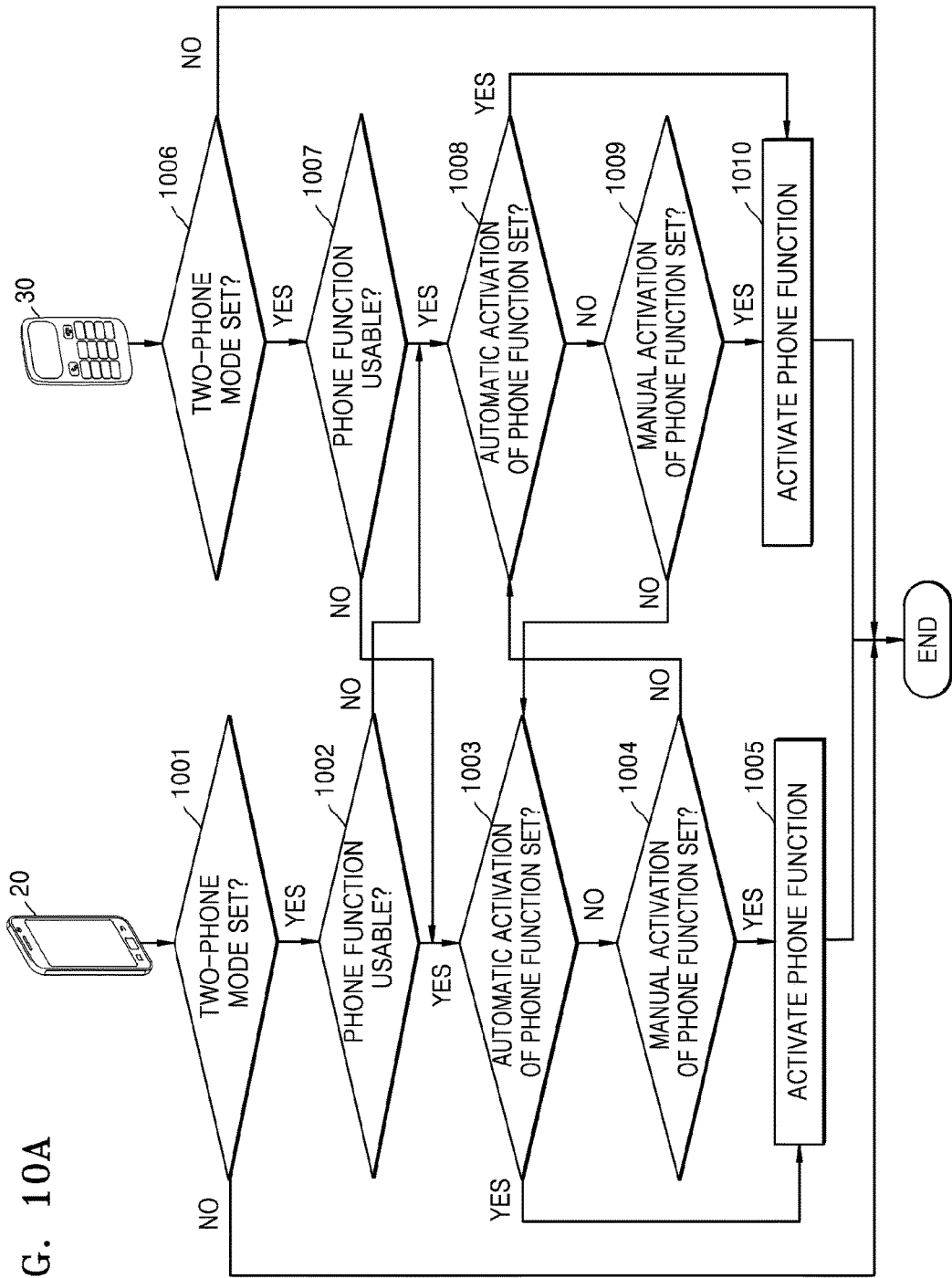
FIG. 10A is a flowchart of a method of activating the phone function of the first mobile device or the phone function of the second mobile device in the two-phone mode, according to an exemplary embodiment.

FIG. 10A is a flowchart of a method of activating the phone function of the first mobile device 20 or the phone function of the second mobile device 30, according to an exemplary embodiment.

In operation 1001, the first mobile device 20 determines whether the two-phone mode is set. If the two-phone mode is set, operation 1002 is performed. If the two-phone mode is not set, the method ends since it is not required to determine which one of the phone functions of the first and second mobile devices 20 and 30 is to be activated.

In operation 1002, the first mobile device 20 determines whether the phone function of the first mobile device 20 is usable. For example, the phone function of the first mobile device 20 may not operate normally due to any one of various reasons, such as a malfunction or shutdown of the mobile communication module included in the first mobile device 20. Thus, in operation 1002, the first mobile device 20 determines whether the phone function operates normally. If the phone function is usable, operation 1003 is performed. If the phone function is not usable, operation 1008 is performed.

In operation 1003, the first mobile device 20 determines whether automatic activation of the phone function is set. If the two-phone mode is set, the first mobile device 20 may be set as default so that the phone function of the first mobile device 20 is activated prior to that of the second mobile device 30. In other words, the first mobile device 20 may be set such that the phone function is automatically activated in the two-phone mode, instead of the phone function being manually activated via the UI 910 as described above with reference to FIG. 9. If the automatic activation of the phone function is set, operation 1005 is performed. If the automatic activation of the phone function is not set, operation 1004 is performed.

In operation 1004, the first mobile device 20 determines whether manual activation of the phone function is set. The first mobile device 20 determines whether information for manually activating the phone function is input. If the manual activation of the phone function is set, operation 1005 is performed. If the manual activation of the phone function is not set, operation 1008 is performed.

In operation 1005, the first mobile device 20 activates the phone function of the first mobile device 20. The phone function of the second mobile device 30 may be automatically deactivated.

In operation 1006, the second mobile device 30 determines whether the two-phone mode is set. If the two-phone mode is set, operation 1007 is performed. If the two-phone mode is not set, the method ends since it is not required to determine which one of the phone functions of the first and second mobile devices 20 and 30 is to be activated.

In operation 1007, the second mobile device 30 determines whether the phone function of the second mobile device 30 is usable. For example, the phone function of the second mobile device 30 may not operate normally due to any one of various reasons, such as a malfunction or shutdown of the mobile communication module included in the second mobile device 30. Thus, in operation 1007, the second mobile device 30 determines whether the phone function operates normally. If the phone function is usable, operation 1008 is performed. If the phone function is not usable, operation 1003 is performed.

In operation 1008, the second mobile device 30 determines whether automatic activation of the phone function is set. The second mobile device 30 may be set as default so that the phone function of the second mobile device 30 is activated prior to that of the first mobile device 20. In other words, the second mobile device 30 may be set such that the phone function is automatically activated in the two-phone mode, instead of the phone function being manually activated via the UI 920 as described above with reference to FIG. 9. If the automatic activation of the phone function is set, operation 1010 is performed. If the automatic activation of the phone function is not set, operation 1009 is performed.

In operation 1009, the second mobile device 30 determines whether manual activation of the phone function is set. The second mobile device 30 determines whether information for manually activating the phone function is input. If the manual activation of the phone function is set, operation 1010 is performed. If the manual activation of the phone function is not set, operation 1003 is performed.

In operation 1010, the second mobile device 30 activates the phone function of the second mobile device 30. The phone function of the first mobile device 20 may be automatically deactivated.

Figure 10B:
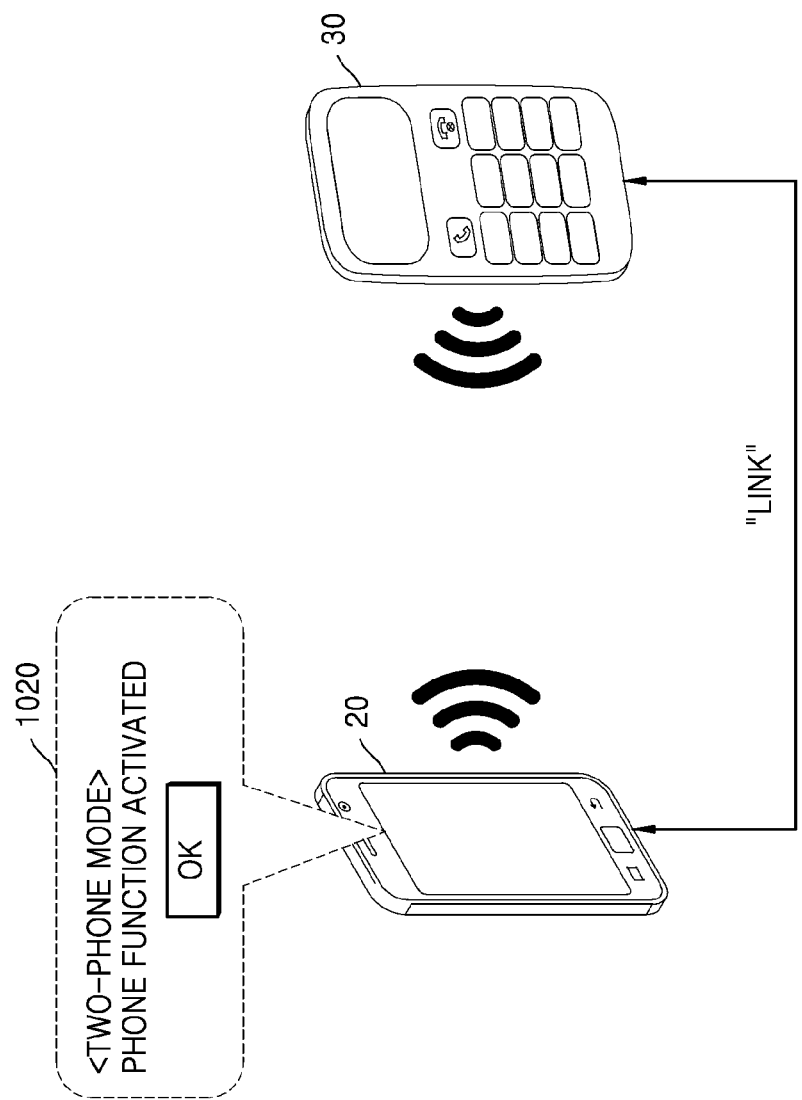
FIG. 10B is a diagram for describing a case in which the phone function of the first mobile device is activated from among the first mobile device and the second mobile device, which are linked to each other in the two-phone mode, according to an exemplary embodiment.

FIG. 10B is a diagram for describing a case in which the phone function of the first mobile device 20 is activated from among the first mobile device 20 and the second mobile device 30, which are linked to each other in the two-phone mode, according to an exemplary embodiment.

Referring to FIG. 10B, the first mobile device 20 may display a UI 1020 indicating that the phone function is activated when the phone function of the first mobile device 20 is activated according to operation 1005 of FIG. 10A.

FIG. 10C is a diagram for describing a case in which the phone function of the second mobile device 30 is activated from among the first mobile device 20 and the second mobile device 30, which are linked to each other in the two-phone mode, according to an exemplary embodiment.

Referring to FIG. 10C, the second mobile device 30 may display a UI 1030 indicating that the phone function is activated when the phone function of the second mobile device 30 is activated according to operation 1010 of FIG. 10A.

Figure 10D:
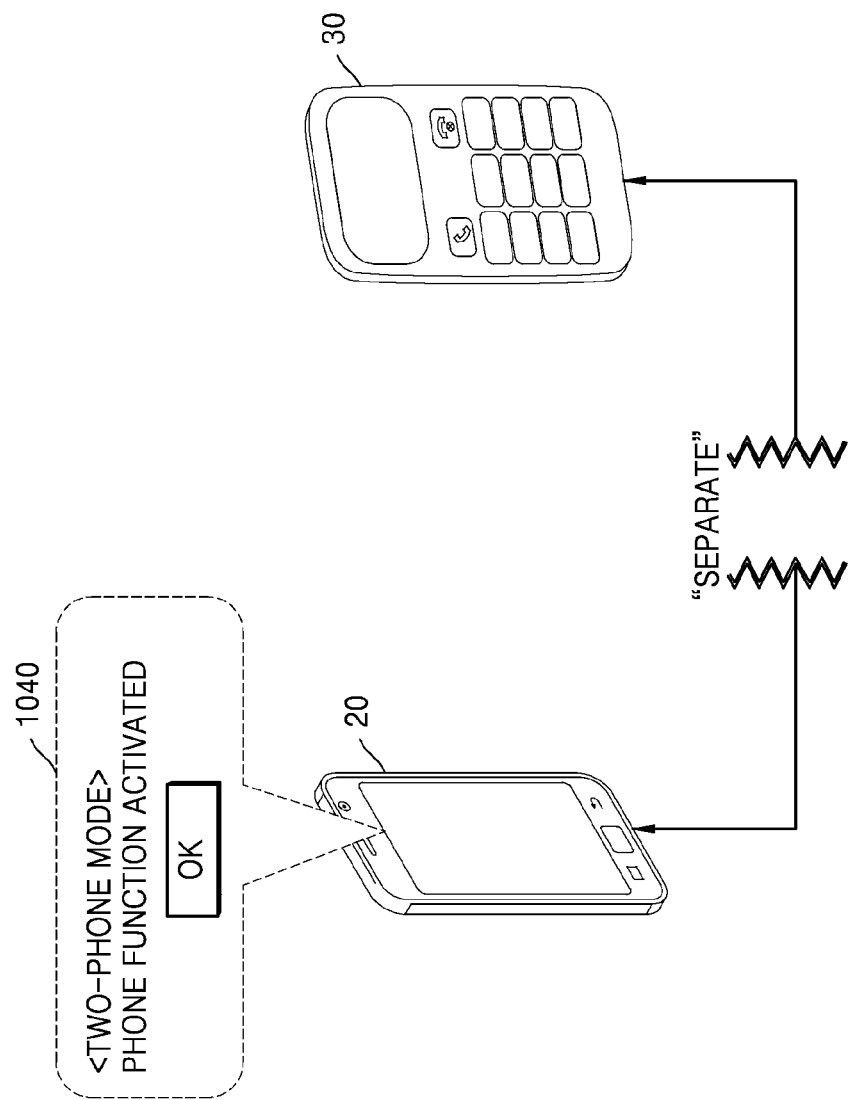
FIG. 10D is a diagram for describing a case in which the phone function of the first mobile device is activated from among the first mobile device and the second mobile device, which are separated from each other in the two-phone mode, according to an exemplary embodiment.

FIG. 10D is a diagram for describing a case in which the phone function of the first mobile device 20 is activated from among the first mobile device 20 and the second mobile device 30, which are separated from each other in the two-phone mode, according to an exemplary embodiment.

Referring to FIG. 10D, the first mobile device 20 may display a UI 1040 indicating that the phone function is activated when the phone function of the first mobile device 20 is activated according to operation 1005 of FIG. 10A.

Figure 10E:
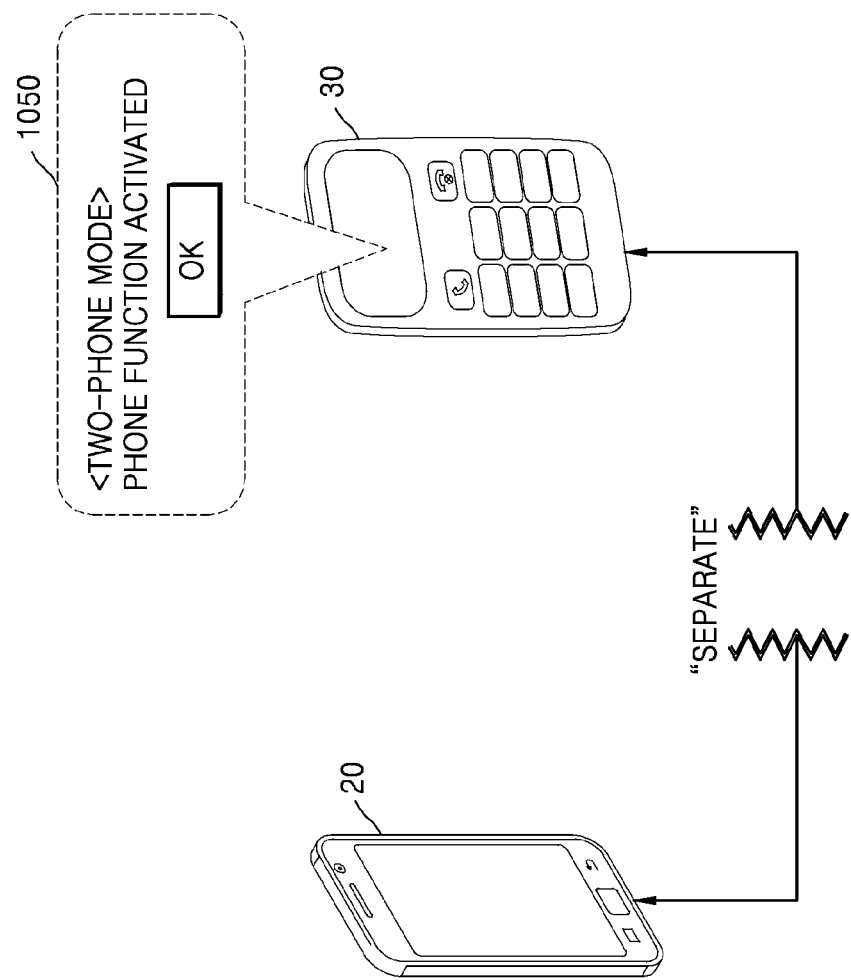
FIG. 10E is a diagram for describing a case in which the phone function of the second mobile device is activated from among the first mobile device and the second mobile device, which are separated from each other in the two-phone mode, according to an exemplary embodiment.

FIG. 10E is a diagram for describing a case in which the phone function of the second mobile device 30 is activated from among the first mobile device 20 and the second mobile device 30, which are separated from each other in the two-phone mode, according to an exemplary embodiment.

Referring to FIG. 10E, the second mobile device 30 may display a UI 1050 indicating that the phone function is activated when the phone function of the second mobile device 30 is activated according to operation 1010 of FIG. 10A.

Figure 11A:
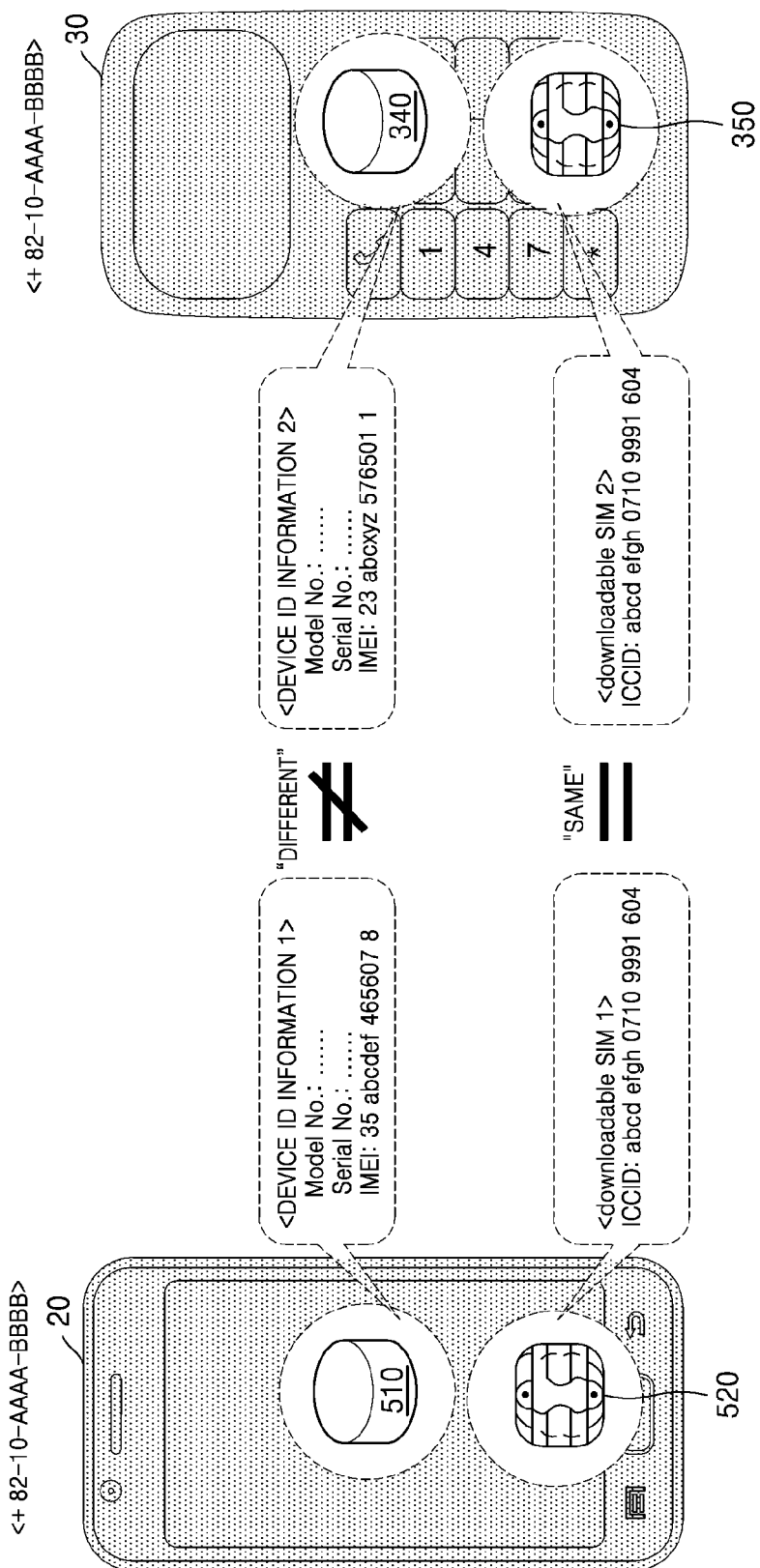
FIG. 11A is a diagram for describing the device ID information and the SIM information, which are stored in each of the first mobile device and the second mobile device, according to another exemplary embodiment.

FIG. 11A is a diagram for describing the device ID information and the SIM information, which are stored in each of the first mobile device 20 and the second mobile device 30, according to another exemplary embodiment.

Referring to FIG. 11A, the same phone number "+82-10-AAAA-BBBB" may be assigned to the first and second mobile devices 20 and 30. In the first device ID information of the first mobile device 20, the IMEI of the first mobile device 20 may have a value "35 abcdef 465607 8." The ICCID of the first SIM information of the first mobile device 20 may have a value "abcd efgh 0710 9991 604." Meanwhile, in the second device ID information of the second mobile device 30, the IMEI of the second mobile device 30 may have a value "23 abcxyz 576501 1," which is different from that of the IMEI of the first device ID information. Also, the ICCID of the second SIM information of the second mobile device 30 may have a value "abcd efgh 0710 9991 604," which is the same as that of the ICCID of the first SIM information.

Referring to FIG. 11A, the first and second mobile devices 20 and 30 assigned with the same phone number "+82-10-AAAA-BBBB" have the same ICCID but different IMEI.

Figure 11B:
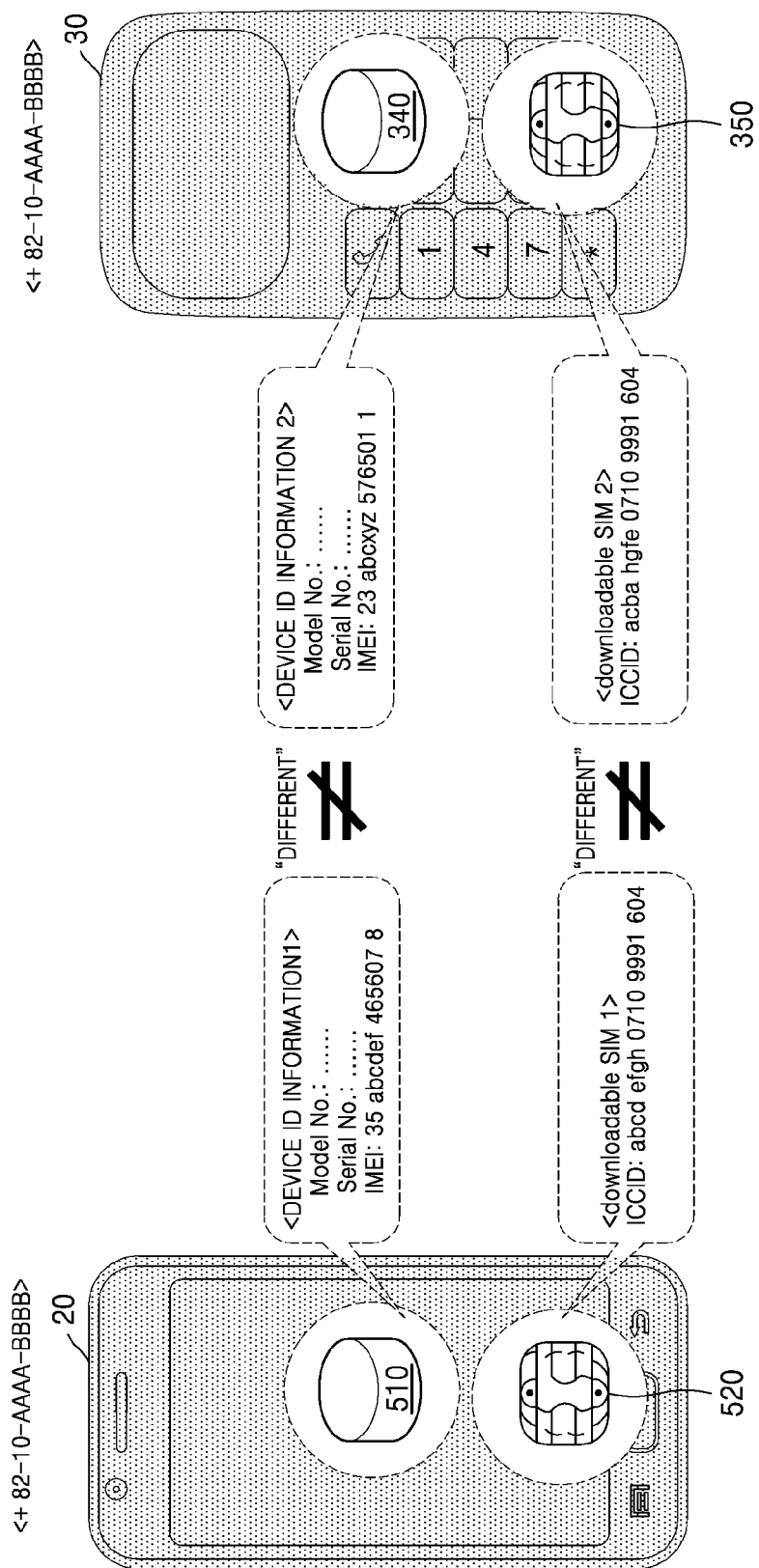
FIG. 11B is a diagram for describing the device ID information and the SIM information, which are stored in each of the first mobile device and the second mobile device, according to another exemplary embodiment.

FIG. 11B is a diagram for describing the device ID information and the SIM information, which are stored in each of the first mobile device 20 and the second mobile device 30, according to another exemplary embodiment.

Referring to FIG. 11B, the same phone number "+82-10-AAAA-BBBB" may be assigned to the first and second mobile devices 20 and 30. In the first device ID information of the first mobile device 20, the IMEI of the first mobile device 20 may have a value "35 abcdef 465607 8." The ICCID of the first SIM information of the first mobile device 20 may have a value "abcd efgh 0710 9991 604." Meanwhile, in the second device ID information of the second mobile device 30, the IMEI of the second mobile device 30 may have a value "23 abcxyz 576501 1," which is different from that of the IMEI of the first device ID information. The ICCID of the second SIM information of the second mobile device 30 may have a value "abcd hgfe 0710 9991 604," which is the different from that of the ICCID of the first SIM information.

Referring to FIG. 11B, the first and second mobile devices 20 and 30 assigned with the same phone number "+82-10-AAAA-BBBB" have the different ICCID and different IMEI.

In the exemplary embodiments described with reference to FIGS. 11A and 11B, the SIMs 520 and 350 included in the first mobile device 20 and the second mobile device 30 may have the same ICCID or different ICCID. Nevertheless, in the exemplary embodiments of FIGS. 11A and 11B, the same phone number "+82-10-AAAA-BBBB" may be assigned to the first and second mobile devices 20 and 30.

FIGS. 12A through 20D are diagrams related to the exemplary embodiments of FIGS. 11A and 11B.

FIGS. 12A through 14D are diagrams for describing various exemplary embodiments according to a first scenario in which the first and second SIM information is not initially respectively stored in the SIMs 520 and 350 of the first and second mobile devices 20 and 30, but is received from the server 10 of the mobile carrier when necessary such that the mobile communication function is performed. The first scenario may be related to various exemplary embodiments in which the first or second mobile device 20 or 30 requests the server 10 of the mobile carrier to transmit or use the first or second SIM information when necessary.

FIGS. 15 through 17D are diagrams for describing various exemplary embodiments according to a second scenario in which the first and second SIM information is initially respectively stored in the SIMs 520 and 350 of the first and second mobile devices 20 and 30, and the mobile communication function is performed as the first or second mobile device 20 or 30 transmits a request to use the first or second SIM information to the server 10 of the mobile carrier when necessary. The second scenario may be related to various exemplary embodiments in which the first or second mobile device 20 or 30 transmits only a request to use the first or second SIM information to the server 10 of the mobile carrier when necessary.

FIGS. 18 through 20D are diagrams for describing various exemplary embodiments according to a third scenario in which SIM information is initially stored in any one of the SIMs 520 and 350 of the first and second mobile devices 20 and 30, and the mobile communication function is performed as the first and second mobile devices 20 and 30 exchanges the SIM information when necessary. The third scenario may be related to various exemplary embodiments in which the first and second mobile devices 20 and 30 exchange the SIM information when necessary.

Figure 12A:
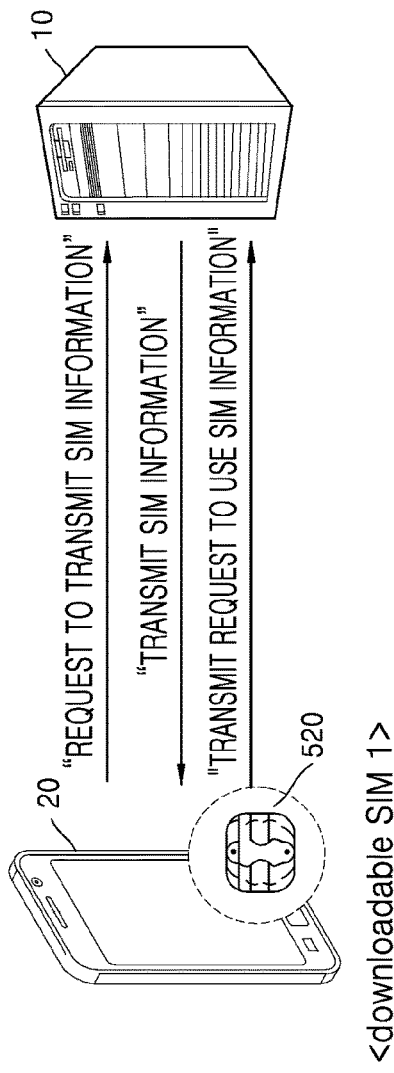
FIGS. 12A and 12B are diagrams for describing a concept of a first scenario in which the first mobile device and the second mobile device, receive SIM information from the server of the mobile carrier and transmit a SIM information use request, according to an exemplary embodiment.
Figure 12B:
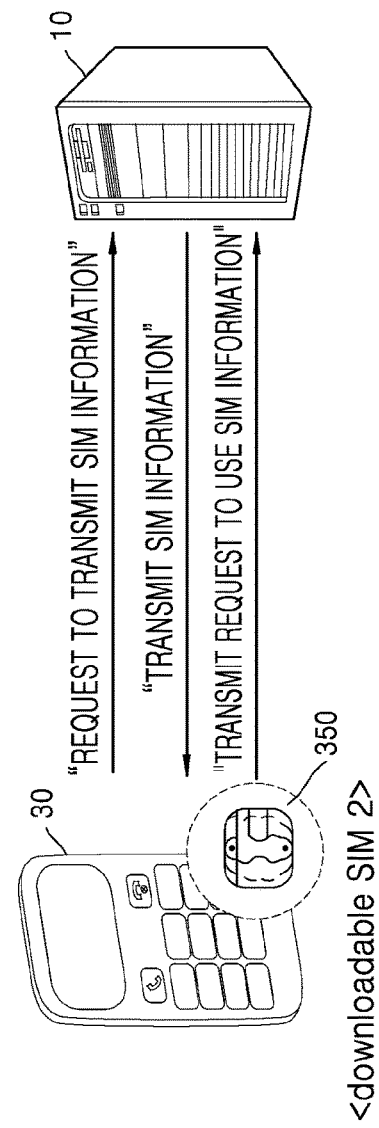

FIGS. 12A and 12B are diagrams for describing a concept of the first scenario in which the first mobile device 20 and the second mobile device 30, which do not store SIM information, receive SIM information from the server 10 of the mobile carrier and transmit a SIM use request, according to an exemplary embodiment.

In FIGS. 12A and 12B, the first and second SIM information are not initially stored in the SIMs 520 and 350 of the first and second mobile devices 20 and 30, respectively.

Referring to FIG. 12A, when the phone function of the first mobile device 20 is requested to be activated in the two-phone mode, the first mobile device 20 requests the server 10 of the mobile carrier to transmit the first SIM information. Accordingly, the server 10 of the mobile carrier transmits the first SIM information to the first mobile device 20, and the first mobile device 20 stores the first SIM information in the SIM 520. Then, the first mobile device 20 transmits a request to use the first SIM information to the server 10 of the mobile carrier. When the server 10 of the mobile carrier approves the request, the first mobile device 20 may perform the mobile communication function in the two-phone mode.

Referring to FIG. 12B, when the phone function of the second mobile device 30 is requested to be activated in the two-phone mode, the second mobile device 30 requests the server 10 of the mobile carrier to transmit the second SIM information. Accordingly, the server 10 of the mobile carrier transmits the second SIM information to the second mobile device, and the second mobile device 30 stores the second SIM information in the SIM 350. Then, the second mobile device 30 transmits a request to use the second SIM information to the server 10 of the mobile carrier. When the server 10 of the mobile carrier approves the request, the second mobile device 30 may perform the mobile communication function in the two-phone mode.

Figure 13A:
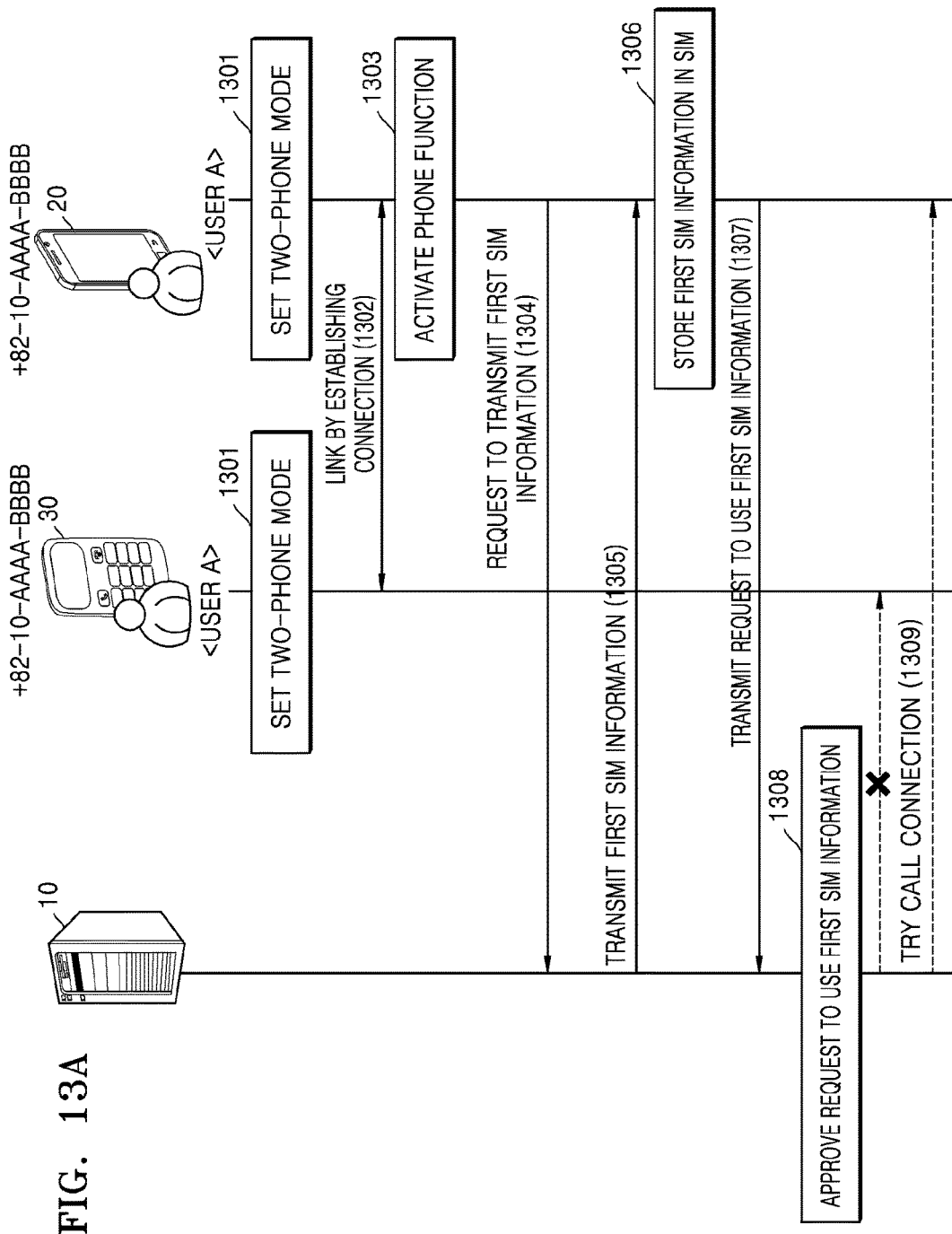
FIG. 13A is a timing diagram of a method of performing a mobile communication function by the first mobile device according to a SIM information transmit request and a SIM information use request of the first mobile device, based on the first scenario while the first mobile device and the second mobile device are linked to each other, according to an exemplary embodiment.

FIG. 13A is a timing diagram of a method of performing the mobile communication function by the first mobile device 20, according to a SIM information transmit request and a SIM information use request of the first mobile device 20, based on the first scenario while the first mobile device 20 and the second mobile device 30 are linked to each other, according to an exemplary embodiment.

In operation 1301, the first mobile device 20 and the second mobile device 30 set the two-phone mode.

In operation 1302, the first and second mobile devices 20 and 30 are linked with each other as a connection is established through short-range wireless communication.

In operation 1303, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1304, the first mobile device 20 requests the server 10 of the mobile carrier to transmit the first SIM information.

In operation 1305, the server 10 of the mobile carrier transmits the first SIM information to the first mobile device 20.

In operation 1306, the first mobile device 20 stores the first SIM information in the SIM 520.

In operation 1307, the first mobile device 20 transmits a request to use the first SIM information to the server 10 of the mobile carrier.

In operation 1308, the server 10 of the mobile carrier approves the request to use the first SIM information.

In operation 1309, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the phone function is not activated and there is no SIM information, a phone call is not connected to the second mobile device 30.

Figure 13B:
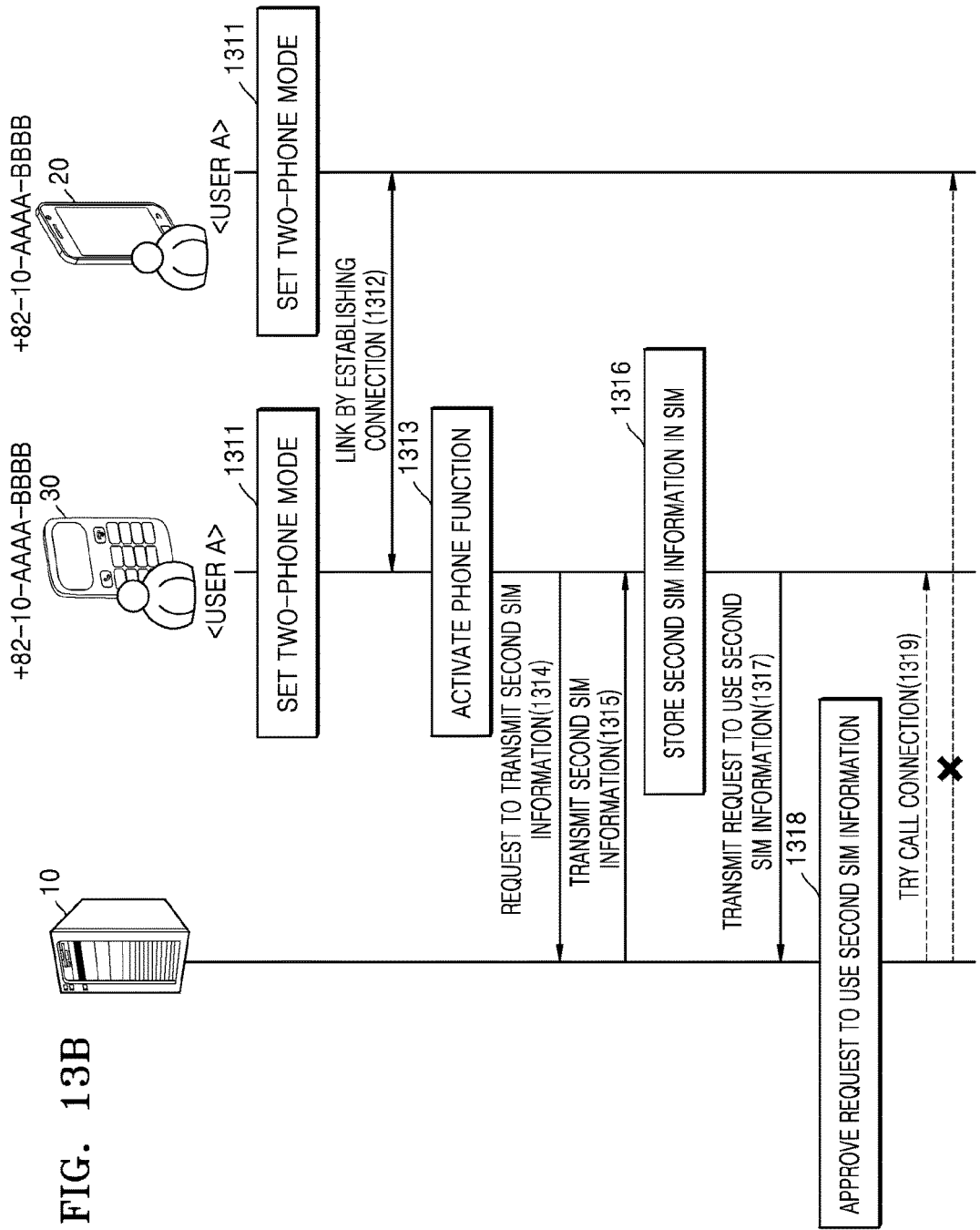
FIG. 13B is a timing diagram of a method of performing a mobile communication function by the second mobile device, according to a SIM information transmit request and a SIM information use request of the second mobile device, based on the first scenario while the first mobile device and the second mobile device are linked to each other, according to an exemplary embodiment.

FIG. 13B is a timing diagram of a method of performing the mobile communication function by the second mobile device 30, according to a SIM information transmit request and a SIM information activation request of the second mobile device 30, based on the first scenario while the first mobile device 20 and the second mobile device 30 are linked to each other, according to an exemplary embodiment.

In operation 1311, the first mobile device 20 and the second mobile device 30 set a two-phone mode.

In operation 1312, the first and second mobile devices 20 and 30 are linked with each other as a connection is established through short-range wireless communication.

In operation 1313, the second mobile device 30 activates the phone function. The second mobile device 30 may activate the phone function manually or automatically. The activating of the phone function of the second mobile device 30 may mean that the user A wants to make a call using the second mobile device 30 that is a sub mobile device.

In operation 1314, the second mobile device 30 requests the server 10 of the mobile carrier to transmit the second SIM information.

In operation 1315, the server 10 of the mobile carrier transmits the second SIM information to the second mobile device 30.

In operation 1316, the second mobile device 30 stores the second SIM information in the SIM 350.

In operation 1317, the second mobile device 30 transmits a request to use the second SIM information to the server 10 of the mobile carrier.

In operation 1318, the server 10 of the mobile carrier approves the request to use the second SIM information.

In operation 1319, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the phone function is not activated and there is no SIM information, a phone call is not connected to the first mobile device 20.

Figure 13C:
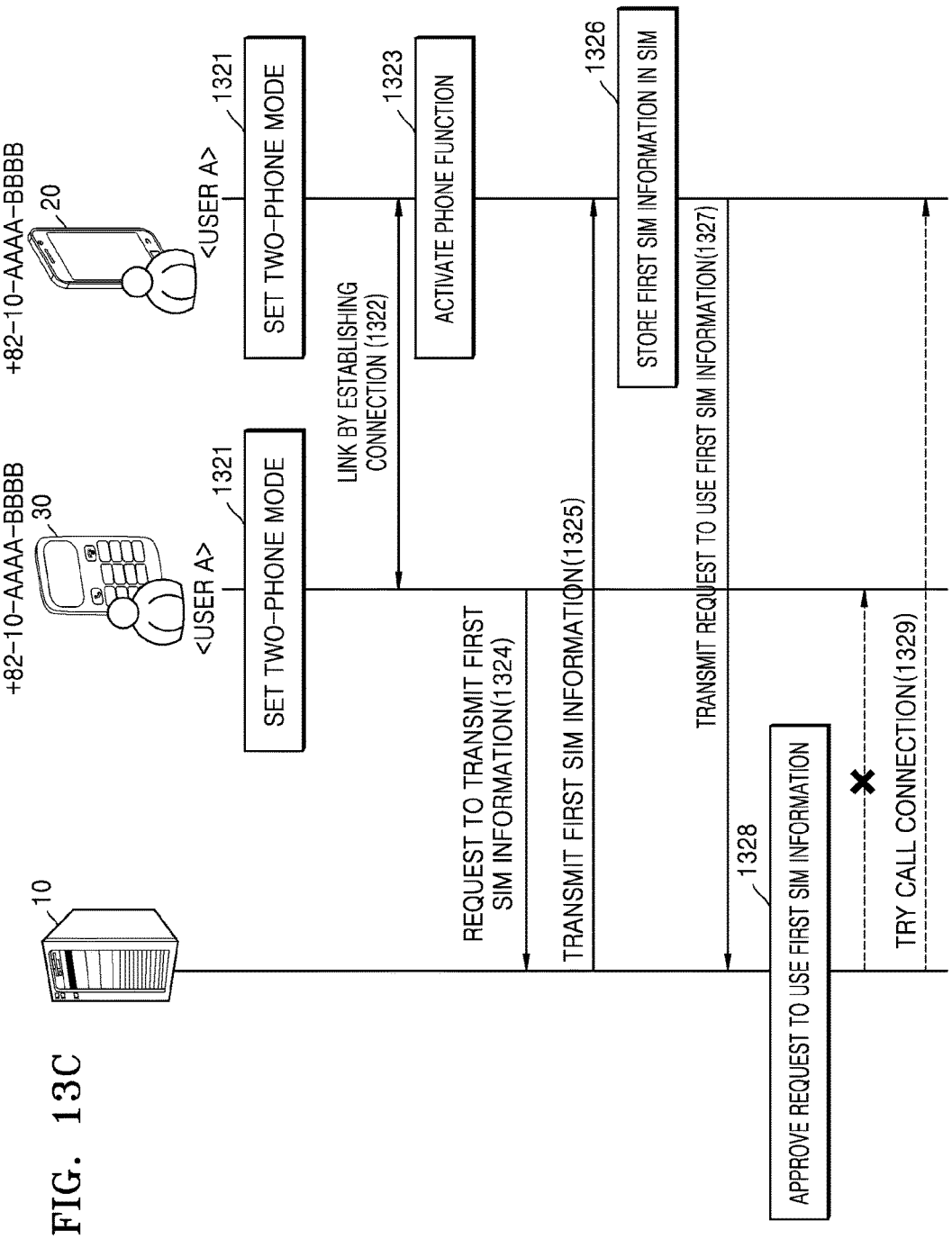
FIG. 13C is a timing diagram of a method of performing a mobile communication function by the first mobile device, according to a SIM information transmit request of the second mobile device and a SIM information use request of the first mobile device, based on the first scenario while the first mobile device and the second mobile device are linked to each other, according to an exemplary embodiment.

FIG. 13C is a timing diagram of a method of performing the mobile communication function by the first mobile device 20, according to a SIM information transmit request of the second mobile device 30 and a SIM information use request of the first mobile device 20, based on the first scenario while the first mobile device 20 and the second mobile device 30 are linked to each other, according to an exemplary embodiment.

In operation 1321, the first mobile device 20 and the second mobile device 30 set the two-phone mode.

In operation 1322, the first mobile device 20 and the second mobile device 30 are linked with each other by establishing a connection through short-range wireless communication.

In operation 1323, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1334, the second mobile device 30 requests the server 10 of the mobile carrier to transmit the first SIM information to the first mobile device 20.

In operation 1325, the server 10 of the mobile carrier transmits the first SIM information to the first mobile device 20.

In operation 1326, the first mobile device 20 stores the first SIM information in the SIM 520.

In operation 1327, the first mobile device 20 transmits a request to use the first SIM information to the server 10 of the mobile carrier.

In operation 1328, the server 10 of the mobile carrier approves the request to use the first SIM information.

In operation 1329, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the phone function is not activated and there is no SIM information, a phone call is not connected to the second mobile device 30.

Figure 13D:
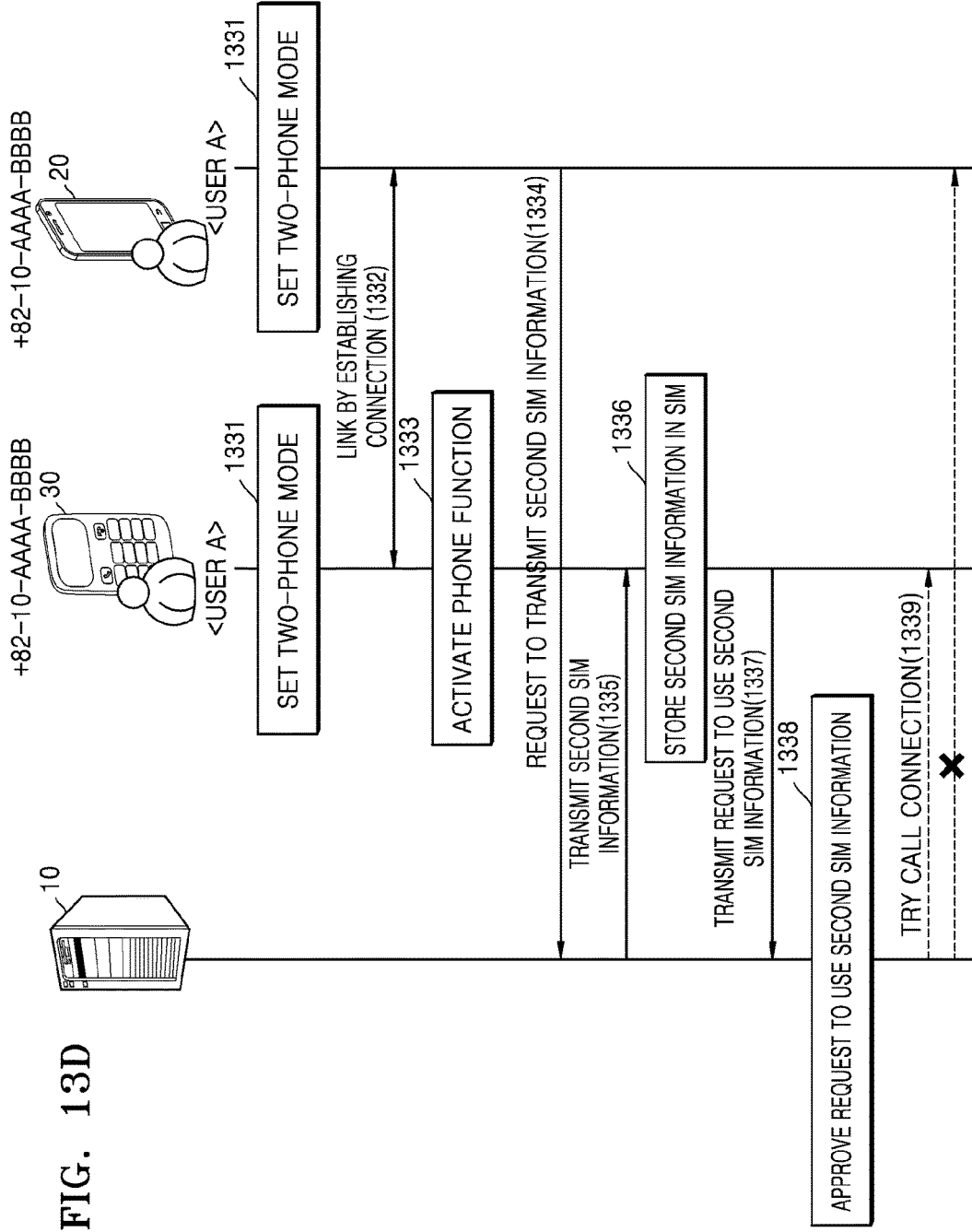
FIG. 13D is a timing diagram of a method of performing a mobile communication function by the second mobile device, according to a SIM information transmit request of the first mobile device and a SIM information use request of the second mobile device, based on the first scenario while the first mobile device and the second mobile device are linked to each other, according to an exemplary embodiment.

FIG. 13D is a timing diagram of a method of performing the mobile communication function by the second mobile device 30, according to a SIM information transmit request of the first mobile device 20 and a SIM information use request of the second mobile device 30, based on the first scenario while the first mobile device 20 and the second mobile device 30 are linked to each other, according to an exemplary embodiment.

In operation 1331, the first mobile device 20 and the second mobile device 30 set a two-phone mode.

In operation 1332, the first and second mobile devices 20 and 30 are linked with each other as a connection is established through short-range wireless communication.

In operation 1333, the second mobile device 30 activates the phone function. The second mobile device 30 may activate the phone function manually or automatically. The activating of the phone function of the second mobile device 30 may mean that the user A wants to make a call using the second mobile device 30 that is a sub mobile device instead of the first mobile device 20 that is a main mobile device.

In operation 1334, the first mobile device 20 requests the server 10 of the mobile carrier to transmit the second SIM information to the second mobile device 30.

In operation 1335, the server 10 of the mobile carrier transmits the second SIM information to the second mobile device 30.

In operation 1336, the second mobile device 30 stores the second SIM information in the SIM 350.

In operation 1337, the second mobile device 30 transmits a request to use the second SIM information to the server 10 of the mobile carrier.

In operation 1338, the server 10 of the mobile carrier approves the request to use the second SIM information.

In operation 1339, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the phone function is not activated and there is no SIM information, a phone call is not connected to the first mobile device 20.

Figure 14A:
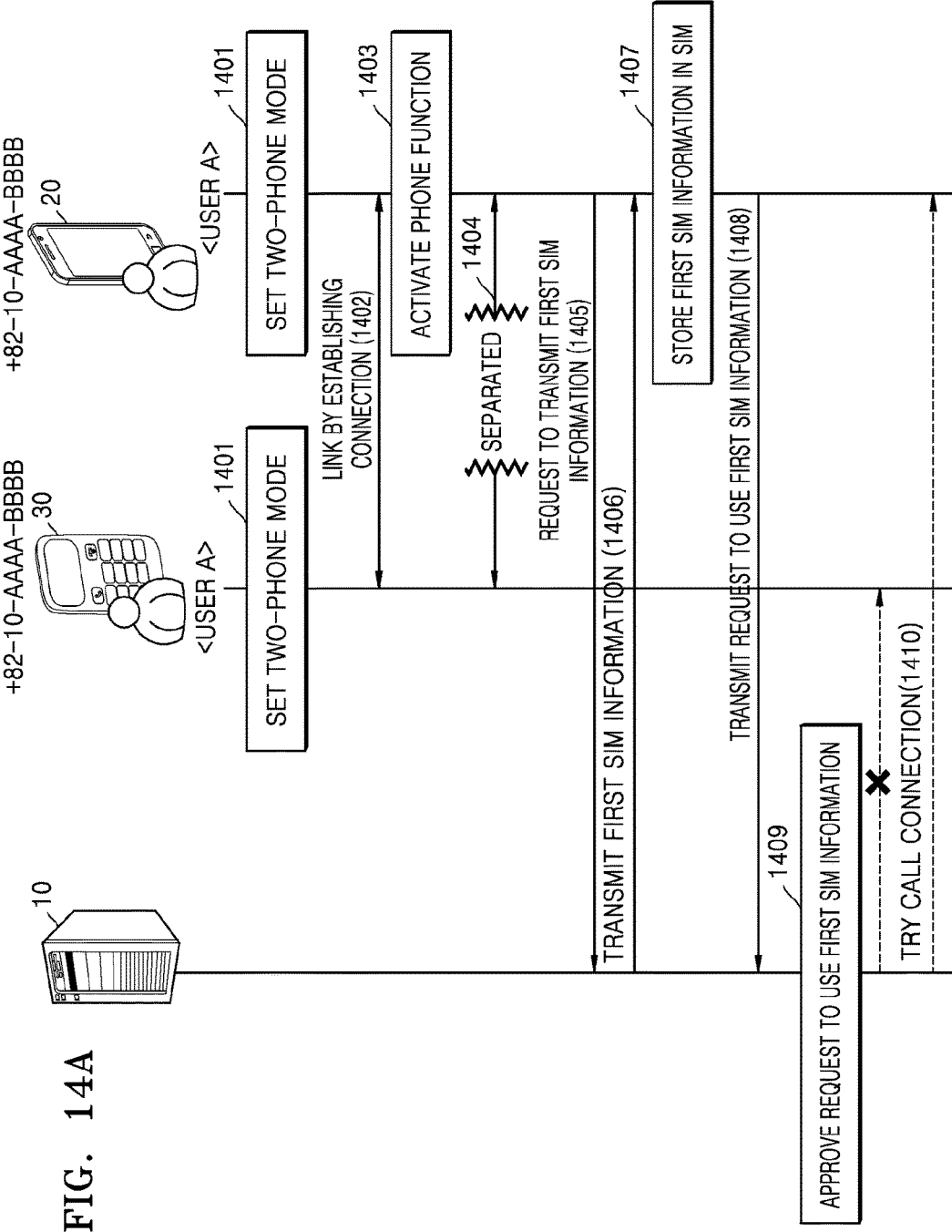
FIG. 14A is a timing diagram of a method of performing a mobile communication function by the first mobile device, according to a SIM information transmit request and a SIM information use request of the first mobile device, based on the first scenario while the first mobile device and the second mobile device are separated from each other, according to an exemplary embodiment.

FIG. 14A is a timing diagram of a method of performing the mobile communication function by the first mobile device 20, according to a SIM information transmit request and a SIM information use request of the first mobile device 20, based on the first scenario while the first mobile device 20 and the second mobile device 30 are separated from each other, according to an exemplary embodiment.

In operation 1401, the first mobile device 20 and the second mobile device 30 set the two-phone mode.

In operation 1402, the first and second mobile devices 20 and 30 are linked with each other as a connection is established through short-range wireless communication.

In operation 1403, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1404, the first and second mobile devices 20 and 30 are separated from each other by terminating the connection through the short-range wireless communication.

In operation 1405, the first mobile device 20 requests the server 10 of the mobile carrier to transmit the first SIM information.

In operation 1406, the server 10 of the mobile carrier transmits the first SIM information to the first mobile device 20.

In operation 1407, the first mobile device 20 stores the first SIM information in the SIM 520.

In operation 1408, the first mobile device 20 transmits a request to use the first SIM information to the server 10 of the mobile carrier.

In operation 1409, the server 10 of the mobile carrier approves the request to use the first SIM information.

In operation 1410, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the phone function is not activated and there is no SIM information, a phone call is not connected to the second mobile device 30.

Figure 14B:
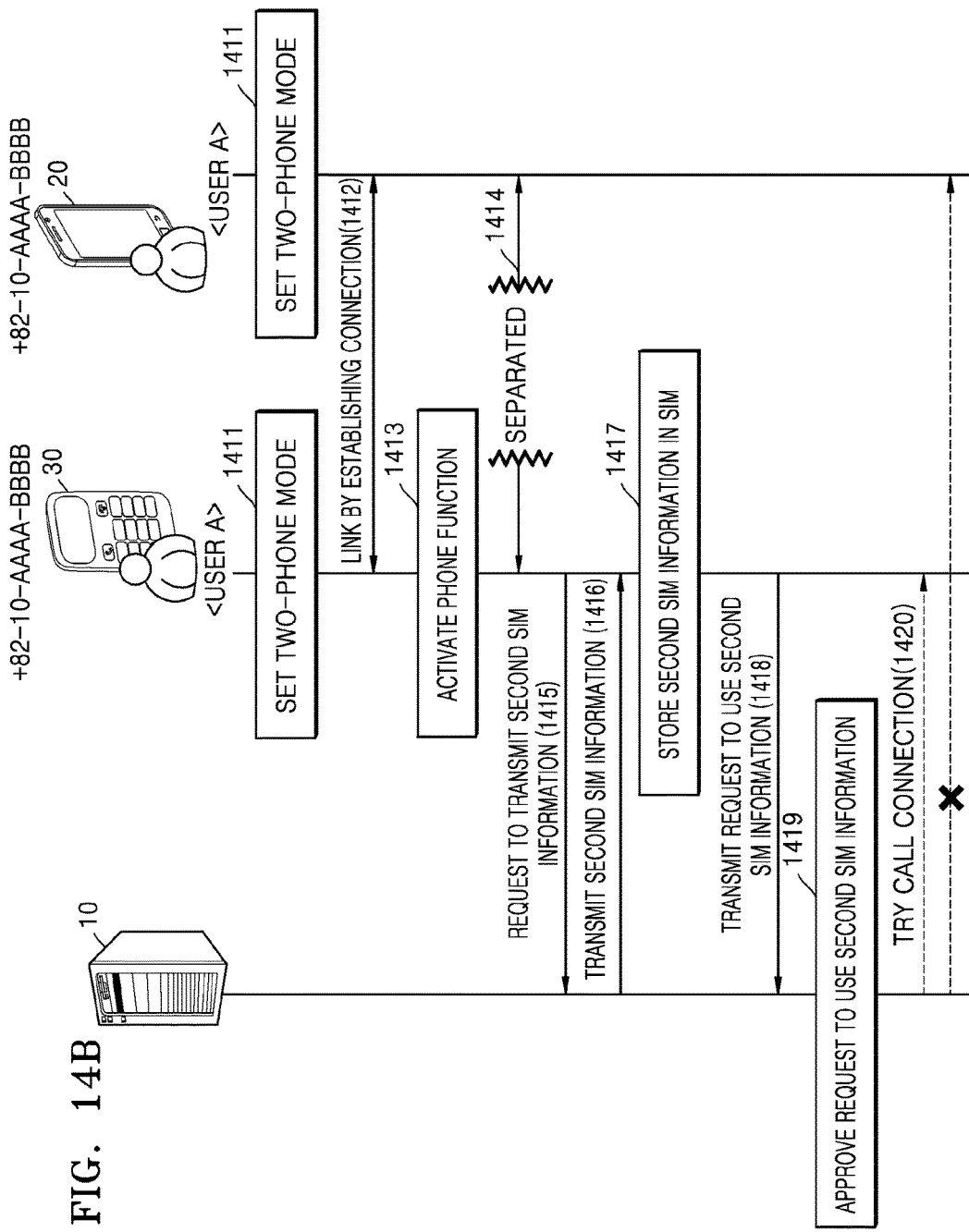
FIG. 14B is a timing diagram of a method of performing a mobile communication function by the second mobile device, according to a SIM information transmit request and a SIM information use request of the second mobile device, based on the first scenario while the first mobile device and the second mobile device are separated from each other, according to an exemplary embodiment.

FIG. 14B is a timing diagram of a method of performing the mobile communication function by the second mobile device 30, according to a SIM information transmit request and a SIM information use request of the second mobile device 30, based on the first scenario while the first mobile device 20 and the second mobile device 30 are separated from each other, according to an exemplary embodiment.

In operation 1411, the first mobile device 20 and the second mobile device 30 set the two-phone mode.

In operation 1412, the first and second mobile devices 20 and 30 are linked with each other as a connection is established through short-range wireless communication.

In operation 1413, the second mobile device 30 activates the phone function. The second mobile device 30 may activate the phone function manually or automatically. The activating of the phone function of the second mobile device 30 may mean that the user A wants to make a call using the second mobile device 30 that is a main mobile device instead of the first mobile device 20 that is a main mobile device.

In operation 1414, the first and second mobile devices 20 and 30 are separated from each other by terminating the connection through the short-range wireless communication.

In operation 1415, the second mobile device 20 requests the server 10 of the mobile carrier to transmit the second SIM information.

In operation 1416, the server 10 of the mobile carrier transmits the second SIM information to the second mobile device 30.

In operation 1417, the second mobile device 30 stores the second SIM information in the SIM 350.

In operation 1418, the second mobile device 20 transmits a request to use the second SIM information to the server 10 of the mobile carrier.

In operation 1419, the server 10 of the mobile carrier approves the request to use the second SIM information.

In operation 1420, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the phone function is not activated and there is no SIM information, a phone call is not connected to the first mobile device 20.

Figure 14C:
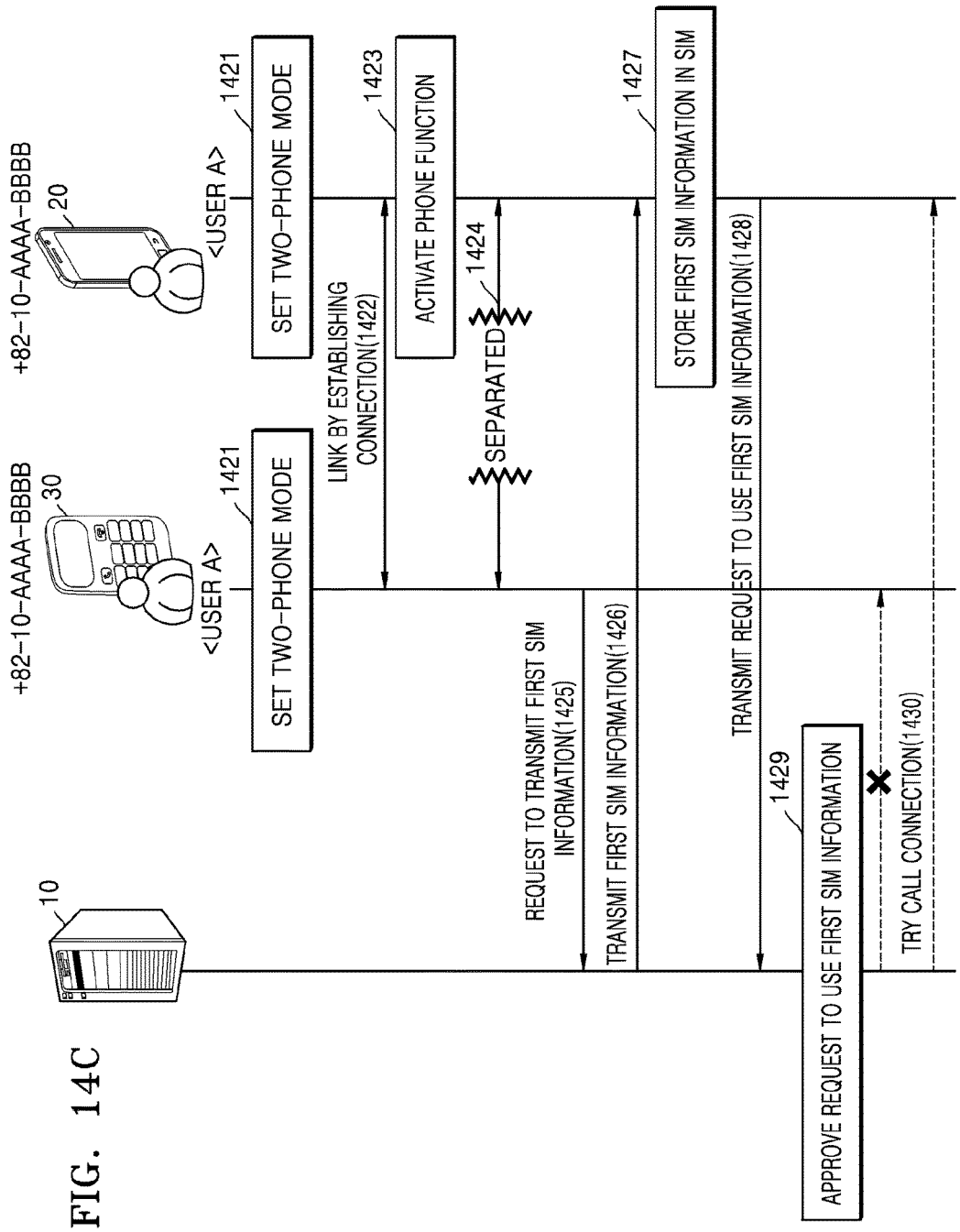
FIG. 14C is a timing diagram of a method of performing a mobile communication function by the first mobile device, according to a SIM information transmit request of the second mobile device and a SIM information use request of the first mobile device, based on the first scenario while the first mobile device and the second mobile device are separated from each other, according to an exemplary embodiment.

FIG. 14C is a timing diagram of a method of performing the mobile communication function by the first mobile device 20, according to a SIM information transmit request of the second mobile device 30 and a SIM information use request of the first mobile device 20, based on the first scenario while the first mobile device 20 and the second mobile device 30 are separated from each other, according to an exemplary embodiment.

In operation 1421, the first mobile device 20 and the second mobile device 30 set the two-phone mode.

In operation 1422, the first mobile device 20 and the second mobile device 30 are linked with each other by establishing a connection through short-range wireless communication.

In operation 1423, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1424, the first and second mobile devices 20 and 30 are separated from each other by terminating the connection through the short-range wireless communication.

In operation 1425, the second mobile device 30 requests the server 10 of the mobile carrier to transmit the first SIM information to the first mobile device 20.

In operation 1426, the server 10 of the mobile carrier transmits the first SIM information to the first mobile device 20.

In operation 1427, the first mobile device 20 stores the first SIM information in the SIM 520.

In operation 1428, the first mobile device 20 transmits a request to use the first SIM information to the server 10 of the mobile carrier.

In operation 1429, the server 10 of the mobile carrier approves the request to use the first SIM information.

In operation 1430, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the phone function is not activated and there is no SIM information, a phone call is not connected to the second mobile device 30.

Figure 14D:
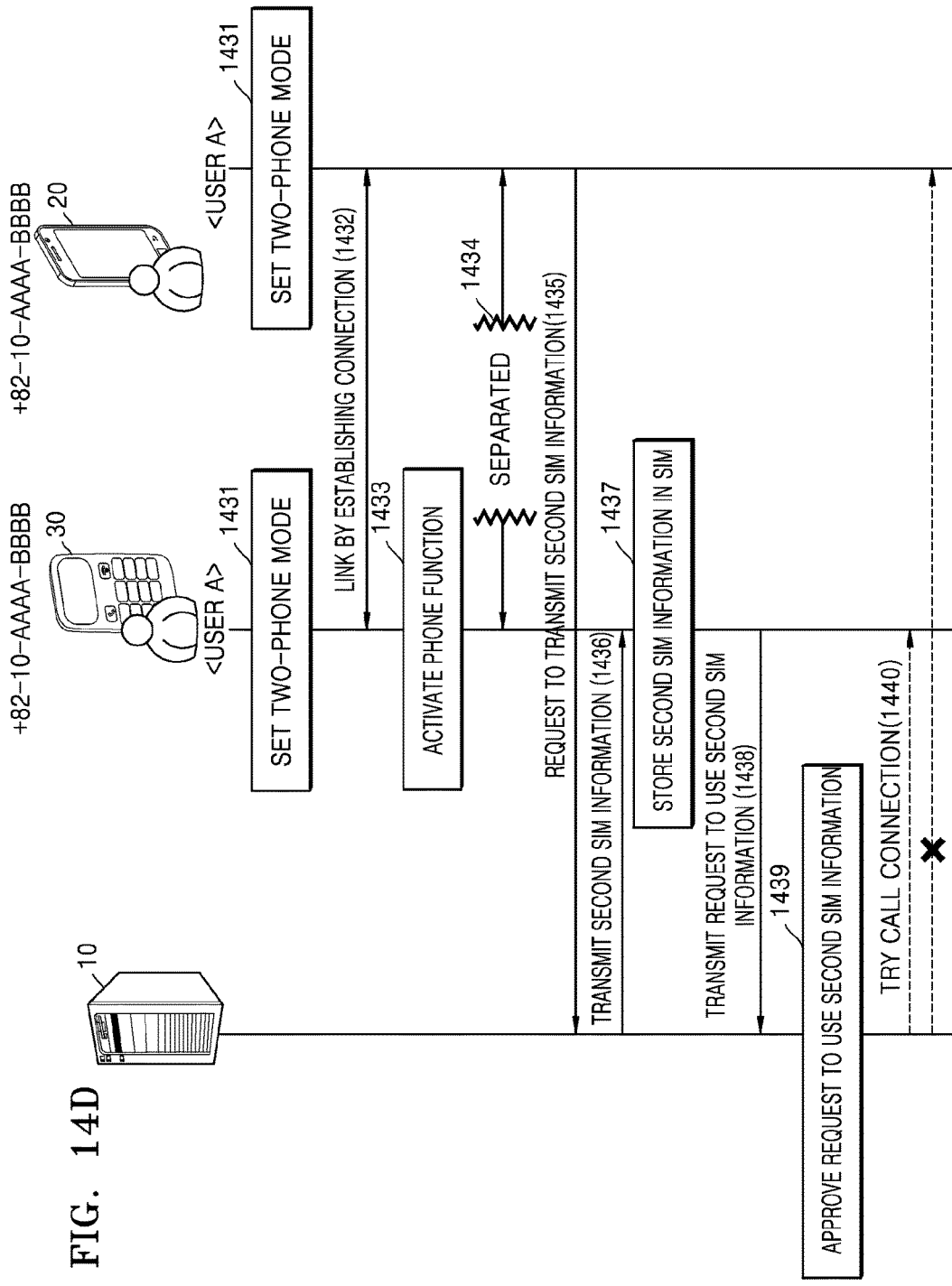
FIG. 14D is a timing diagram of a method of performing a mobile communication function by the second mobile device, according to a SIM information transmit request of the first mobile device and a SIM information use request of the second mobile device, based on the first scenario while the first mobile device and the second mobile device are separated from each other, according to an exemplary embodiment.

FIG. 14D is a timing diagram of a method of performing the mobile communication function by the second mobile device 30, according to a SIM information transmit request of the first mobile device 20 and a SIM information use request of the second mobile device 30, based on the first scenario while the first mobile device 20 and the second mobile device 30 are separated from each other, according to an exemplary embodiment.

In operation 1431, the first mobile device 20 and the second mobile device 30 set a two-phone mode.

In operation 1432, the first and second mobile devices 20 and 30 are linked with each other as a connection is established through short-range wireless communication.

In operation 1433, the second mobile device 30 activates the phone function. The second mobile device 30 may activate the phone function manually or automatically. The activating of the phone function of the second mobile device 30 may mean that the user A wants to make a call using the second mobile device 30 that is a sub mobile device instead of the first mobile device 20 that is a main mobile device.

In operation 1434, the first and second mobile devices 20 and 30 are separated from each other by terminating the connection through the short-range wireless communication.

In operation 1435, the first mobile device 20 requests the server 10 of the mobile carrier to transmit the second SIM information to the second mobile device 30.

In operation 1436, the server 10 of the mobile carrier transmits the second SIM information to the second mobile device 30.

In operation 1437, the second mobile device 30 stores the second SIM information in the SIM 350.

In operation 1438, the second mobile device 30 transmits a request to use the second SIM information to the server 10 of the mobile carrier.

In operation 1439, the server 10 of the mobile carrier approves the request to use the second SIM information.

In operation 1440, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the phone function is not activated and there is no SIM information, a phone call is not connected to the first mobile device 20.

Figure 15:
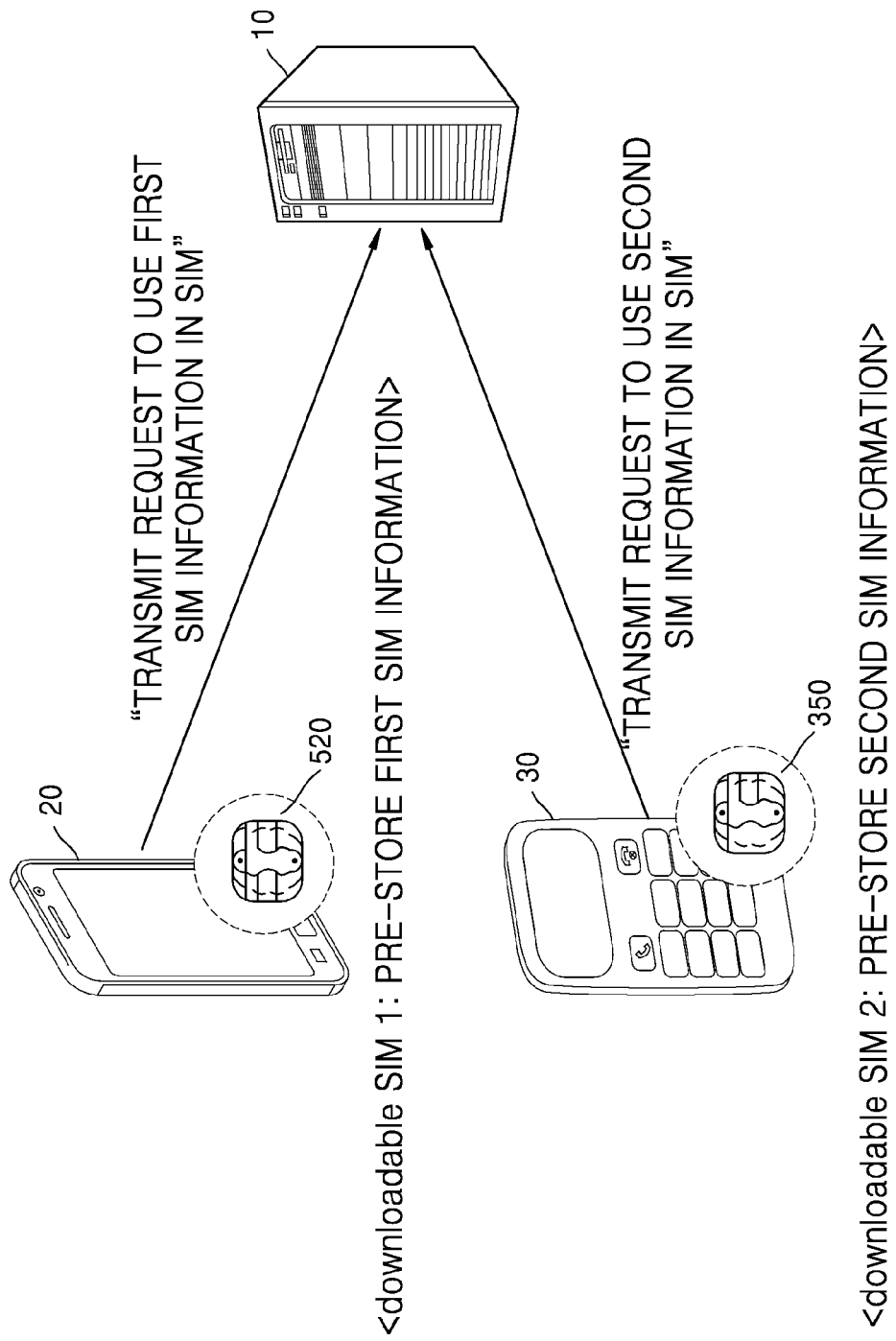
FIG. 15 is a diagram for describing a concept of a second scenario in which the first mobile device and the second mobile device, which pre-store SIM information, transmit a SIM use request to the server of the mobile carrier, according to an exemplary embodiment.

FIG. 15 is a diagram for describing a concept of the second scenario in which the first mobile device 20 and the second mobile device 30, which pre-store SIM information, transmits a SIM information use request to the server 10 of the mobile carrier, according to an exemplary embodiment.

Referring to FIG. 15, the first and second mobile devices 20 and 30 pre-store the first and second SIM information in the SIMs 520 and 350, respectively. For example, before the two-phone mode is activated, the first and second mobile devices 20 and 30 pre-download the first and second SIM information from the server 10 of the mobile carrier and store the first and second SIM information in the SIMs 520 and 350, respectively. The SIMs 520 and 350 may pre-store the first and second SIM information respectively, regardless of an activation status of the phone functions of the first and second mobile devices 20 and 30.

When the phone function of the first mobile device 20 is requested to be activated in the two-phone mode, the first mobile device 20 transmits a request to use the first SIM information to the server 10 of the mobile carrier. When the server 10 of the mobile carrier approves the request to use the first SIM information, the first mobile device 20 may perform the mobile communication function in the two-phone mode.

When the phone function of the second mobile device 30 is requested to be activated in the two-phone mode, the second mobile device 30 transmits a request to use the second SIM information to the server 10 of the mobile carrier. When the server 10 of the mobile carrier approves the request to use the second SIM information, the second mobile device 30 may perform the mobile communication function in the two-phone mode.

Figure 16A:
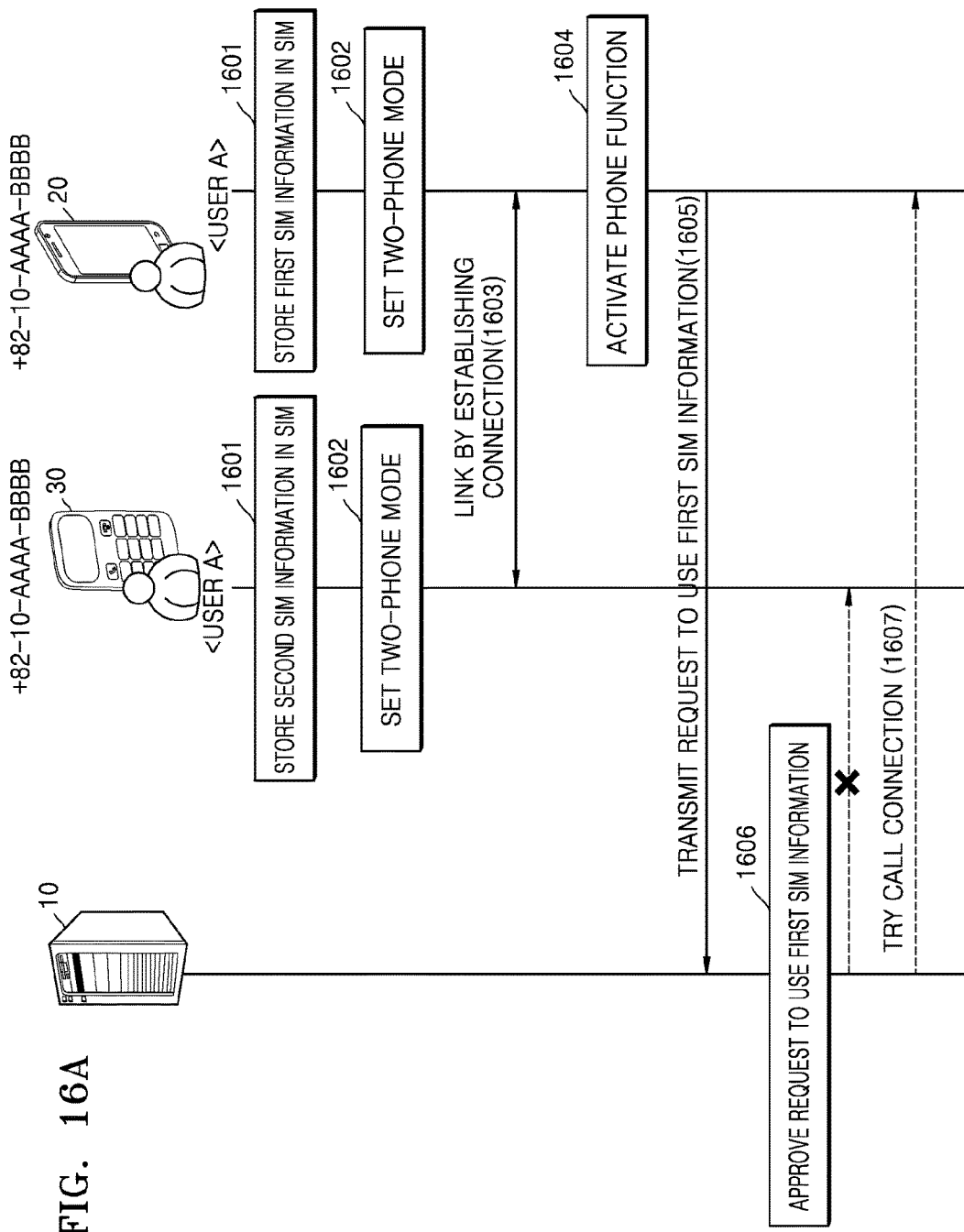
FIG. 16A is a timing diagram of a method of performing a mobile communication function by the first mobile device, according to a SIM information use request of the first mobile device, based on the second scenario while the first mobile device and the second mobile device are linked to each other, according to an exemplary embodiment.

FIG. 16A is a timing diagram of a method of performing the mobile communication function by the first mobile device 20, according to a SIM information use request of the first mobile device 20, based on the second scenario while the first mobile device 20 and the second mobile device 30 are linked to each other, according to an exemplary embodiment.

In operation 1601, the first mobile device 20 stores the first SIM information in the SIM 520. Also, the second mobile device 30 stores the second SIM information in the SIM 350.

In operation 1602, the first mobile device 20 and the second mobile device 30 set the two-phone mode.

In operation 1603, the first and second mobile devices 20 and 30 are linked with each other by establishing a connection through short-range wireless communication.

In operation 1604, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1605, the first mobile device 20 transmits a request to use the first SIM information to the server 10 of the mobile carrier.

In operation 1606, the server 10 of the mobile carrier approves the request to use the first SIM information.

In operation 1607, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the second SIM information is not requested to be used, a phone call is not connected to the second mobile device 30.

Figure 16B:
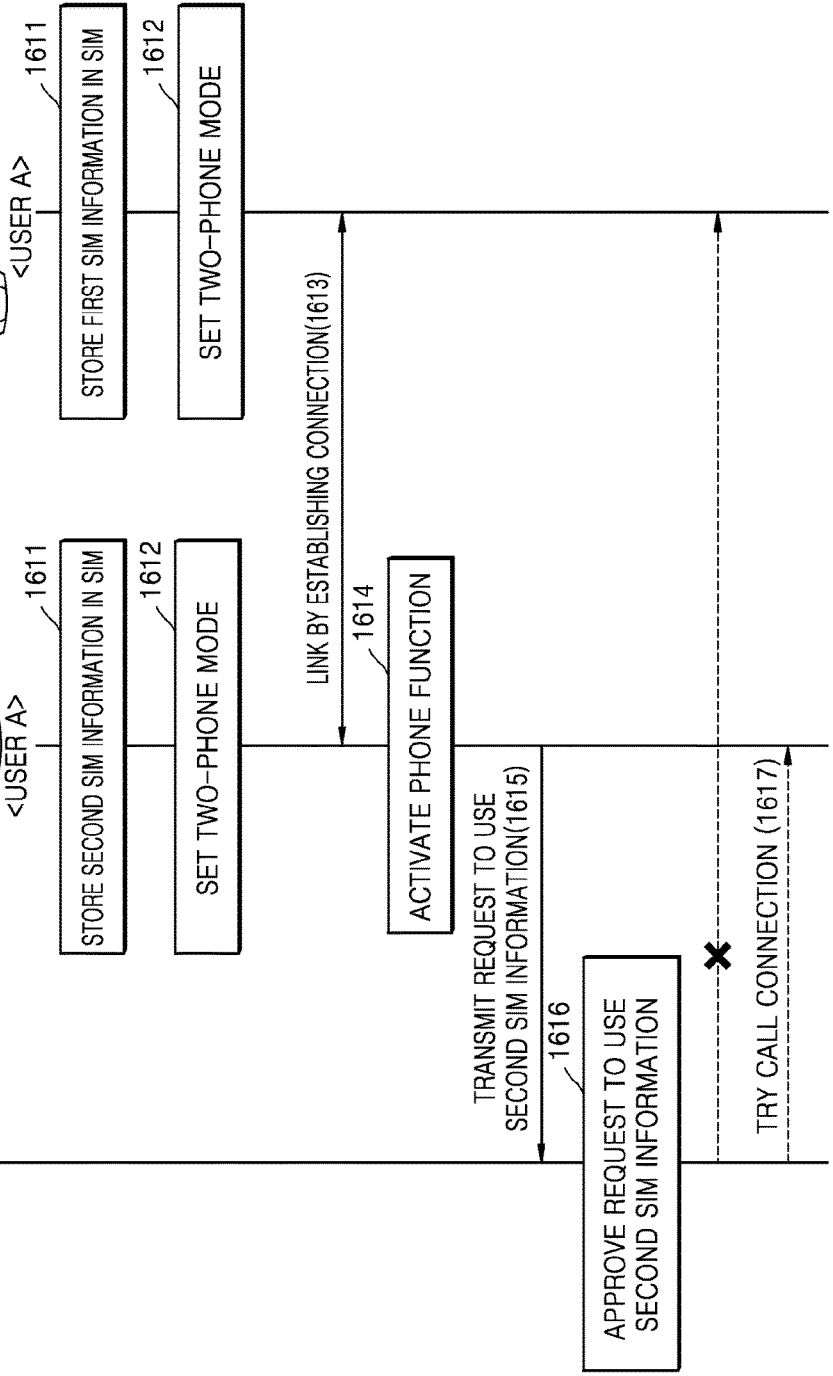
FIG. 16B is a timing diagram of a method of performing a mobile communication function by the second mobile device, according to a SIM information use request of the second mobile device, based on the second scenario while the first mobile device and the second mobile device are linked to each other, according to an exemplary embodiment.

FIG. 16B is a timing diagram of a method of performing the mobile communication function by the second mobile device 30, according to a SIM information use request of the second mobile device 30, based on the second scenario while the first mobile device 20 and the second mobile device 30 are linked to each other, according to an exemplary embodiment.

In operation 1611, the first mobile device 20 stores the first SIM information in the SIM 520. Also, the second mobile device 30 stores the second SIM information in the SIM 350.

In operation 1612, the first mobile device 20 and the second mobile device 30 set the two-phone mode.

In operation 1613, the first and second mobile devices 20 and 30 are linked with each other by establishing a connection through short-range wireless communication.

In operation 1614, the second mobile device 20 activates the phone function. The second mobile device 20 may activate the phone function manually or automatically. The activating of the phone function of the second mobile device 30 may mean that the user A wants to make a call using the second mobile device 30 that is a sub mobile device instead of the first mobile device 20 that is a main mobile device.

In operation 1615, the second mobile device 30 transmits a request to use the second SIM information to the server 10 of the mobile carrier.

In operation 1616, the server 10 of the mobile carrier approves the request to use the second SIM information.

In operation 1617, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the first SIM information is not requested to be used, a phone call is not connected to the first mobile device 20.

Figure 16C:
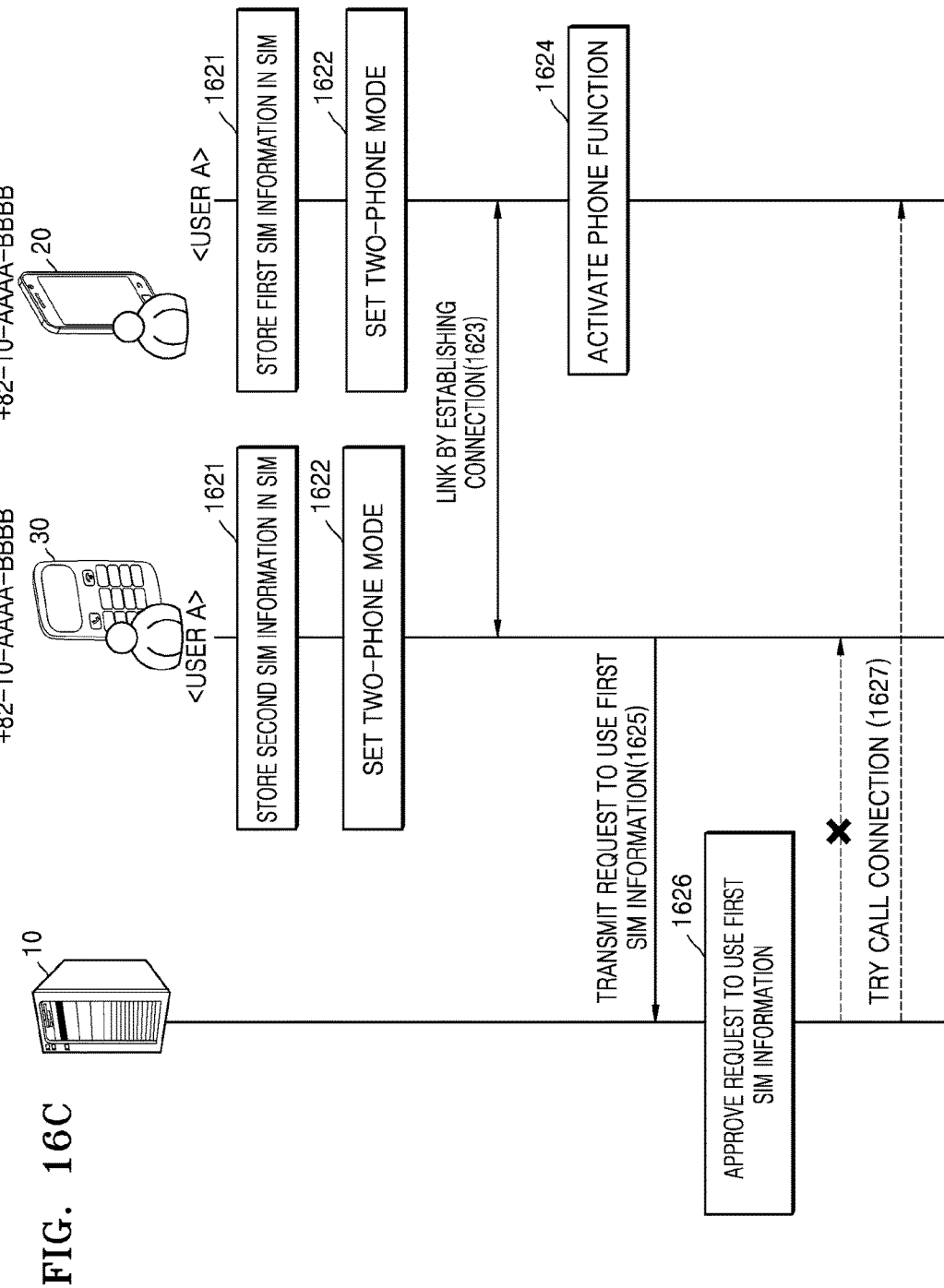
FIG. 16C is a timing diagram of a method of performing a mobile communication function by the first mobile device, according to a SIM information use request of the second mobile device, based on the second scenario while the first mobile device and the second mobile device are linked to each other, according to an exemplary embodiment.

FIG. 16C is a timing of a method of performing the mobile communication function by the first mobile device 20, according to a SIM information use request of the second mobile device 30, based on the second scenario while the first mobile device 20 and the second mobile device 30 are linked to each other, according to an exemplary embodiment.

In operation 1621, the first mobile device 20 stores the first SIM information in the SIM 520. Also, the second mobile device 30 stores the second SIM information in the SIM 350.

In operation 1622, the first mobile device 20 and the second mobile device 30 set the two-phone mode.

In operation 1623, the first and second mobile devices 20 and 30 are linked with each other by establishing a connection through short-range wireless communication.

In operation 1624, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1625, the second mobile device 30 transmits a request to use the first SIM information to the server 10 of the mobile carrier.

In operation 1626, the server 10 of the mobile carrier approves the request to use the first SIM information.

In operation 1627, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the second SIM information is not requested to be used, a phone call is not connected to the second mobile device 30.

Figure 16D:
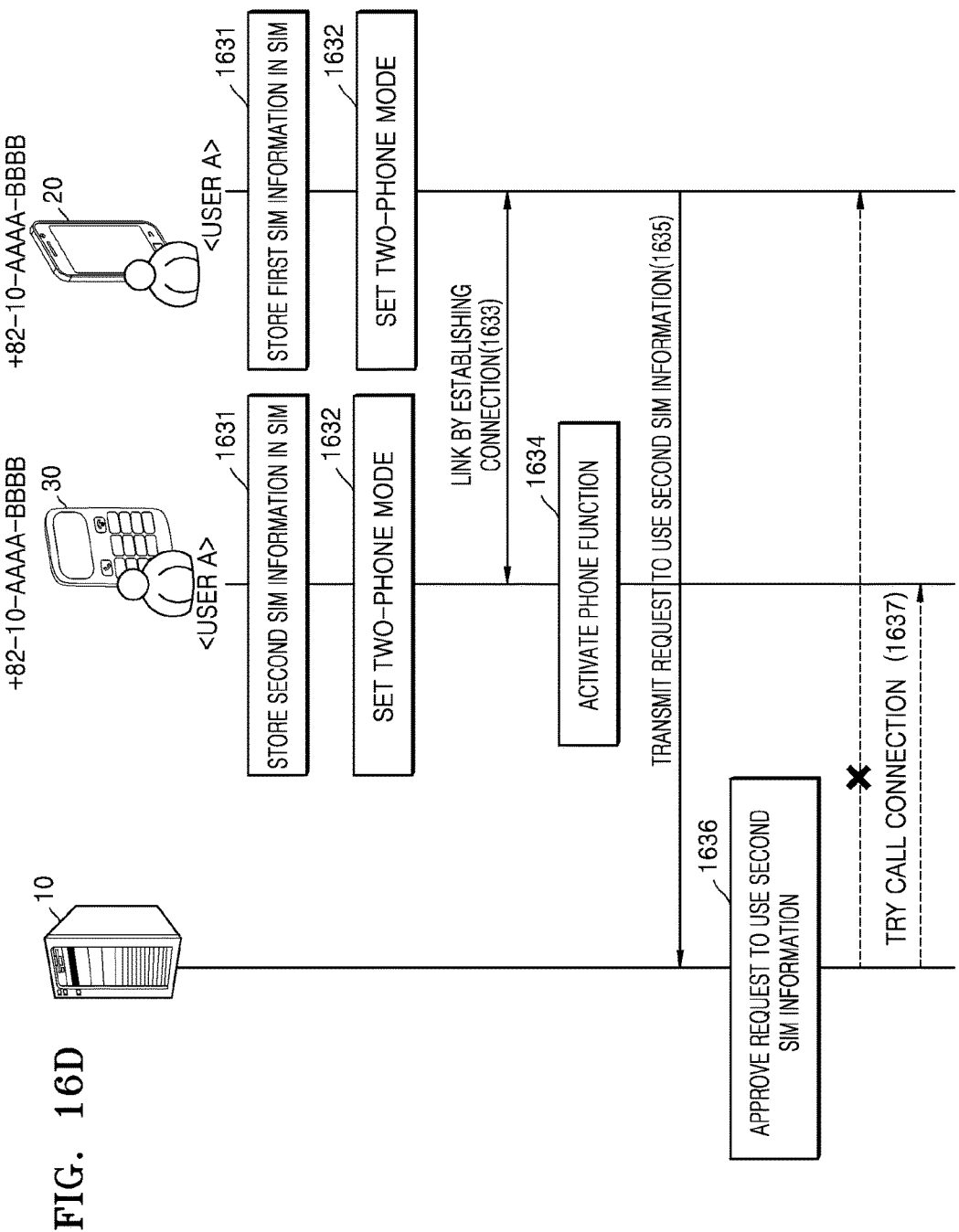
FIG. 16D is a timing diagram of a method of performing a mobile communication function by the second mobile device, according to a SIM information use request of the first mobile device, based on the second scenario while the first mobile device and the second mobile device are linked to each other, according to an exemplary embodiment.

FIG. 16D is a timing diagram of a method of performing the mobile communication function by the second mobile device 30, according to a SIM information use request of the first mobile device 20, based on the second scenario while the first mobile device 20 and the second mobile device 30 are linked to each other, according to an exemplary embodiment.

In operation 1631, the first mobile device 20 stores the first SIM information in the SIM 520. Also, the second mobile device 30 stores the second SIM information in the SIM 350.

In operation 1632, the first mobile device 20 and the second mobile device 30 set the two-phone mode.

In operation 1633, the first and second mobile devices 20 and 30 are linked with each other by establishing a connection through short-range wireless communication.

In operation 1634, the second mobile device 20 activates the phone function. The second mobile device 20 may activate the phone function manually or automatically. The activating of the phone function of the second mobile device 30 may mean that the user A wants to make a call using the second mobile device 30 that is a sub mobile device instead of the first mobile device 20 that is a main mobile device.

In operation 1635, the first mobile device 20 transmits a request to use the second SIM information to the server 10 of the mobile carrier.

In operation 1636, the server 10 of the mobile carrier approves the request to use the second SIM information.

In operation 1637, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the first SIM information is not requested to be used, a phone call is not connected to the first mobile device 20.

Figure 17A:
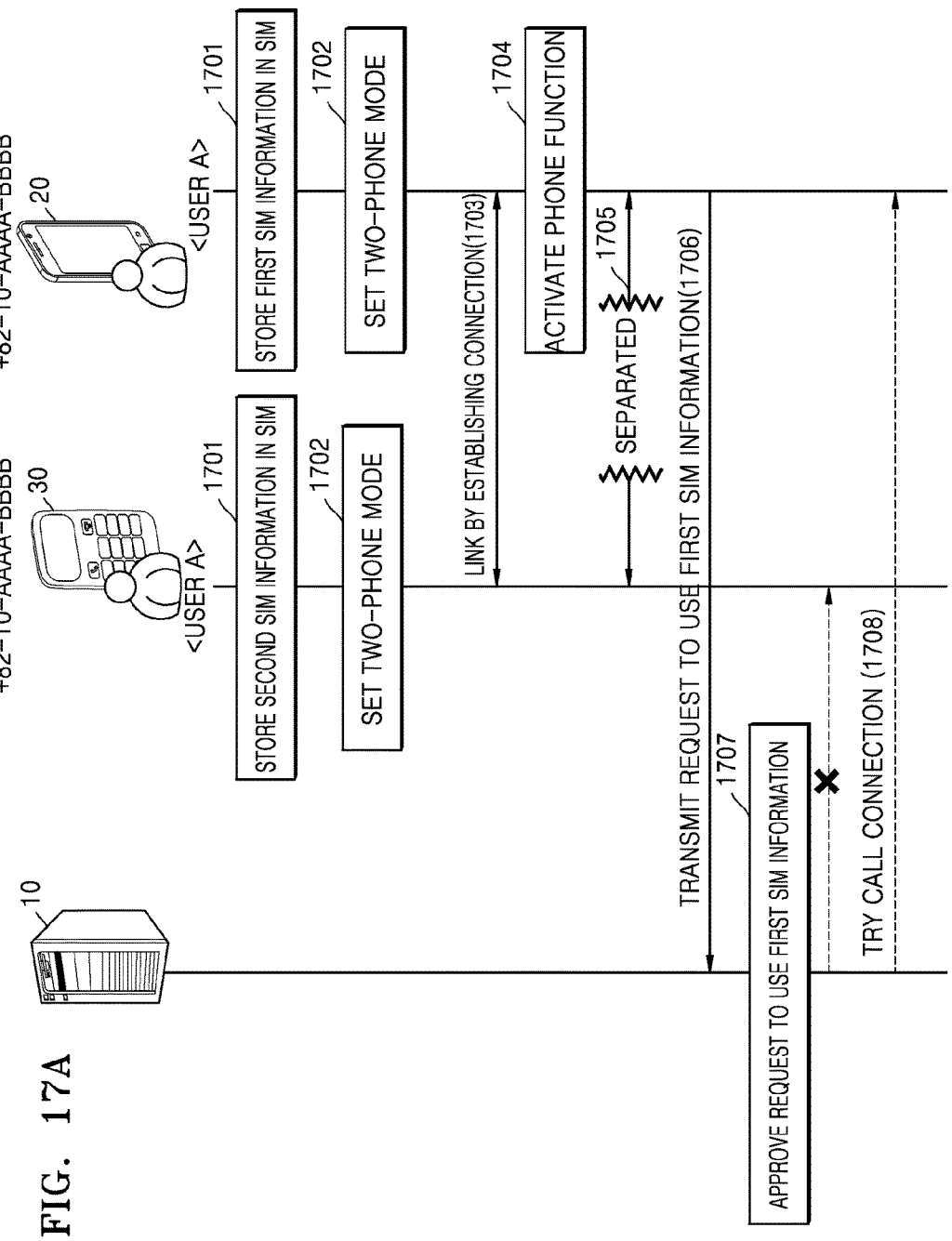
FIG. 17A is a timing diagram of a method of performing a mobile communication function by the first mobile device, according to a SIM information use request of the first mobile device, based on the second scenario while the first mobile device and the second mobile device are separated from each other, according to an exemplary embodiment.

FIG. 17A is a timing diagram of a method of performing the mobile communication function by the first mobile device 20, according to a SIM information use request of the first mobile device 20, based on the second scenario while the first mobile device 20 and the second mobile device 30 are separated from each other, according to an exemplary embodiment.

In operation 1701, the first mobile device 20 stores the first SIM information in the SIM 520. Also, the second mobile device 30 stores the second SIM information in the SIM 350.

In operation 1702, the first mobile device 20 and the second mobile device 30 set the two-phone mode.

In operation 1703, the first and second mobile devices 20 and 30 are linked with each other by establishing a connection through short-range wireless communication.

In operation 1704, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1705, the first and second mobile devices 20 and 30 are separated from each other by terminating the connection through the short-range wireless communication.

In operation 1706, the first mobile device 20 transmits a request to use the first SIM information to the server 10 of the mobile carrier.

In operation 1707, the server 10 of the mobile carrier approves the request to use the first SIM information.

In operation 1708, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the second SIM information is not requested to be used, a phone call is not connected to the second mobile device 30.

Figure 17B:
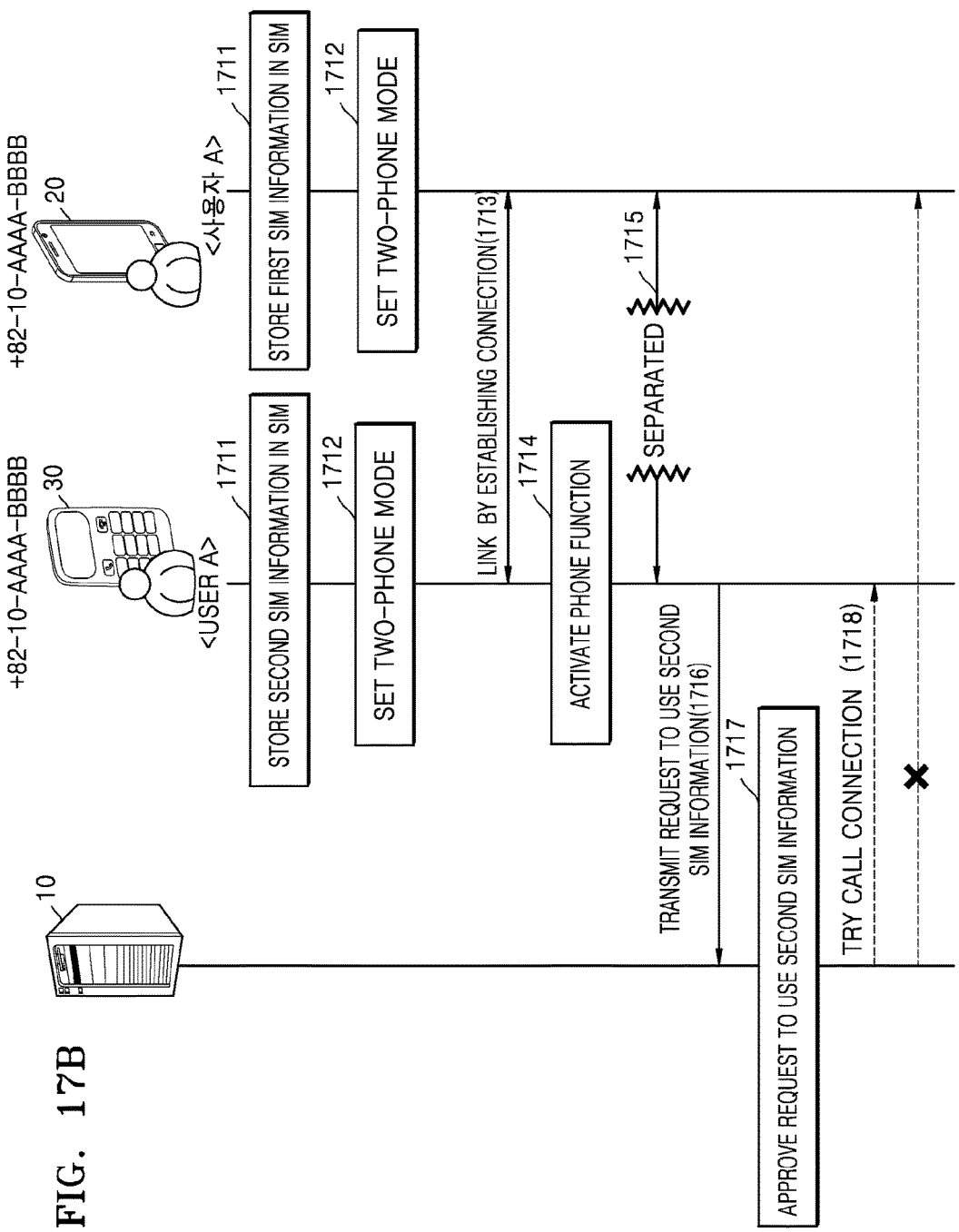
FIG. 17B is a timing diagram of a method of performing a mobile communication function by the second mobile device, according to a SIM information use request of the second mobile device, based on the second scenario while the first mobile device and the second mobile device are separated from each other, according to an exemplary embodiment.

FIG. 17B is a timing diagram of a method of performing the mobile communication function by the second mobile device 30, according to a SIM information use request of the second mobile device 30, based on the second scenario while the first mobile device 20 and the second mobile device 30 are separated from each other, according to an exemplary embodiment.

In operation 1711, the first mobile device 20 stores the first SIM information in the SIM 520. Also, the second mobile device 30 stores the second SIM information in the SIM 350.

In operation 1712, the first mobile device 20 and the second mobile device 30 set the two-phone mode.

In operation 1713, the first and second mobile devices 20 and 30 are linked with each other by establishing a connection through short-range wireless communication.

In operation 1714, the second mobile device 30 activates the phone function. The second mobile device 30 may activate the phone function manually or automatically. The activating of the phone function of the second mobile device 30 may mean that the user A wants to make a call using the second mobile device 30 that is a sub mobile device instead of the first mobile device 20 that is a main mobile device.

In operation 1715, the first and second mobile devices 20 and 30 are separated from each other by terminating the connection through the short-range wireless communication.

In operation 1716, the second mobile device 30 transmits a request to use the second SIM information to the server 10 of the mobile carrier.

In operation 1717, the server 10 of the mobile carrier approves the request to use the second SIM information.

In operation 1718, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the first SIM information is not requested to be used, a phone call is not connected to the first mobile device 20.

Figure 17C:
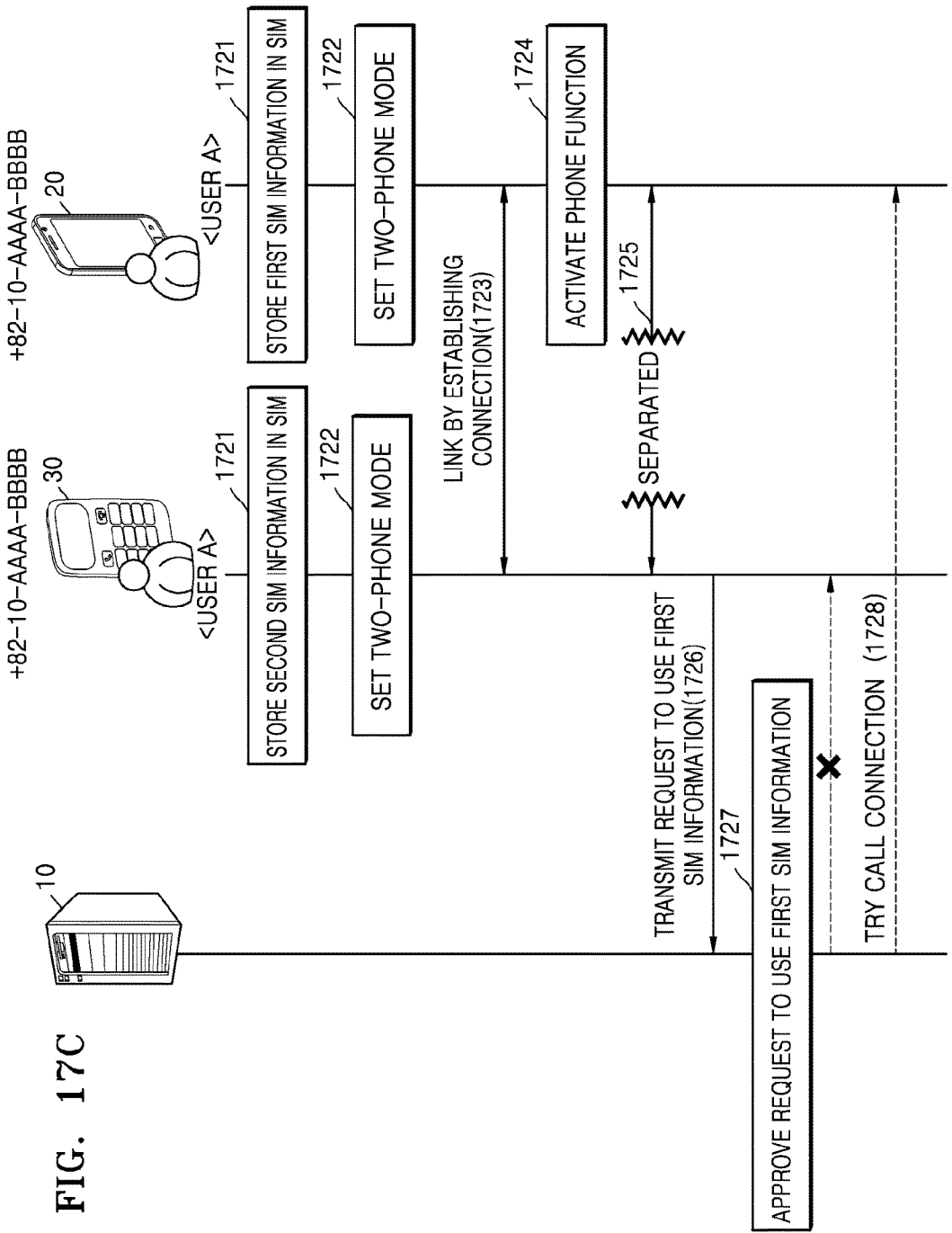
FIG. 17C is a timing diagram of a method of performing a mobile communication function by the first mobile device, according to a SIM information use request of the second mobile device, based on the second scenario while the first mobile device and the second mobile device are separated from each other, according to an exemplary embodiment.

FIG. 17C is a timing diagram of a method of performing the mobile communication function by the first mobile device 20, according to a SIM information use request of the second mobile device 30, based on the second scenario while the first mobile device 20 and the second mobile device 30 are separated from each other, according to an exemplary embodiment.

In operation 1721, the first mobile device 20 stores the first SIM information in the SIM 520. Also, the second mobile device 30 stores the second SIM information in the SIM 350.

In operation 1722, the first mobile device 20 and the second mobile device 30 set the two-phone mode.

In operation 1723, the first and second mobile devices 20 and 30 are linked with each other by establishing a connection through short-range wireless communication.

In operation 1724, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1725, the first and second mobile devices 20 and 30 are separated from each other by terminating the connection through the short-range wireless communication.

In operation 1726, the second mobile device 30 transmits a request to use the first SIM information to the server 10 of the mobile carrier.

In operation 1727, the server 10 of the mobile carrier approves the request to use the first SIM information.

In operation 1728, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the second SIM information is not requested to be used, a phone call is not connected to the second mobile device 30.

Figure 17D:
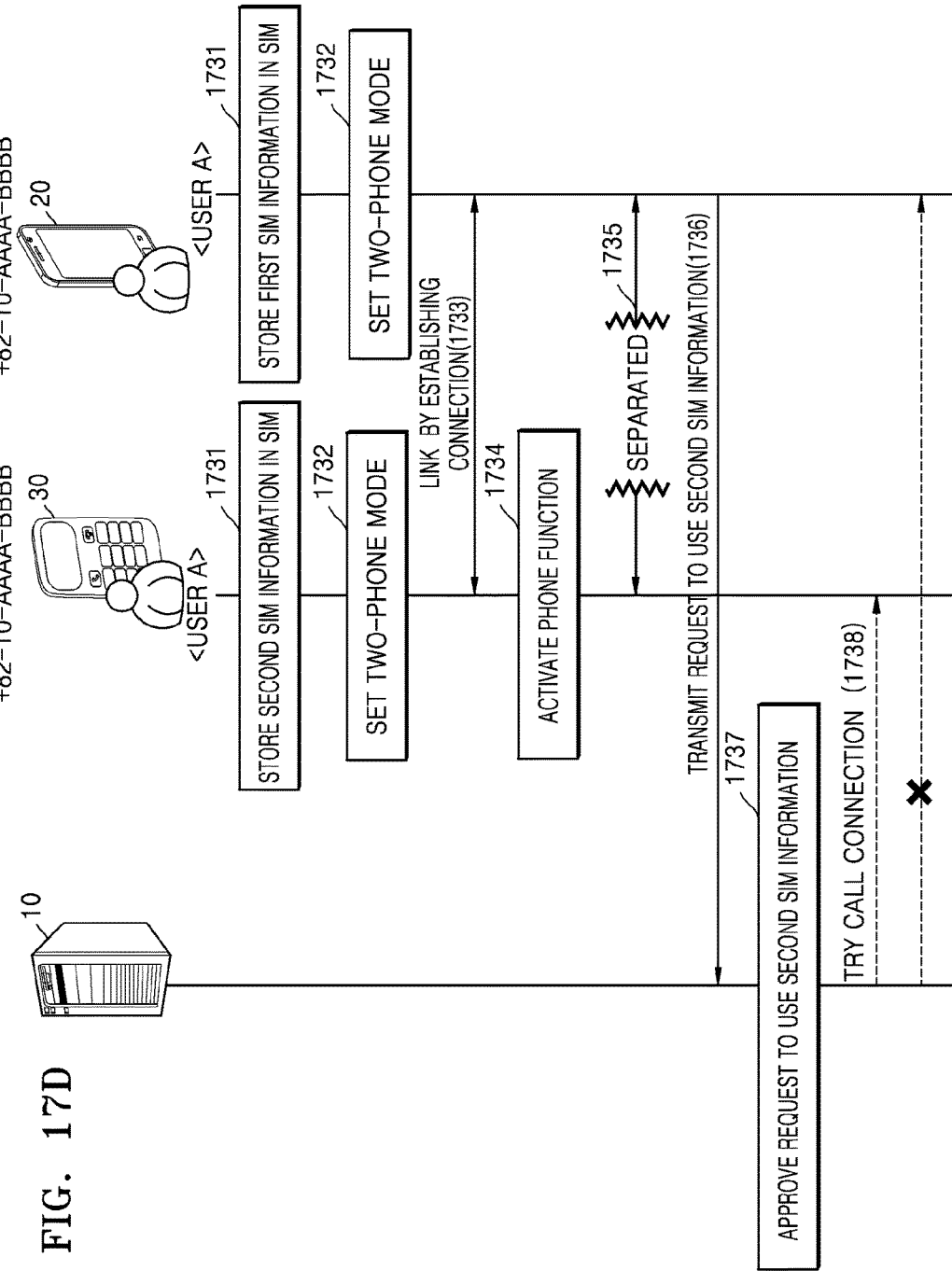
FIG. 17D is a timing diagram of a method of performing a mobile communication function by the second mobile device, according to a SIM information use request of the first mobile device, based on the second scenario while the first mobile device and the second mobile device are separated from each other, according to an exemplary embodiment.

FIG. 17D is a timing diagram of a method of performing the mobile communication function by the second mobile device 30, according to a SIM information use request of the first mobile device 20, based on the second scenario while the first mobile device 20 and the second mobile device 30 are separated from each other, according to an exemplary embodiment.

In operation 1731, the first mobile device 20 stores the first SIM information in the SIM 520. Also, the second mobile device 30 stores the second SIM information in the SIM 350.

In operation 1732, the first mobile device 20 and the second mobile device 30 set the two-phone mode.

In operation 1733, the first and second mobile devices 20 and 30 are linked with each other by establishing a connection through short-range wireless communication.

In operation 1734, the second mobile device 30 activates the phone function. The second mobile device 30 may activate the phone function manually or automatically. The activating of the phone function of the second mobile device 30 may mean that the user A wants to make a call using the second mobile device 30 that is a sub mobile device instead of the first mobile device 20 that is a main mobile device.

In operation 1735, the first and second mobile devices 20 and 30 are separated from each other by terminating the connection through the short-range wireless communication.

In operation 1736, the first mobile device 20 transmits a request to use the second SIM information to the server 10 of the mobile carrier.

In operation 1737, the server 10 of the mobile carrier approves the request to use the second SIM information.

In operation 1738, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the first SIM information is not requested to be used, a phone call is not connected to the first mobile device 20.

FIGS. 18A and 18B are diagrams for describing a concept of the third scenario in which SIM information is pre-stored in any one of the first mobile device 20 and the second mobile device 30, according to an exemplary embodiment.

In FIG. 18A, the first SIM information is pre-stored in the SIM 520 of the first mobile device 20, but the second SIM information is not pre-stored in the SIM 350 of the second mobile device 30. On the other hand, in FIG. 18B, the first SIM information is not pre-stored in the SIM 520 of the first mobile device 20, but the second SIM information is pre-stored in the SIM 350 of the second mobile device 30. In other words, one of the SIM 520 or the SIM 350 may pre-store SIM information regardless of activation state of the phone function of the first or second mobile device 20 or 30.

Referring to FIG. 18A, when the phone function of the first mobile device 20 is requested to be activated in the two-phone mode, the first mobile device 20 transmits a request to use the first SIM information to the server 10 of the mobile carrier. When the server 10 of the mobile carrier approves the request to use the first SIM information, the first mobile device 20 may perform the mobile communication function in the two-phone mode. Further, according to the third scenario, the first mobile device 20 copies and provides the first SIM information to the second mobile device 30 so that the second mobile device 30 may use the copied first SIM information in the same manner as using the second SIM information. In other words, the second mobile device 30 having the copied first SIM information may perform the mobile communication function in the two-phone mode using the copied first SIM information.

Referring to FIG. 18B, when the phone function of the second mobile device 30 is requested to be activated in the two-phone mode, the second mobile device 30 transmits a request to use the second SIM information to the server 10 of the mobile carrier. When the server 10 of the mobile carrier approves the request to use the second SIM information, the second mobile device 30 may perform the mobile communication function in the two-phone mode. Further, according to the third scenario, the second mobile device 30 copies and provides the second SIM information to the first mobile device 20 so that the first mobile device 20 may use the copied second SIM information in the same manner as using the first SIM information. In other words, the first mobile device 20 having the copied second SIM information may perform the mobile communication function in the two-phone mode using the copied second SIM information.

Figure 19A:
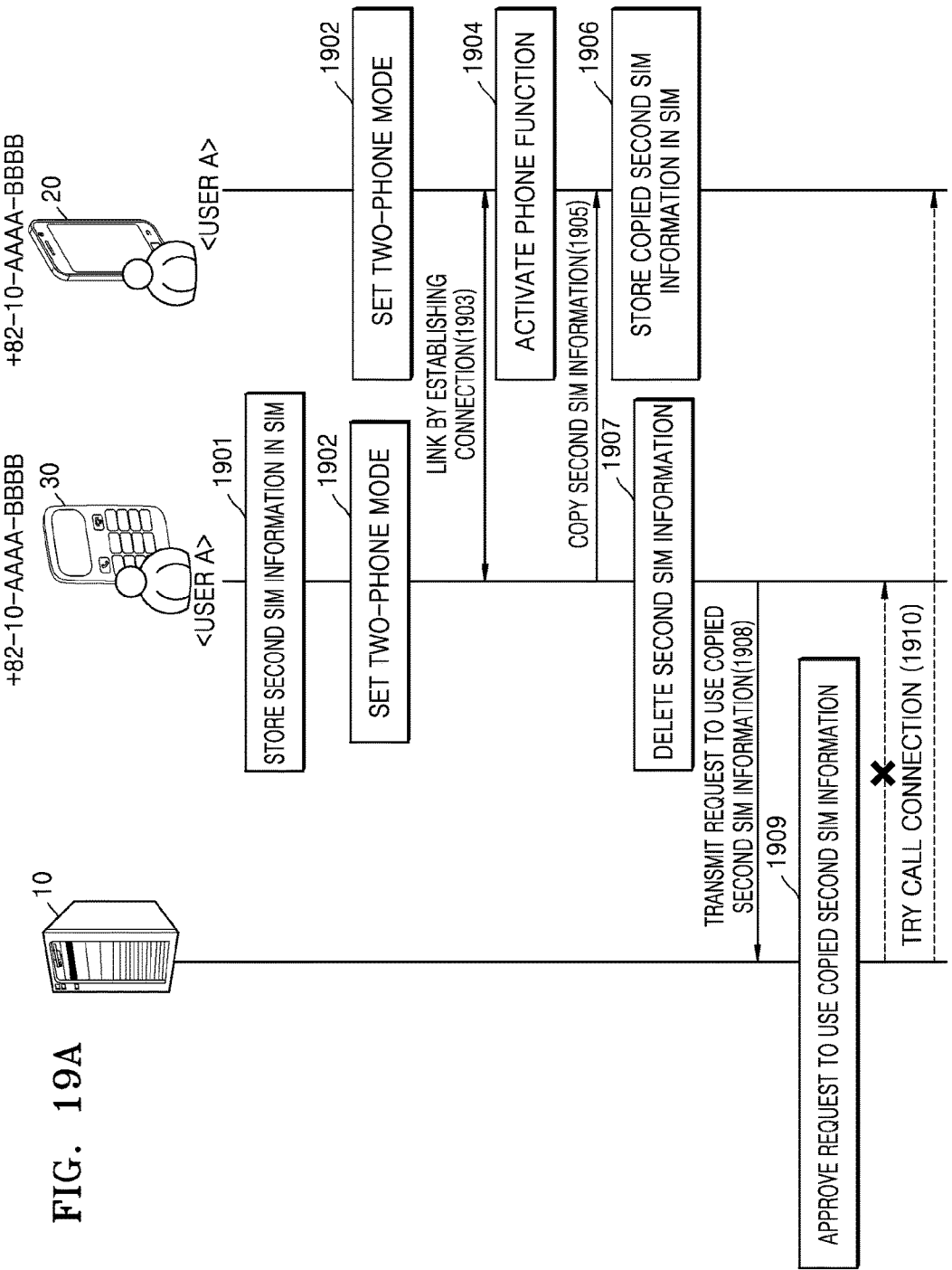
FIG. 19A is a timing diagram of a method of performing a mobile communication function by the first mobile device, when the second mobile device transmits a request to use second SIM information stored in a second downloadable SIM, based on the third scenario while the first mobile device and the second mobile device are linked to each other, according to an exemplary embodiment.

FIG. 19A is a timing diagram of a method of performing the mobile communication function by the first mobile device 20, when the second mobile device 30 transmits a request to use the second SIM information stored in the SIM 350, based on the third scenario while the first mobile device 20 and the second mobile device 30 are linked to each other, according to an exemplary embodiment.

In operation 1901, the second mobile device 30 stores the second SIM information in the SIM 350.

In operation 1902, the first mobile device 20 and the second mobile device 30 set the two-phone mode.

In operation 1903, the first and second mobile devices 20 and 30 are linked with each other by establishing a connection through short-range wireless communication.

In operation 1904, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1905, the second mobile device 30 copies the second SIM information and provides the copied second SIM information to the first mobile device 20.

In operation 1906, the first mobile device 20 stores the copied second SIM information in the SIM 520.

In operation 1907, the second mobile device 30 deletes the second SIM information stored in the SIM 350.

In operation 1908, the second mobile device 30 transmits a request to use the copied second SIM information to the server 10 of the mobile carrier.

In operation 1909, the server 10 of the mobile carrier approves the request to use the copied second SIM information.

In operation 1910, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the second SIM information is deleted from the SIM 350, a phone call is not connected to the second mobile device 30.

Figure 19B:
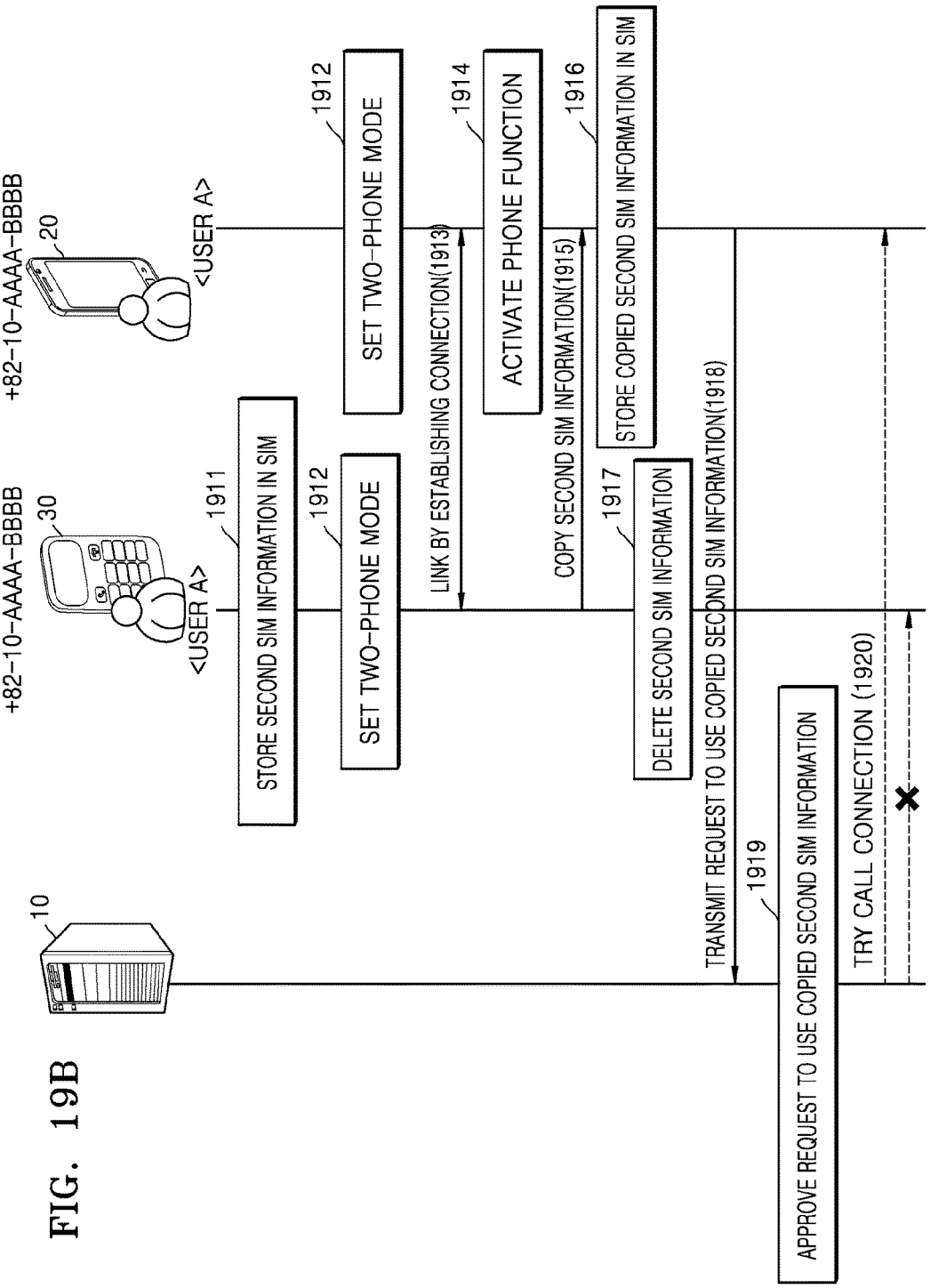
FIG. 19B is a timing diagram of a method of performing a mobile communication function by the first mobile device, when the first mobile device transmits a request to use the second SIM information stored in the second downloadable SIM, based on the third scenario while the first mobile device and the second mobile device are linked to each other, according to an exemplary embodiment.

FIG. 19B is a timing diagram of a method of performing the mobile communication function by the first mobile device 20, when the first mobile device 20 transmits a request to use the second SIM information stored in the SIM 350, based on the third scenario while the first mobile device 20 and the second mobile device 30 are linked to each other, according to an exemplary embodiment.

In operation 1911, the second mobile device 30 stores the second SIM information in the SIM 350.

In operation 1912, the first mobile device 20 and the second mobile device 30 set the two-phone mode.

In operation 1913, the first and second mobile devices 20 and 30 are linked with each other by establishing a connection through short-range wireless communication.

In operation 1914, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 1915, the second mobile device 30 copies the second SIM information and provides the copied second SIM information to the first mobile device 20.

In operation 1916, the first mobile device 20 stores the copied second SIM information in the SIM 520.

In operation 1917, the second mobile device 30 deletes the second SIM information stored in the SIM 350.

In operation 1918, the first mobile device 20 transmits a request to use the copied second SIM information to the server 10 of the mobile carrier.

In operation 1919, the server 10 of the mobile carrier approves the request to use the copied second SIM information.

In operation 1920, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the second SIM information is deleted from the SIM 350, a phone call is not connected to the second mobile device 30.

Figure 19C:
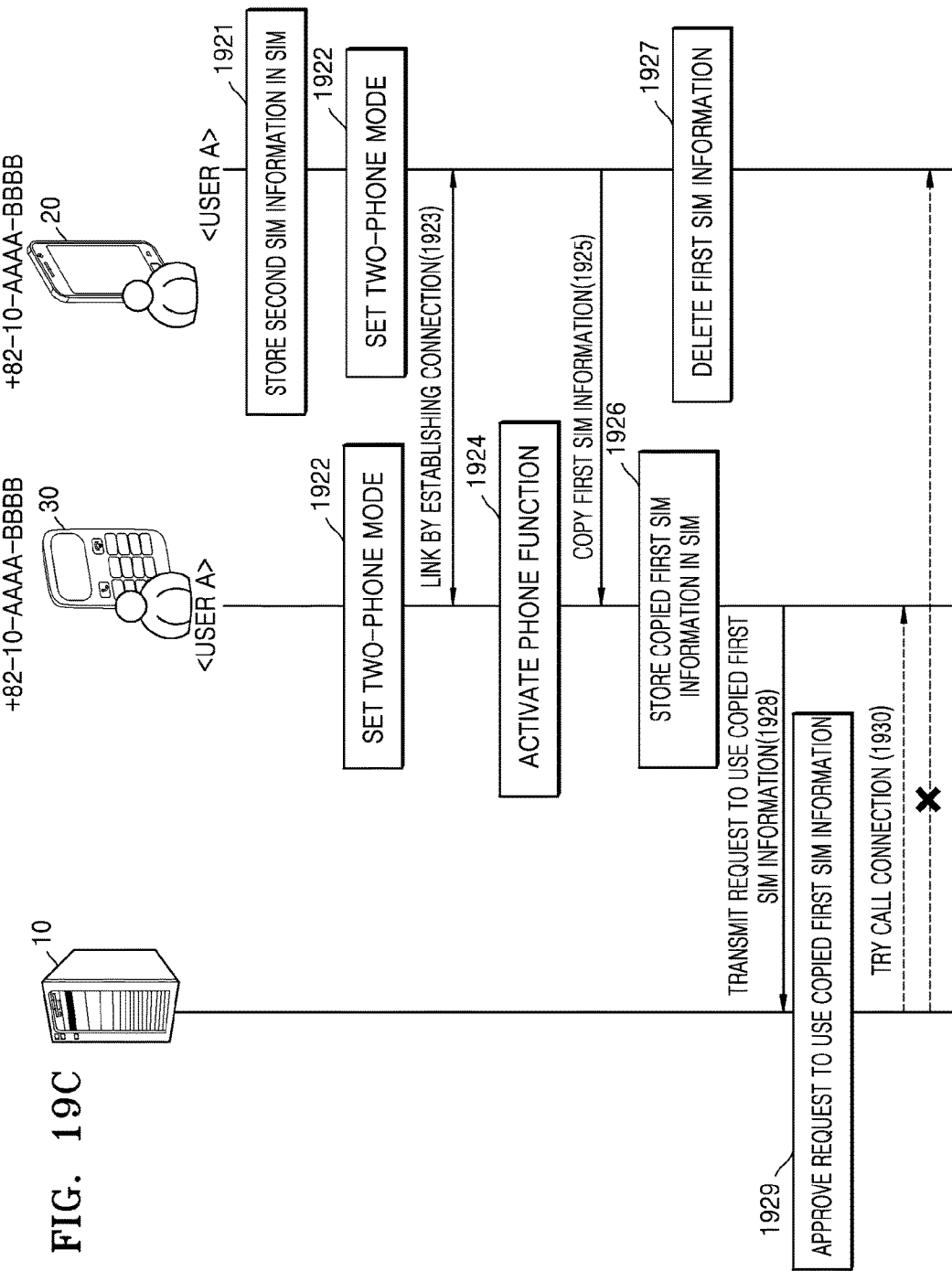
FIG. 19C is a timing diagram of a method of performing a mobile communication function by the second mobile device, when the second mobile device transmits a request to use first SIM information stored in a first downloadable SIM, based on the third scenario while the first mobile device and the second mobile device are linked to each other, according to an exemplary embodiment.

FIG. 19C is a timing diagram of a method of performing the mobile communication function by the second mobile device 30, when the second mobile device 30 transmits a request to use the first SIM information stored in the SIM 520, based on the third scenario while the first mobile device 20 and the second mobile device 30 are linked to each other, according to an exemplary embodiment.

In operation 1921, the first mobile device 20 stores the first SIM information in the SIM 520.

In operation 1922, the first mobile device 20 and the second mobile device 30 set the two-phone mode.

In operation 1923, the first and second mobile devices 20 and 30 are linked with each other by establishing a connection through short-range wireless communication.

In operation 1924, the second mobile device 30 activates the phone function. The second mobile device 30 may activate the phone function manually or automatically. The activating of the phone function of the second mobile device 30 may mean that the user A wants to make a call using the second mobile device 30 that is a sub mobile device, instead of the first mobile device 20 that is a main mobile device.

In operation 1925, the first mobile device 20 copies the first SIM information and provides the copied first SIM information to the second mobile device 30.

In operation 1926, the second mobile device 30 stores the copied first SIM information in the SIM 350.

In operation 1927, the first mobile device 20 deletes the first SIM information stored in the SIM 520.

In operation 1928, the second mobile device 30 transmits a request to use the copied first SIM information to the server 10 of the mobile carrier.

In operation 1929, the server 10 of the mobile carrier approves the request to use the copied first SIM information.

In operation 1930, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the first SIM information is deleted from the SIM 520, a phone call is not connected to the first mobile device 20.

Figure 19D:
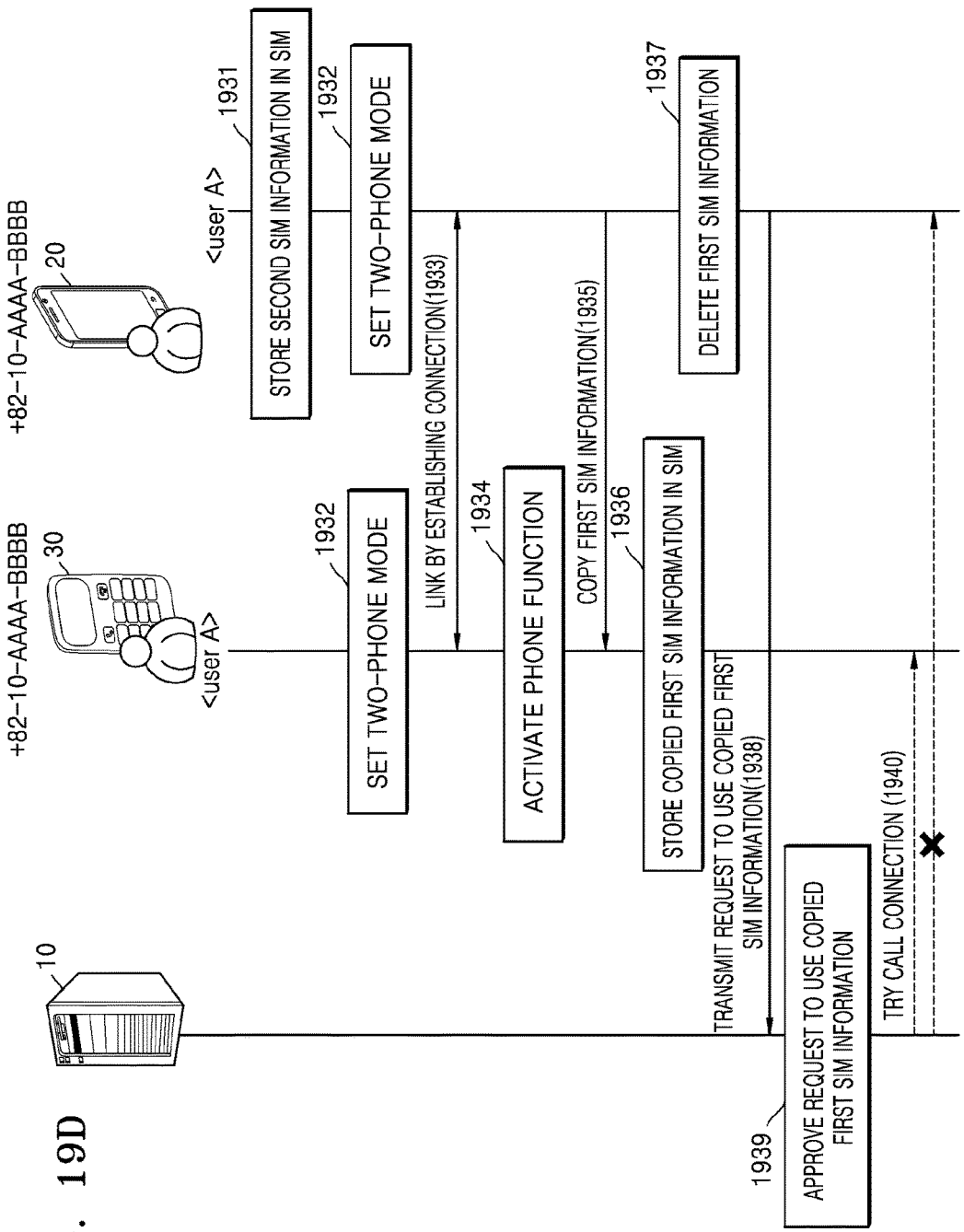
FIG. 19D is a timing diagram of a method of performing a mobile communication function by the second mobile device, when the first mobile device transmits a request to use the first SIM information stored in the first downloadable SIM, based on the third scenario while the first mobile device and the second mobile device are linked to each other, according to an exemplary embodiment.

FIG. 19D is a timing diagram of a method of performing the mobile communication function by the second mobile device 30, when the first mobile device 20 transmits a request to use the first SIM information stored in the SIM 520, based on the third scenario while the first mobile device 20 and the second mobile device 30 are linked to each other, according to an exemplary embodiment.

In operation 1931, the first mobile device 20 stores the first SIM information in the SIM 520.

In operation 1932, the first mobile device 20 and the second mobile device 30 set the two-phone mode.

In operation 1933, the first and second mobile devices 20 and 30 are linked with each other by establishing a connection through short-range wireless communication.

In operation 1934, the second mobile device 30 activates the phone function. The second mobile device 30 may activate the phone function manually or automatically. The activating of the phone function of the second mobile device 30 may mean that the user A wants to make a call using the second mobile device 30 that is a sub mobile device, instead of the first mobile device 20 that is a main mobile device.

In operation 1935, the first mobile device 20 copies the first SIM information and provides the copied first SIM information to the second mobile device 30.

In operation 1936, the second mobile device 30 stores the copied first SIM information in the SIM 350.

In operation 1937, the first mobile device 20 deletes the first SIM information stored in the SIM 520.

In operation 1938, the first mobile device 20 transmits a request to use the copied first SIM information to the server 10 of the mobile carrier.

In operation 1939, the server 10 of the mobile carrier approves the request to use the copied first SIM information.

In operation 1940, when another mobile device, for example, the mobile device 40 of the user B of FIG. 1, requests a phone call to the phone number "+82-10-AAAA-BBBB," the server 10 of the mobile carrier tries a call connection to the second mobile device 30. Since the first SIM information is deleted from the SIM 520, a phone call is not connected to the first mobile device 20.

Figure 20A:
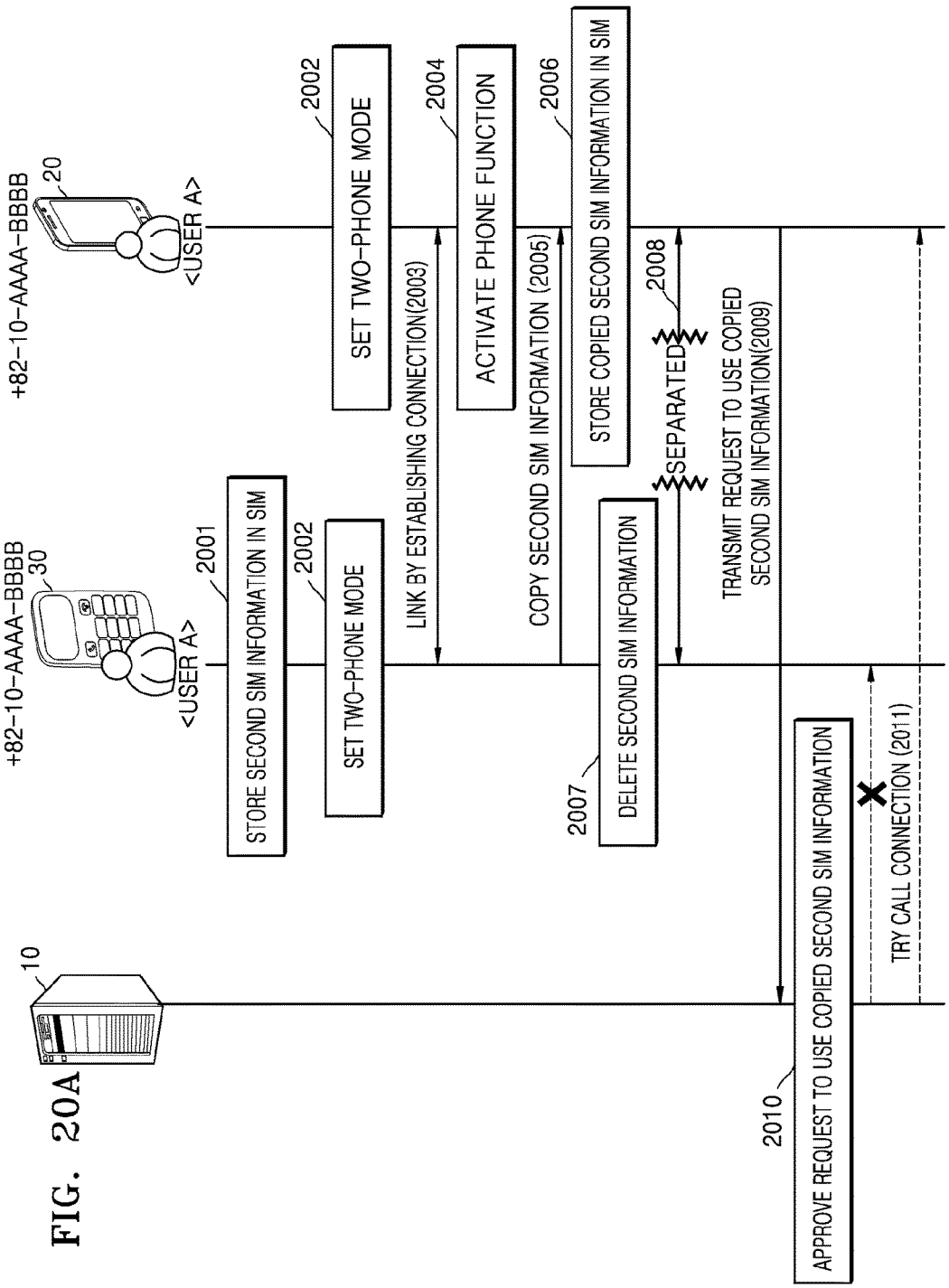
FIG. 20A is a timing diagram of a method of performing a mobile communication function by the first mobile device, when the first mobile device transmits a request to use the second SIM information stored in the second downloadable SIM, based on the third scenario while the first mobile device and the second mobile device are separated from each other, according to an exemplary embodiment.

FIG. 20A is a timing diagram of a method of performing the mobile communication function by the first mobile device 20, when the first mobile device 20 transmits a request to use the second SIM information stored in the SIM 350, based on the third scenario while the first mobile device 20 and the second mobile device 30 are separated from each other, according to an exemplary embodiment.

In operation 2001, the second mobile device 30 stores the second SIM information in the SIM 350.

In operation 2002, the first mobile device 20 and the second mobile device 30 set the two-phone mode.

In operation 2003, the first and second mobile devices 20 and 30 are linked with each other by establishing a connection through short-range wireless communication.

In operation 2004, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 2005, the second mobile device 30 copies the second SIM information and provides the copied second SIM information to the first mobile device 20.

In operation 2006, the first mobile device 20 stores the copied second SIM information in the SIM 520.

In operation 2007, the second mobile device 30 deletes the second SIM information stored in the SIM 350.

In operation 2008, the first and second mobile devices 20 and 30 are separated from each other by terminating the connection through the short-range wireless communication.

In operation 2009, the first mobile device 20 transmits a request to use the copied second SIM information to the server 10 of the mobile carrier.

In operation 2010, the server 10 of the mobile carrier approves the request to use the copied second SIM information.

In operation 2011, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the second SIM information is deleted from the SIM 350, a phone call is not connected to the second mobile device 30.

Figure 20B:
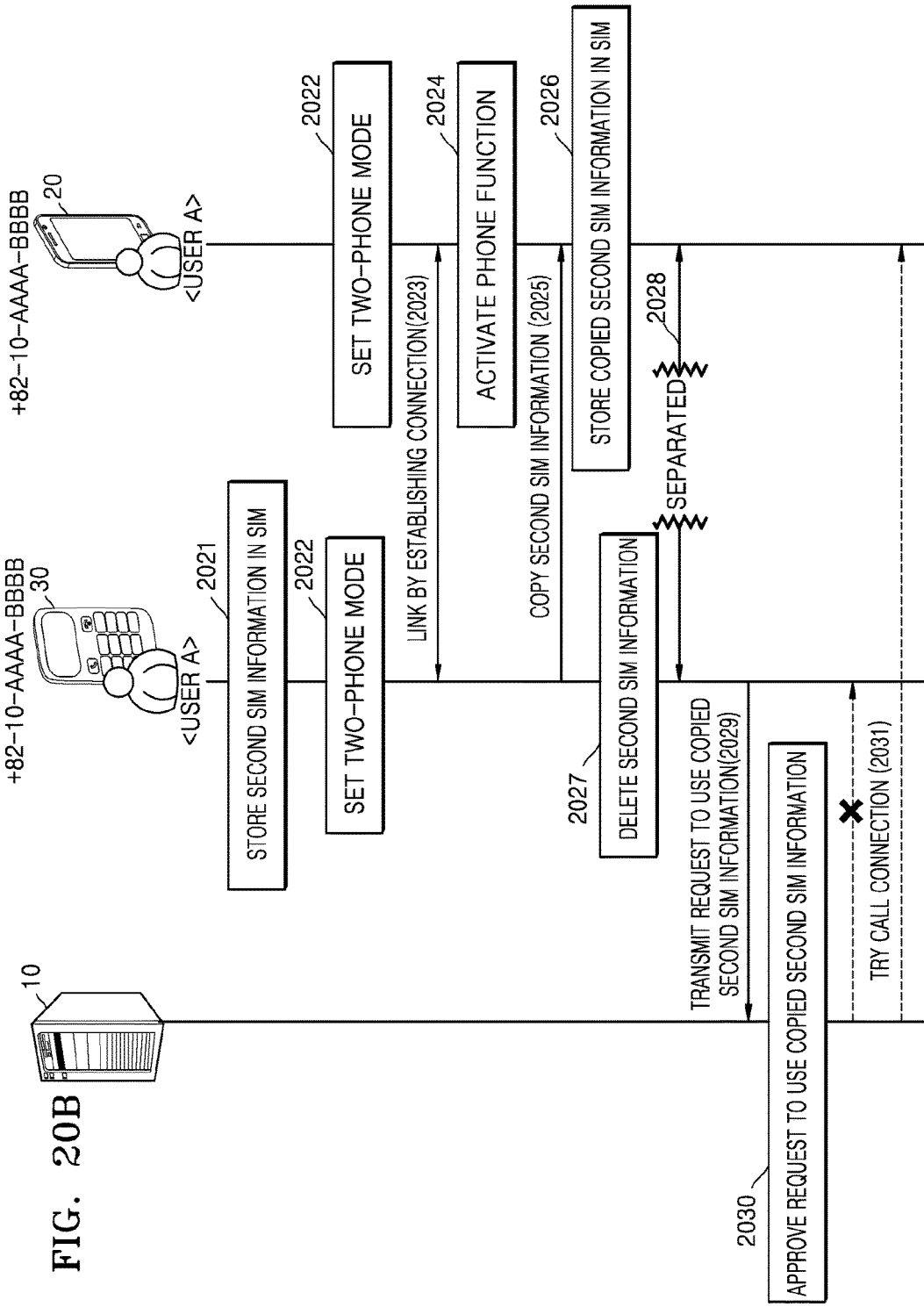
FIG. 20B is a timing diagram of a method of performing a mobile communication function by the first mobile device, when the second mobile device transmits a request to use the second SIM information stored in the second downloadable SIM, based on the third scenario while the first mobile device and the second mobile device are separated from each other, according to an exemplary embodiment.

FIG. 20B is a timing diagram of a method of performing the mobile communication function by the first mobile device 20, when the second mobile device 30 transmits a request to use the second SIM information stored in the SIM 250, based on the third scenario while the first mobile device 20 and the second mobile device 30 are separated from each other, according to an exemplary embodiment.

In operation 2021, the second mobile device 30 stores the second SIM information in the SIM 350.

In operation 2022, the first mobile device 20 sets the two-phone mode. Also, the second mobile device 30 sets the two-phone mode.

In operation 2023, the first and second mobile devices 20 and 30 are linked with each other by establishing a connection through short-range wireless communication.

In operation 2024, the first mobile device 20 activates the phone function. The first mobile device 20 may activate the phone function manually or automatically. The activating of the phone function of the first mobile device 20 may mean that the user A wants to make a call using the first mobile device 20 that is a main mobile device.

In operation 2025, the second mobile device 30 copies the second SIM information and provides the copied second SIM information to the first mobile device 20.

In operation 2026, the first mobile device 20 stores the copied second SIM information in the SIM 520.

In operation 2027, the second mobile device 30 deletes the second SIM information stored in the SIM 350.

In operation 2028, the first and second mobile devices 20 and 30 are separated from each other by terminating the connection through the short-range wireless communication.

In operation 2029, the second mobile device 20 transmits a request to use the copied second SIM information to the server 10 of the mobile carrier.

In operation 2030, the server 10 of the mobile carrier approves the request to use the copied second SIM information.

In operation 2031, when another mobile device, for example, the mobile device 40 of the user B of FIG. 1, requests a phone call to the phone number "+82-10-AAAA-BBBB," the server 10 of the mobile carrier tries a call connection to the first mobile device 20. Since the second SIM information is deleted from the SIM 350, a phone call is not connected to the second mobile device 30.

Figure 20C:
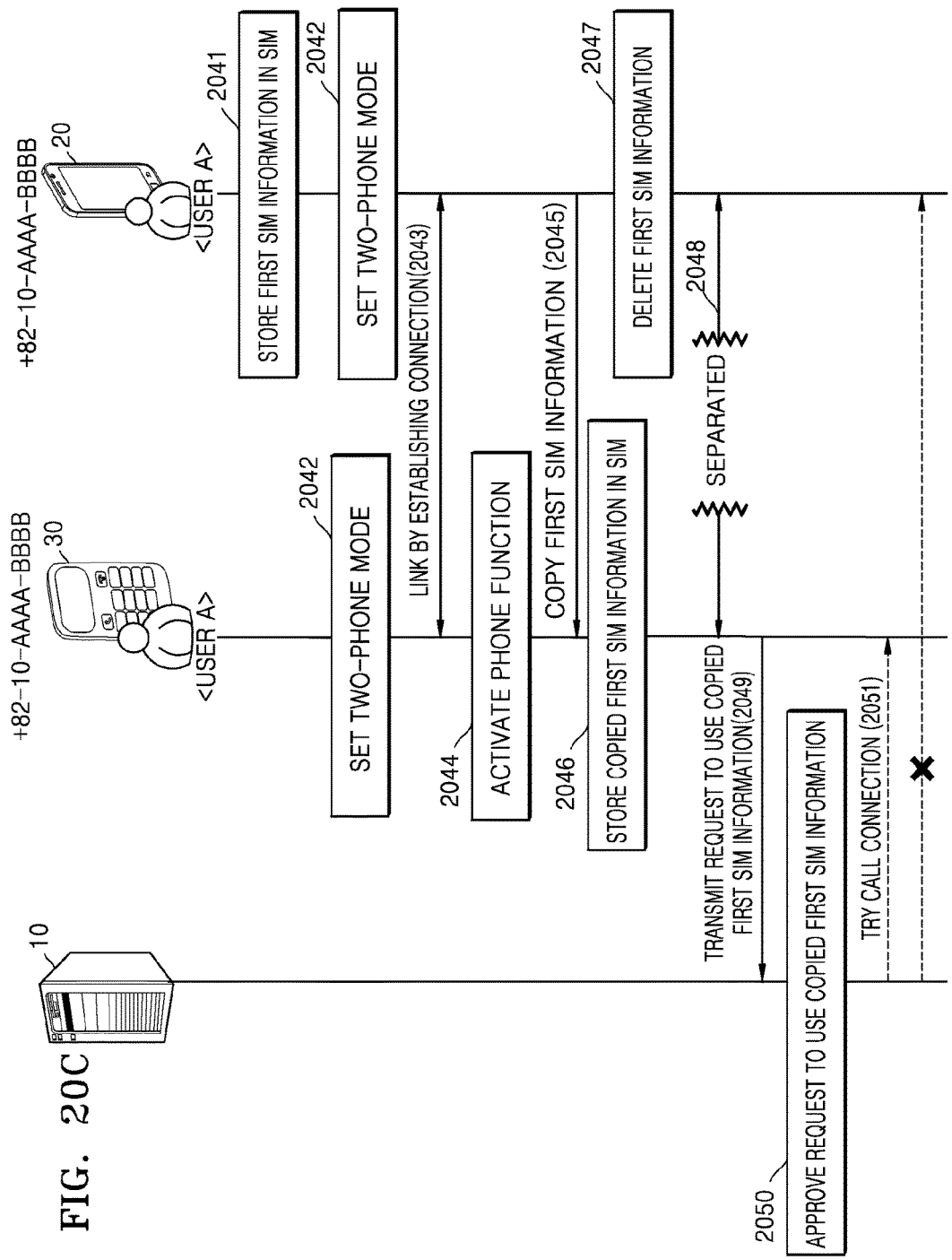
FIG. 20C is a timing diagram of a method of performing a mobile communication function by the second mobile device, when the second mobile device transmits a request to use the first SIM information stored in the first downloadable SIM, based on the third scenario while the first mobile device and the second mobile device are separated from each other, according to an exemplary embodiment.

FIG. 20C is a timing diagram of a method of performing the mobile communication function by the second mobile device 30, when the second mobile device 30 transmits a request to use the first SIM information stored in the SIM 520, based on the third scenario while the first mobile device 20 and the second mobile device 30 are separated from each other, according to an exemplary embodiment.

In operation 2041, the first mobile device 20 stores the first SIM information in the SIM 520.

In operation 2042, the first mobile device 20 and the second mobile device 30 set the two-phone mode.

In operation 2043, the first and second mobile devices 20 and 30 are linked with each other by establishing a connection through short-range wireless communication.

In operation 2044, the second mobile device 30 activates the phone function. The second mobile device 30 may activate the phone function manually or automatically. The activating of the phone function of the second mobile device 30 may mean that the user A wants to make a call using the second mobile device 30 that is a sub mobile device, instead of the first mobile device 20 that is a main mobile device.

In operation 2045, the first mobile device 20 copies the first SIM information and provides the copied first SIM information to the second mobile device 30.

In operation 2046, the second mobile device 30 stores the copied first SIM information in the SIM 350.

In operation 2047, the first mobile device 20 deletes the first SIM information stored in the SIM 520.

In operation 2048, the first and second mobile devices 20 and 30 are separated from each other by terminating the connection through the short-range wireless communication.

In operation 2049, the second mobile device 30 transmits a request to use the copied first SIM information to the server 10 of the mobile carrier.

In operation 2050, the server 10 of the mobile carrier approves the request to use the copied first SIM information.

In operation 2051, when another mobile device, for example, the mobile device 40 of the user B of FIG. 1, requests a phone call to the phone number "+82-10-AAAA-BBBB," the server 10 of the mobile carrier tries a call connection to the second mobile device 20. Since the first SIM information is deleted from the SIM 520, a phone call is not connected to the first mobile device 20.

Figure 20D:
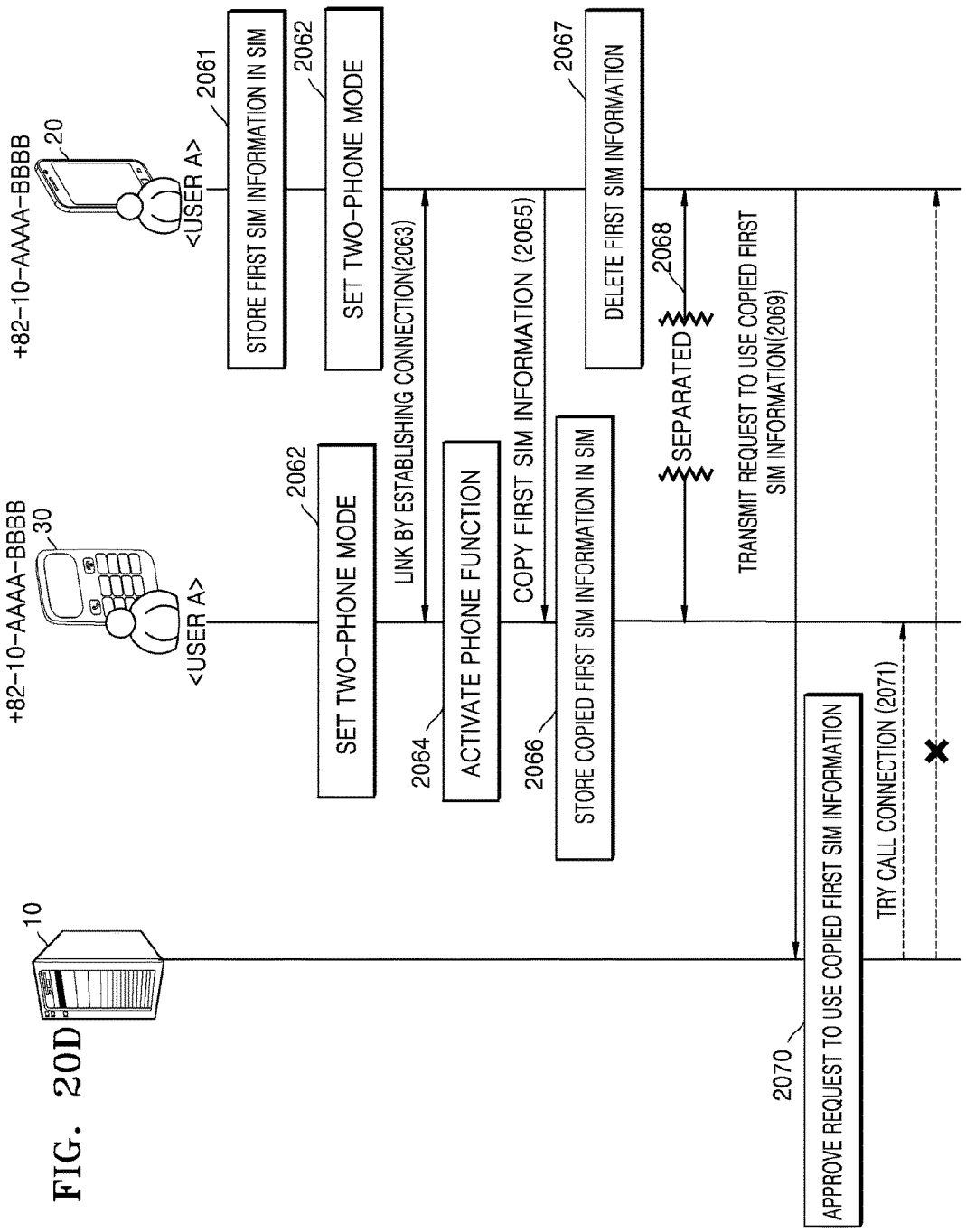
FIG. 20D is a timing diagram of a method of performing a mobile communication function by the second mobile device, when the first mobile device transmits a request to use the first SIM information stored in the first downloadable SIM, based on the third scenario while the first mobile device and the second mobile device are separated from each other, according to an exemplary embodiment.

FIG. 20D is a timing diagram of a method of performing the mobile communication function by the second mobile device 30, when the first mobile device 20 transmits a request to use the first SIM information stored in the SIM 520, based on the third scenario while the first mobile device 20 and the second mobile device 30 are separated from each other, according to an exemplary embodiment.

In operation 2061, the first mobile device 20 stores the first SIM information in the SIM 520.

In operation 2062, the first mobile device 20 and the second mobile device 30 set the two-phone mode.

In operation 2063, the first and second mobile devices 20 and 30 are linked with each other by establishing a connection through short-range wireless communication.

In operation 2064, the second mobile device 30 activates the phone function. The second mobile device 30 may activate the phone function manually or automatically. The activating of the phone function of the second mobile device 30 may mean that the user A wants to make a call using the second mobile device 30 that is a sub mobile device, instead of the first mobile device 20 that is a main mobile device.

In operation 2065, the first mobile device 20 copies the first SIM information and provides the copied first SIM information to the second mobile device 30.

In operation 2066, the second mobile device 30 stores the copied first SIM information in the SIM 350.

In operation 2067, the first mobile device 20 deletes the first SIM information stored in the SIM 520.

In operation 2068, the first and second mobile devices 20 and 30 are separated from each other by terminating the connection through the short-range wireless communication.

In operation 2069, the second mobile device 30 transmits a request to use the copied first SIM information to the server 10 of the mobile carrier.

In operation 2070, the server 10 of the mobile carrier approves the request to use the copied first SIM information.

In operation 2071, when another mobile device, for example, the mobile device 40 of the user B of FIG. 1, requests a phone call to the phone number "+82-10-AAAA-BBBB," the server 10 of the mobile carrier tries a call connection to the second mobile device 20. Since the first SIM information is deleted from the SIM 520, a phone call is not connected to the first mobile device 20.

Figure 21:
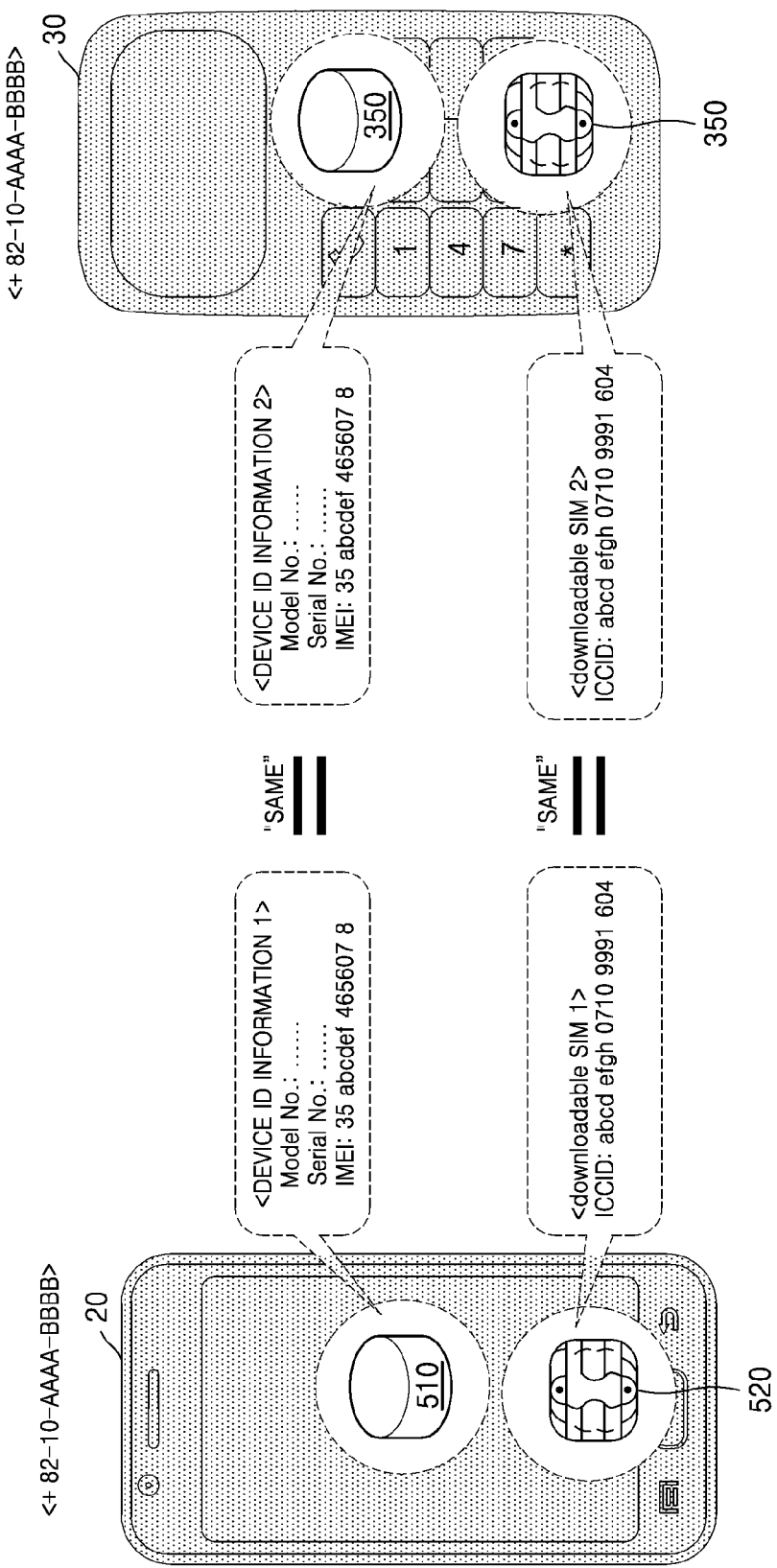
FIG. 21 is a diagram for describing the device ID information and the SIM information, which are stored in each of the first mobile device and the second mobile device, according to another exemplary embodiment.

FIG. 21 is a diagram for describing the device ID information and the SIM information, which are stored in each of the first mobile device and the second mobile device, according to another exemplary embodiment.

Referring to FIG. 21, the same phone number "+82-10-AAAA-BBBB" may be assigned to the first and second mobile devices 20 and 30. In the first device ID information of the first mobile device 20, the IMEI of the first mobile device 20 may have a value "35 abcdef 465607 8." Also, the ICCID of the first SIM information of the first mobile device 20 may have a value "abcd efgh 0710 9991 604." In the second device ID information of the second mobile device 30, the IMEI of the second mobile device 30 may have a value "35 abcdef 465607 8," which is the same as the IMEI of the first device ID information. Also, the ICCID of the second SIM information of the second mobile device 30 may have a value "abcd efgh 0710 9991 604," which is the same as the ICCID of the first SIM information.

In other words, according to FIG. 21, the first and second mobile devices 20 and 30 are assigned with the same phone number "+82-10-AAAA-BBBB," have SIM information of the same ICCID, and have device ID information of the same IMEI. The exemplary embodiment described with reference to FIG. 21 differs from the exemplary embodiments described with reference to FIGS. 11A and 11B in that, in FIG. 21, the first device ID information of the first mobile device 20 and the second device ID information of the second mobile device 30 are the same.

FIGS. 22A through 27 are diagrams related to methods according to the exemplary embodiment of FIG. 21.

Figure 22A:
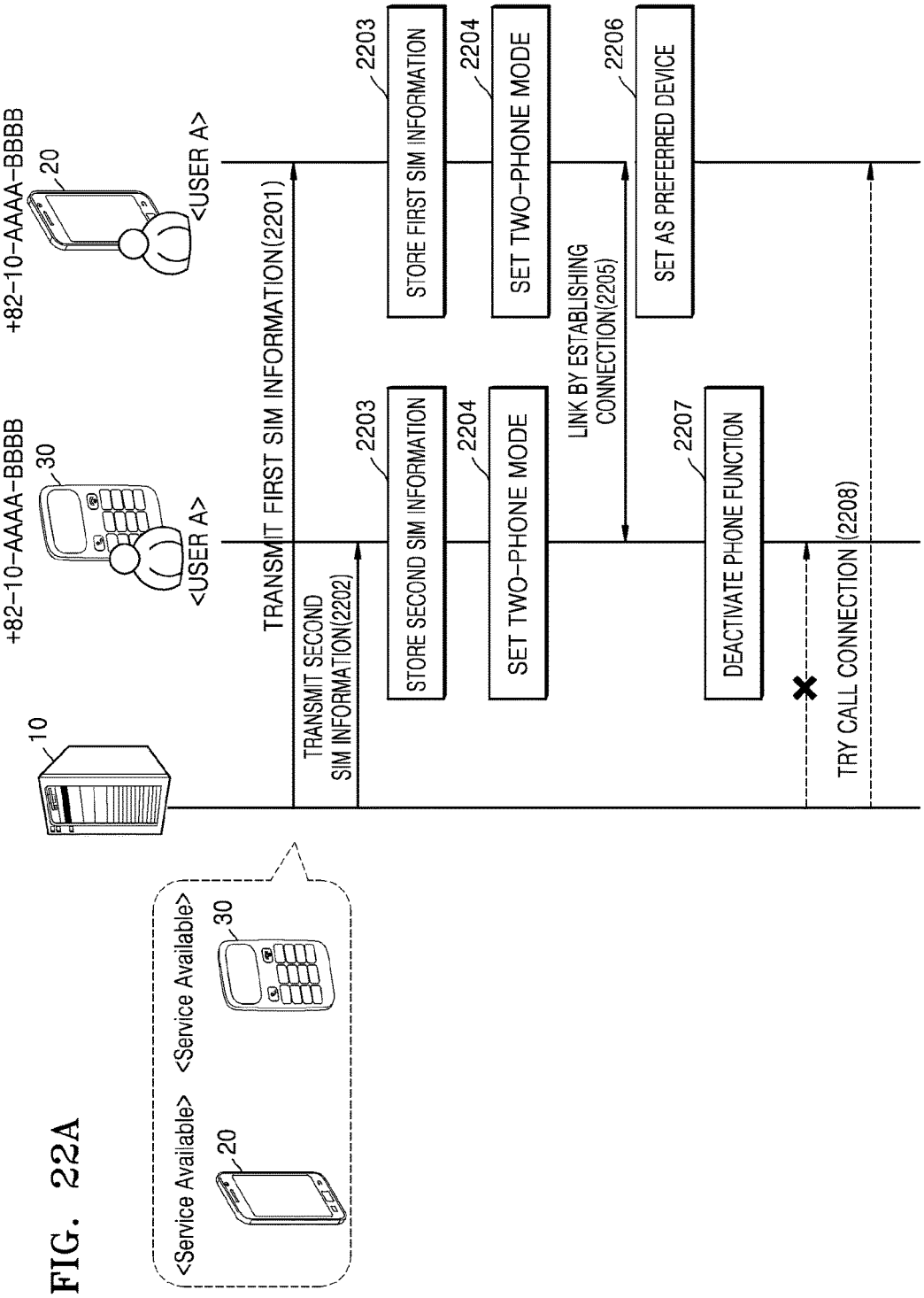
FIG. 22A is a timing diagram of a method of performing a mobile communication function by the first mobile device, when the device ID information of the first mobile device and the device ID information of the second mobile device are the same and the phone functions of the first and second mobile devices are both usable, according to an exemplary embodiment.

FIG. 22A is a timing diagram of a method of performing the mobile communication function by the first mobile device 20, when the first device ID information of the first mobile device 20 and the second device ID information of the second mobile device 30 are the same and the phone functions of the first and second mobile devices 20 and 30 are both usable, according to an exemplary embodiment.

In operation 2201, the server 10 of the mobile carrier transmits the first SIM information to the first mobile device 20.

In operation 2202, the server 10 of the mobile carrier transmits the second SIM information to the second mobile device 30.

In operation 2203, the first mobile device 20 stores the first SIM information in the SIM 520. Also, the second mobile device 30 stores the second SIM information in the SIM 350.

In operation 2204, the first mobile device 20 and the second mobile device 30 set the two-phone mode.

In operation 2205, the first and second mobile devices 20 and 30 are linked to each other by establishing a connection through short-range wireless communication.

In operation 2206, the first mobile device 20 is set as a preferred device from among the first and second mobile devices 20 and 30 owned by the user A according to an input of the user A. A preferred device may denote a device for receiving a phone call to the phone number "+82-10-AAAA-BBBB."

In operation 2207, the phone function of the second mobile device 30 is deactivated because the first mobile device 20 is set as the preferred device.

In operation 2208, when the phone number "+82-10-AAAA-BBBB" is requested to be called from another mobile device, such as the mobile device 40 of the user B of FIG. 1, the server 10 of the mobile carrier tries a call connection to the first mobile device 20. A phone call is not connected to the second mobile device 30 since the phone function of the second mobile device 30 is deactivated.

Figure 22B:
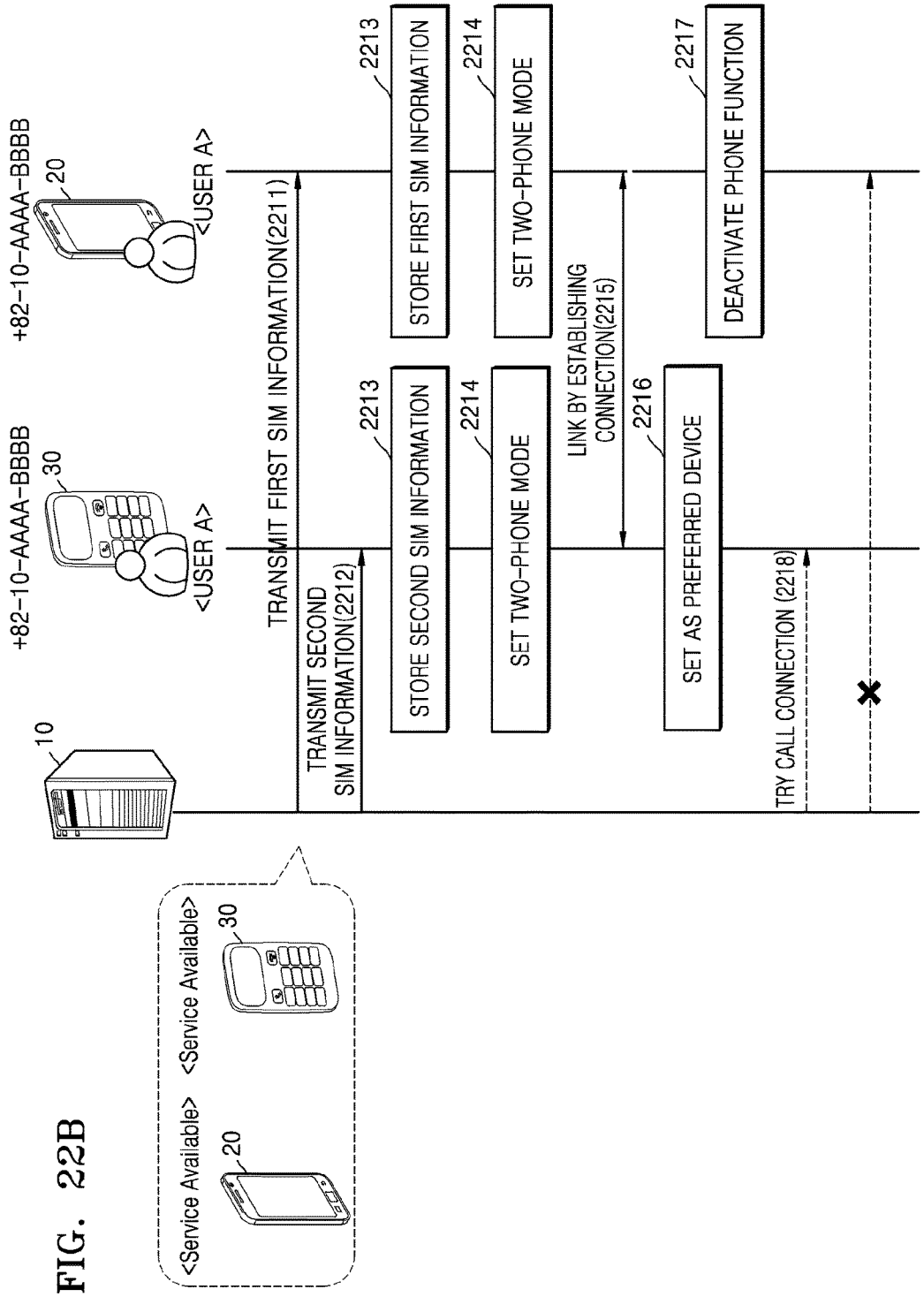
FIG. 22B is a timing diagram of a method of performing a mobile communication function by the second mobile device, when the device ID information of the first mobile device and the device ID information of the second mobile device are the same and the phone functions of the first and second mobile devices are both usable, according to an exemplary embodiment.

FIG. 22B is a timing diagram of a method of performing the mobile communication function by the second mobile device 30, when the first device ID information of the first mobile device 20 and the second device ID information of the second mobile device 30 are the same and the phone functions of the first and second mobile devices 20 and 30 are both usable, according to an exemplary embodiment.

In operation 2211, the server 10 of the mobile carrier transmits the first SIM information to the first mobile device 20.

In operation 2212, the server 10 of the mobile carrier transmits the second SIM information to the second mobile device 30.

In operation 2213, the first mobile device 20 stores the first SIM information in the SIM 520. Also, the second mobile device 30 stores the second SIM information in the SIM 350.

In operation 2214, the first mobile device 20 and the second mobile device 30 set the two-phone mode.

In operation 2215, the first and second mobile devices 20 and 30 are linked to each other by establishing a connection through short-range wireless communication.

In operation 2216, the second mobile device 30 is set as a preferred device from among the first and second mobile devices 20 and 30 owned by the user A according to an input of the user A. A preferred device may denote a device for receiving a phone call to the phone number "+82-10-AAAA-BBBB."

In operation 2217, the phone function of the first mobile device 20 is deactivated because the second mobile device 30 is set as the preferred device.

In operation 2218, when the phone number "+82-10-AAAA-BBBB" is requested to be called from another mobile device, such as the mobile device 40 of the user B of FIG. 1, the server 10 of the mobile carrier tries a call connection to the second mobile device 30. A phone call is not connected to the first mobile device 20 since the phone function of the first mobile device 30 is deactivated.

Figure 22C:
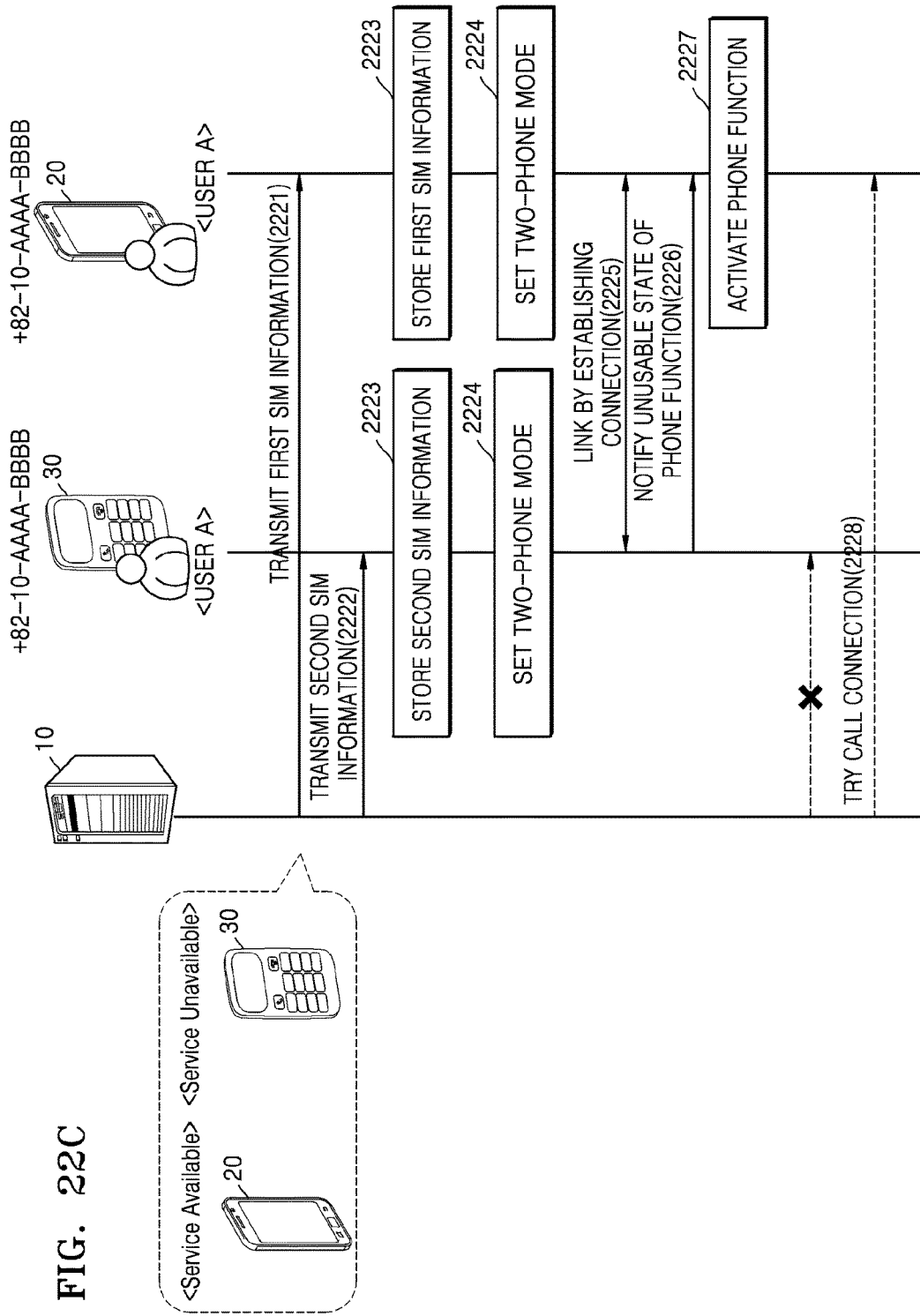
FIG. 22C is a timing diagram of a method of performing a mobile communication function by the first mobile device, when the device ID information of the first mobile device and the device ID information of the second mobile device are the same and only the phone function of the first mobile device is usable, according to an exemplary embodiment.

FIG. 22C is a timing diagram of a method of performing the mobile communication function by the first mobile device 20, when the first device ID information of the first mobile device 20 and the second device ID information of the second mobile device 30 are the same and only the phone function of the first mobile device 20 is usable, according to an exemplary embodiment.

In operation 2221, the server 10 of the mobile carrier transmits the first SIM information to the first mobile device 20.

In operation 2222, the server 10 of the mobile carrier transmits the second SIM information to the second mobile device 30.

In operation 2223, the first mobile device 20 stores the first SIM information in the SIM 520. Also, the second mobile device 30 stores the second SIM information in the SIM 350.

In operation 2204, the first mobile device 20 and the second mobile device 30 set the two-phone mode.

In operation 2225, the first and second mobile devices 20 and 30 are linked to each other by establishing a connection through short-range wireless communication.

In operation 2226, the second mobile device 30 notifies the first mobile device 20 that the phone function of the second mobile device 30 is in an unusable state. The unusable state of the phone function may denote a state in which the mobile communication module included in the second mobile device 30 is malfunctioning or shutoff.

In operation 2227, the first mobile device 20 activates the phone function of the first mobile device 20.

In operation 2228, when the phone number "+82-10-AAAA-BBBB" is requested to be called from another mobile device, such as the mobile device 40 of the user B of FIG. 1, the server 10 of the mobile carrier tries a call connection to the first mobile device 20. A phone call is not connected to the second mobile device 30 since the phone function of the second mobile device 30 is not usable.

Figure 22D:
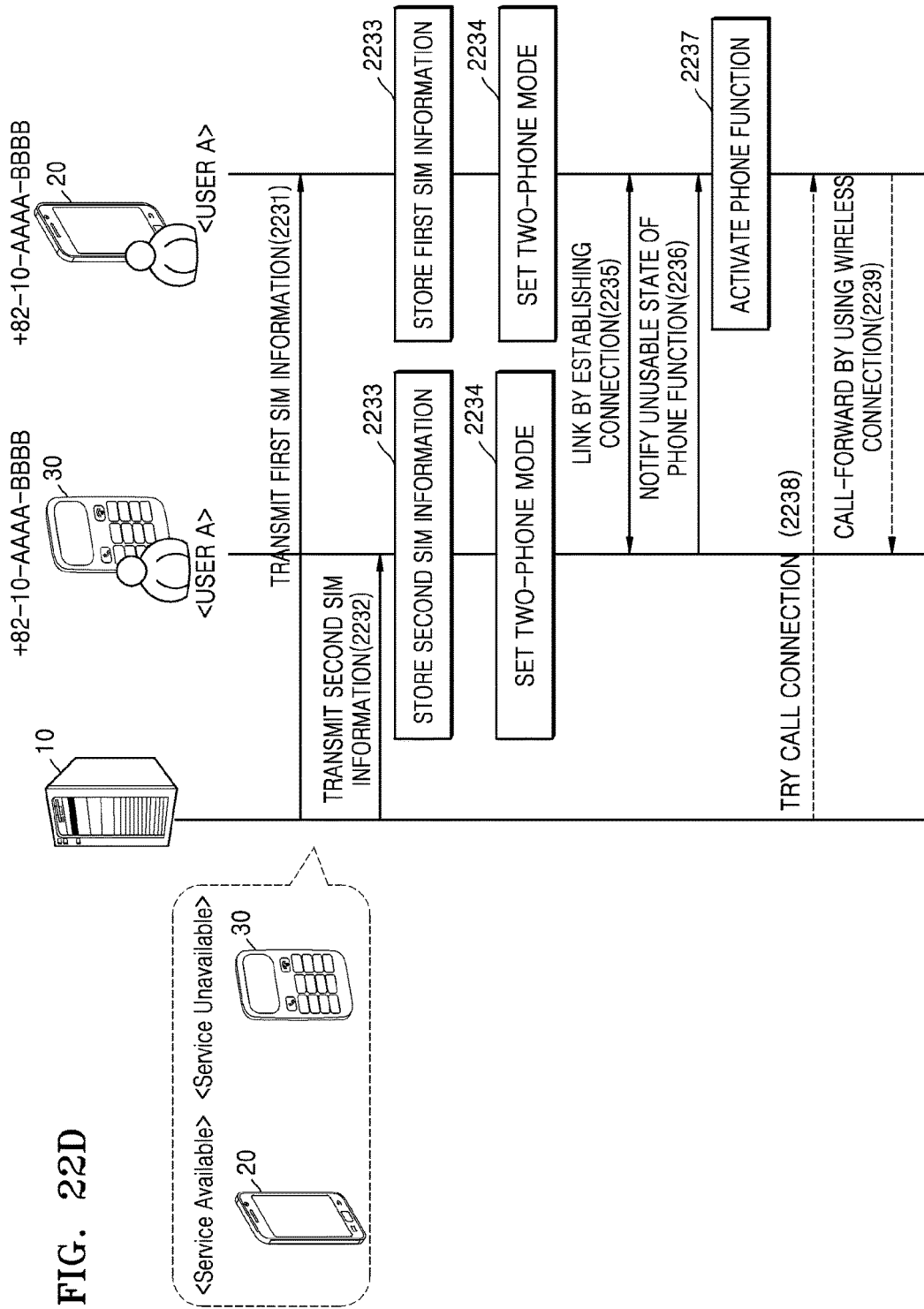
FIG. 22D is a timing diagram of a method of performing a mobile communication function by the second mobile device, when the device ID information of the first mobile device and the device ID information of the second mobile device are the same and only the phone function of the first mobile device is usable, according to an exemplary embodiment.

FIG. 22D is a timing diagram of a method of performing the mobile communication function by the second mobile device 30, when the first device ID information of the first mobile device 20 and the second device ID information of the second mobile device 30 are the same and only the phone function of the first mobile device 20 is usable, according to an exemplary embodiment.

In operation 2231, the server 10 of the mobile carrier transmits the first SIM information to the first mobile device 20.

In operation 2232, the server 10 of the mobile carrier transmits the second SIM information to the second mobile device 30.

In operation 2233, the first mobile device 20 stores the first SIM information in the SIM 520. Also, the second mobile device 30 stores the second SIM information in the SIM 350.

In operation 2234, the first mobile device 20 and the second mobile device 30 set the two-phone mode.

In operation 2235, the first and second mobile devices 20 and 30 are linked to each other by establishing a connection through short-range wireless communication.

In operation 2236, the second mobile device 30 notifies the first mobile device 20 that the phone function of the second mobile device 30 is in an unusable state. The unusable state of the phone function may denote a state in which the mobile communication module included in the second mobile device 30 is malfunctioning or shutoff.

In operation 2237, the first mobile device 20 activates the phone function of the first mobile device 20.

In operation 2238, when the phone number "+82-10-AAAA-BBBB" is requested to be called from another mobile device, such as the mobile device 40 of the user B of FIG. 1, the server 10 of the mobile carrier tries a call connection to the first mobile device 20.

In operation 2239, the first mobile device 20 call-forwards the phone call received from the server 10 of the mobile carrier to the second mobile device 30 via an out-of-band wireless connection method using short-range wireless communication.

FIG. 22E is a timing diagram of a method of performing the mobile communication function by the second mobile device 30, when the first device ID information of the first mobile device 20 and the second device ID information of the second mobile device 30 are the same and only the phone function of the second mobile device 30 is usable, according to an exemplary embodiment.

In operation 2241, the server 10 of the mobile carrier transmits the first SIM information to the first mobile device 20.

In operation 2242, the server 10 of the mobile carrier transmits the second SIM information to the second mobile device 30.

In operation 2243, the first mobile device 20 stores the first SIM information in the SIM 520. Also, the second mobile device 30 stores the second SIM information in the SIM 350.

In operation 2244, the first mobile device 20 and the second mobile device 30 set the two-phone mode.

In operation 2245, the first and second mobile devices 20 and 30 are linked to each other by establishing a connection through short-range wireless communication.

In operation 2246, the first mobile device 20 notifies the second mobile device 30 that the phone function of the first mobile device 20 is in an unusable state. The unusable state of the phone function may denote a state in which the mobile communication module included in the first mobile device 20 is malfunctioning or shutoff.

In operation 2247, the second mobile device 30 activates the phone function of the second mobile device 30.

In operation 2248, when the phone number "+82-10-AAAA-BBBB" is requested to be called from another mobile device, such as the mobile device 40 of the user B of FIG. 1, the server 10 of the mobile carrier tries a call connection to the second mobile device 30. A phone call is not connected to the first mobile device 20 since the phone function of the first mobile device 20 is not usable.

Figure 22F:
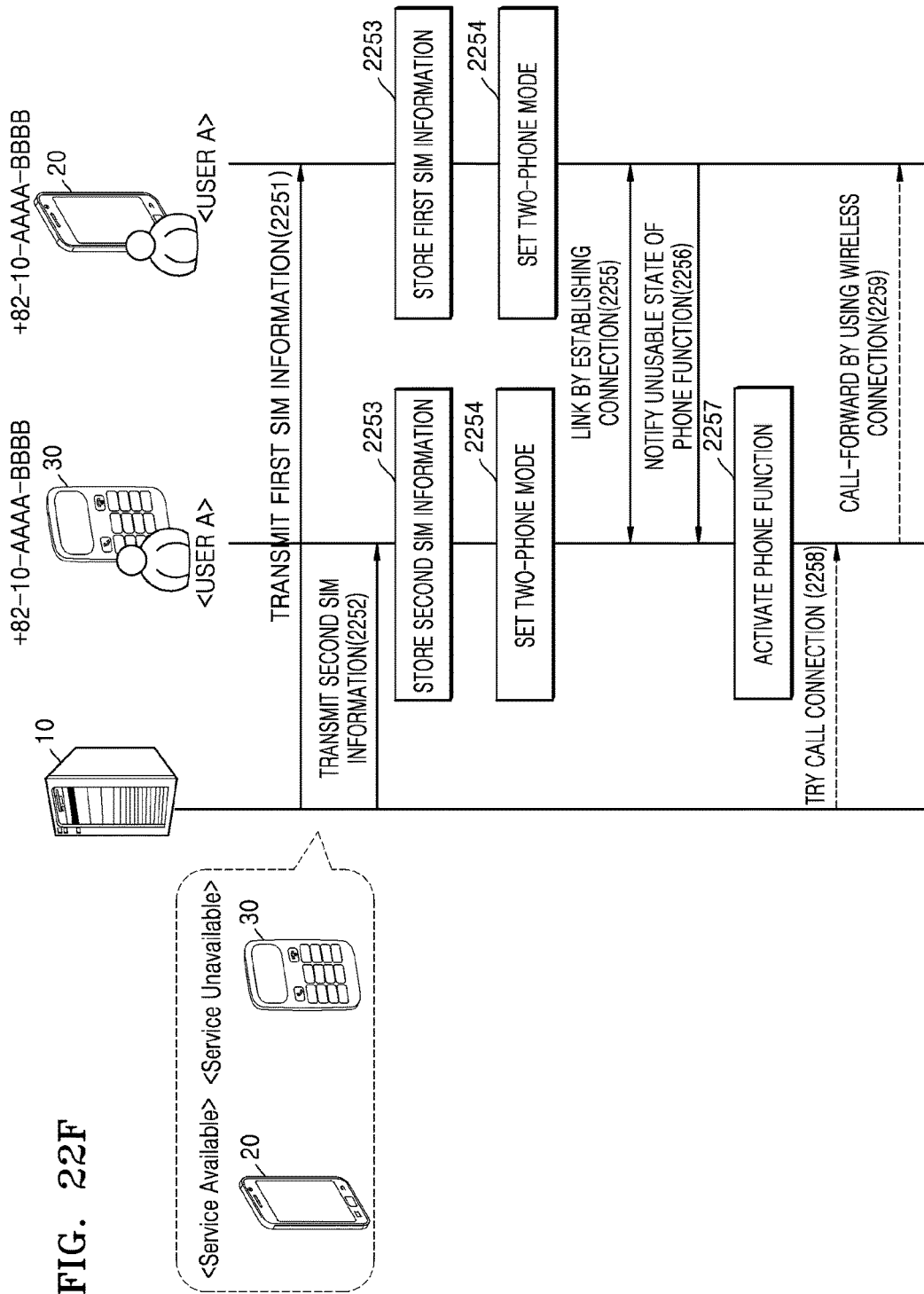
FIG. 22F is a timing diagram of a method of performing a mobile communication function by the first mobile device, when the device ID information of the first mobile device and the device ID information of the second mobile device are the same and only the phone function of the second mobile device is usable, according to an exemplary embodiment.

FIG. 22F is a timing diagram of a method of performing the mobile communication function by the first mobile device 20, when the first device ID information of the first mobile device 20 and the second device ID information of the second mobile device 30 are the same and only the phone function of the second mobile device 30 is usable, according to an exemplary embodiment.

In operation 2251, the server 10 of the mobile carrier transmits the first SIM information to the first mobile device 20.

In operation 2252, the server 10 of the mobile carrier transmits the second SIM information to the second mobile device 30.

In operation 2253, the first mobile device 20 stores the first SIM information in the SIM 520. Also, the second mobile device 30 stores the second SIM information in the SIM 350.

In operation 2254, the first mobile device 20 and the second mobile device 30 set the two-phone mode.

In operation 2255, the first and second mobile devices 20 and 30 are linked to each other by establishing a connection through short-range wireless communication.

In operation 2256, the first mobile device 20 notifies the second mobile device 30 that the phone function of the first mobile device 20 is in an unusable state. The unusable state of the phone function may denote a state in which the mobile communication module included in the first mobile device 20 is malfunctioning or shutoff.

In operation 2257, the second mobile device 30 activates the phone function of the first mobile device 20.

In operation 2258, when the phone number "+82-10-AAAA-BBBB" is requested to be called from another mobile device, such as the mobile device 40 of the user B of FIG. 1, the server 10 of the mobile carrier tries a call connection to the second mobile device 30.

In operation 2259, the second mobile device 30 call-forwards the phone call received from the server 10 of the mobile carrier to the first mobile device 20 via an out-of-band wireless connection method using short-range wireless communication.

Figure 23:
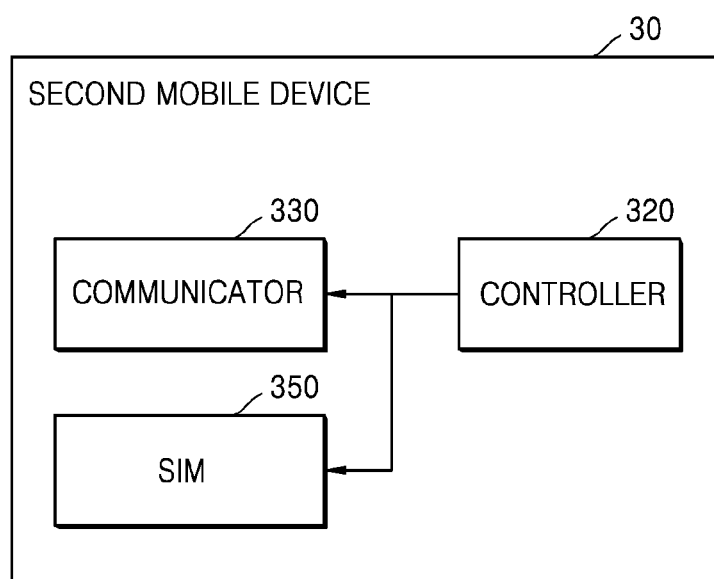
FIG. 23 is a block diagram of the second mobile device configured to share a first phone number of the first mobile device on the mobile communication system, according to an exemplary embodiment.

FIG. 23 is a block diagram of the second mobile device 30 configured to share a first phone number of the first mobile device 20 on a mobile communication system, according to an exemplary embodiment.

Referring to FIG. 23, the second mobile device 30 may include the controller 320, the communicator 330, and the SIM 350. The second mobile device 30 may include additional hardware components, or may not include all of the hardware components shown in FIG. 23. The second mobile device 30 of FIG. 23 may be a card-type phone described above, but is not limited thereto. The second mobile device 30 of FIG. 23 may perform, for example, operations of the second mobile device 30 described above with reference to FIGS. 1 through 22F.

The controller 320 activates the phone function of the second mobile device 30 after determining that the phone function of the first mobile device 20 is deactivated.

The SIM 350 receives, from the server 10, and stores the second SIM information including subscription information of the first phone number registered with the mobile communication system.

When the phone function of the second mobile device 30 is activated, the communicator 330 transmits a request to use the second SIM information to the server 10 of the mobile carrier such that the mobile communication function is performed.

Figure 24:
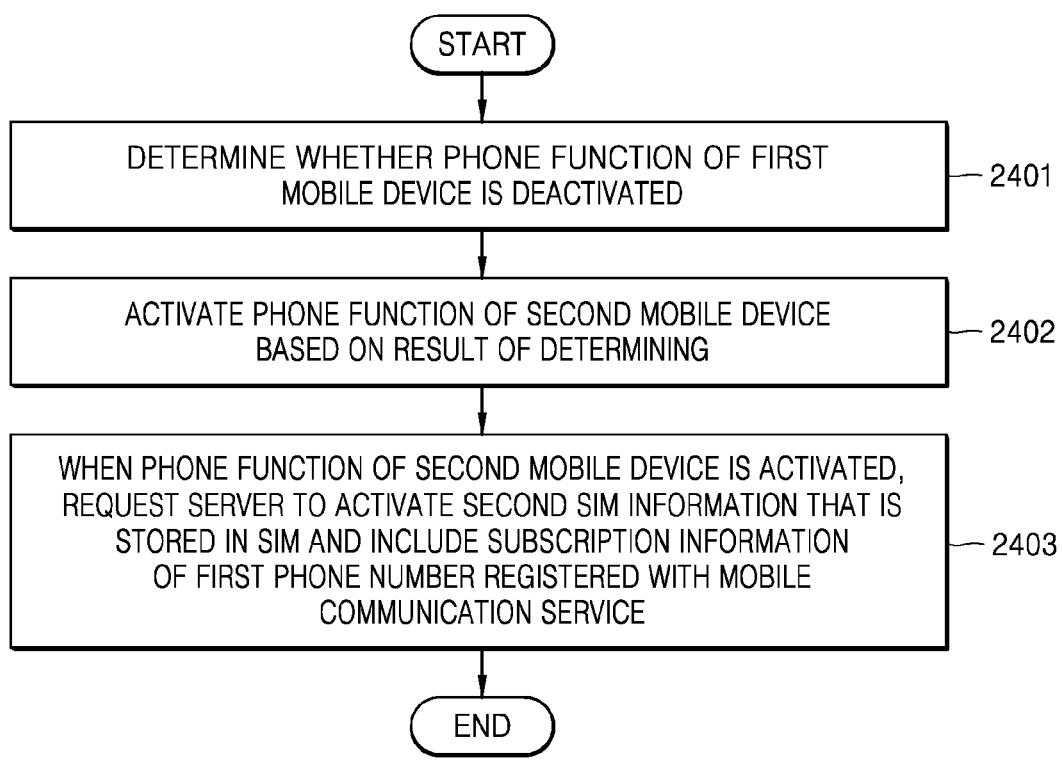
FIG. 24 is a flowchart of a method of providing a mobile communication service using the second mobile device sharing the first phone number of the first mobile device, according to an exemplary embodiment.

FIG. 24 is a flowchart of a method of providing a mobile communication service using the second mobile device 30 sharing the first phone number of the first mobile device 20, according to an exemplary embodiment. Referring to FIG. 24, the method includes operations processed in time-series by the second mobile device 30 described above. Thus, details about the second mobile device 30 may be applied to the method of FIG. 24.

In operation 2401, the controller 320 determines whether the phone function of the first mobile device 20 is deactivated.

In operation 2402, the controller 320 activates the phone function of the second mobile device 30 based on a result of the determining of operation 2401.

In operation 2403, when the phone function of the second mobile device 30 is activated, the communicator 330 requests the server 10 of the mobile carrier to activate the second SIM information that is stored in the SIM 350 and includes the subscription information of the first phone number registered with the mobile communication service.

In operation 2404, when the second SIM information is activated by the server 10 of the mobile carrier, the communicator 330 performs the mobile communication function using the activated second SIM information.

Figure 25:
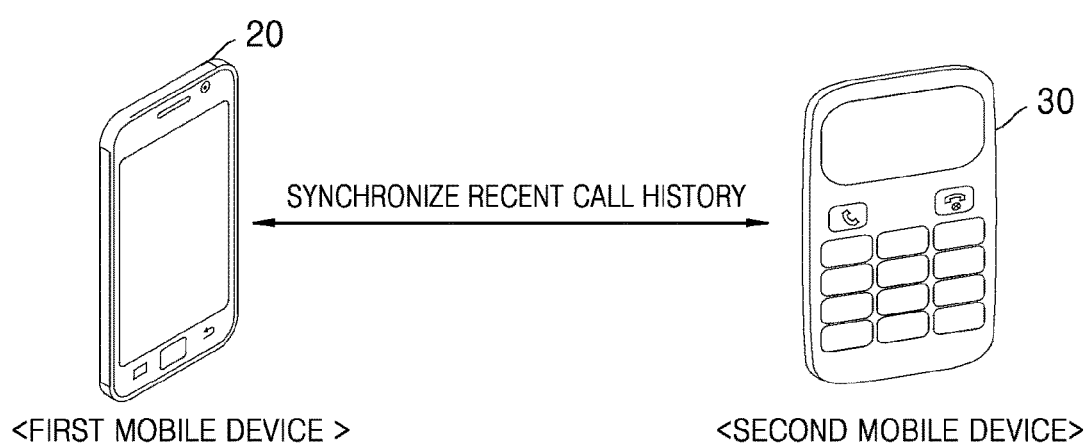
FIG. 25 is a diagram for describing synchronizing recent call histories between the first mobile device and the second mobile device, according to an exemplary embodiment.

FIG. 25 is a diagram for describing synchronizing recent call histories between the first mobile device 20 and the second mobile device 30, according to an exemplary embodiment.

As described above, the first and second mobile devices 20 are independent devices capable of making and receiving phone calls. Accordingly, a history of phone calls made and received by the first mobile device 20 may be stored only in the first mobile device 20, and a history of phone calls made and received by the second mobile device 30 may be stored only in the second mobile device 30. However, since the first and second mobile devices 20 and 30 share one phone number, recent call histories of the first and second mobile devices 20 and 30 may be synchronized for user convenience.

A point of time when the recent call histories are synchronized may be when the first and second mobile devices 20 and 30 are separated from or linked with each other, but one or more exemplary embodiments are not limited thereto, and the recent call histories may be synchronized at any time desired by a user.

Figure 26:
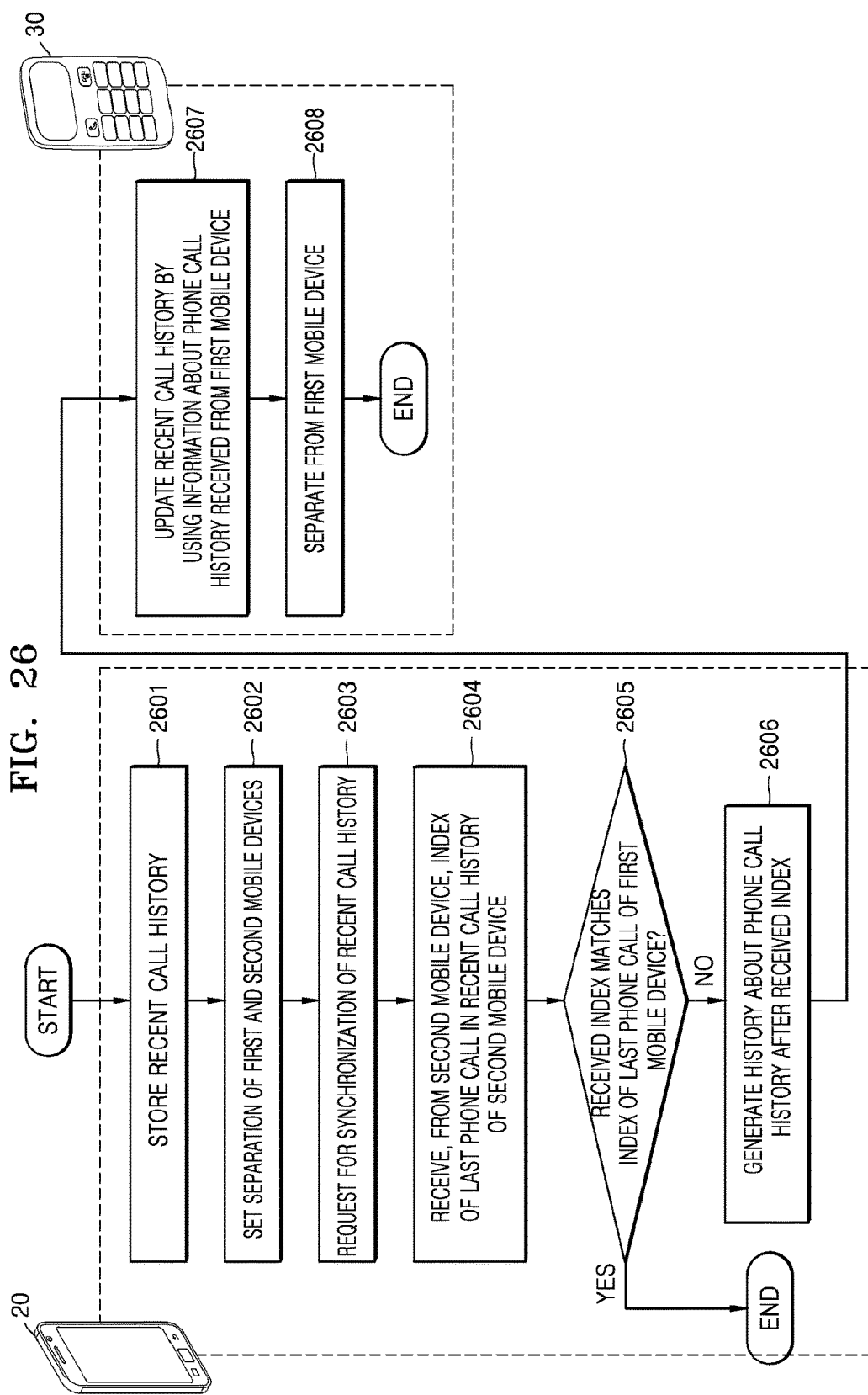
FIG. 26 is a flowchart of a method of synchronizing recent call histories when the first mobile device and the second mobile device are separated from each other, according to an exemplary embodiment.

FIG. 26 is a flowchart of a method of synchronizing recent call histories when the first mobile device 20 and the second mobile device 30 are separated from each other, according to an exemplary embodiment.

Referring to FIG. 26, separating of the first and second mobile devices 20 and 30 may mean that a user wants to use the second mobile device 30, for example, a card-type phone, instead of the first mobile device 20, for example, a smart phone.

In operation 2601, the first mobile device 20 stores a recent call history about recent phone calls up to the last phone call while being linked to the second mobile device 30.

In operation 2602, when a user inputs a request to separate the first and second mobile devices 20 and 30, the first mobile device 20 sets separation of the first and second mobile devices 20 and 30.

In operation 2603, the first mobile device 20 requests the second mobile device 30 for synchronization of a recent call history.

In operation 2604, the first mobile device 20 receives, from the second mobile device 30, an index of the last phone call in a recent call history stored in the second mobile device 30. Here, an index (or a sync index) may be ID information assigned to classify phone call records in a recent call history to manage the recent call history. Further, the first mobile device 20 may store the recent call history using an index (or a sync index).

In operation 2605, the first mobile device 20 determines whether the index received from the second mobile device 30 matches an index of the last phone call of the first mobile device 20. In other words, the first mobile device 20 determines whether the recent call history of the first mobile device 20 is different from that of the second mobile device 30 based on the received index to determine whether the recent call history needs to be synchronized. When the indexes match each other, the method is ended since the recent call history does not need to be synchronized. When the indexes do not match each other, operation 2606 is performed.

In operation 2606, the first mobile device 20 generates information about a phone call history after the index received from the second mobile device 30. Such information is about a recent call history that only exists in the first mobile device 20 and does not exist in the second mobile device.

In operation 2607, the second mobile device 30 updates the recent call history of the second mobile device 30 using the information about the phone call history received from the first mobile device 20. As such, the recent call history may be synchronized between the first and second mobile devices.

In operation 2608, the second mobile device 30 is separated from the first mobile device 20. In other words, the user may make or receive a call through the second mobile device 30 instead of the first mobile device 20.

According to another exemplary embodiment, the first mobile device 20 may receive, from the second mobile device 30, the recent call history of the second mobile device 30 after operation 2603, and update the received recent call history to the recent call history of the first mobile device 20. In this case, operations 2604 through 2606 may not be performed.

FIG. 27 is a table illustrating a database of recent call histories stored in a device, according to an exemplary embodiment.

Referring to FIG. 27, a recent call history of the first or second mobile device 20 or 30 may include times of incoming and outgoing calls and phone numbers of incoming and outgoing calls, and may be converted to a database in a form of a table 2700 in which a sync index is assigned to each phone call record. A sync index is ID information assigned to classify the phone call records, and the first and second mobile devices 20 and 30 may determine whether recent call histories need to be synchronized by comparing sync indexes stored therein. The form of the database regarding the recent call history is not limited to the table 2700 of FIG. 27, and may be in a different form of a table or text.

Figure 28:
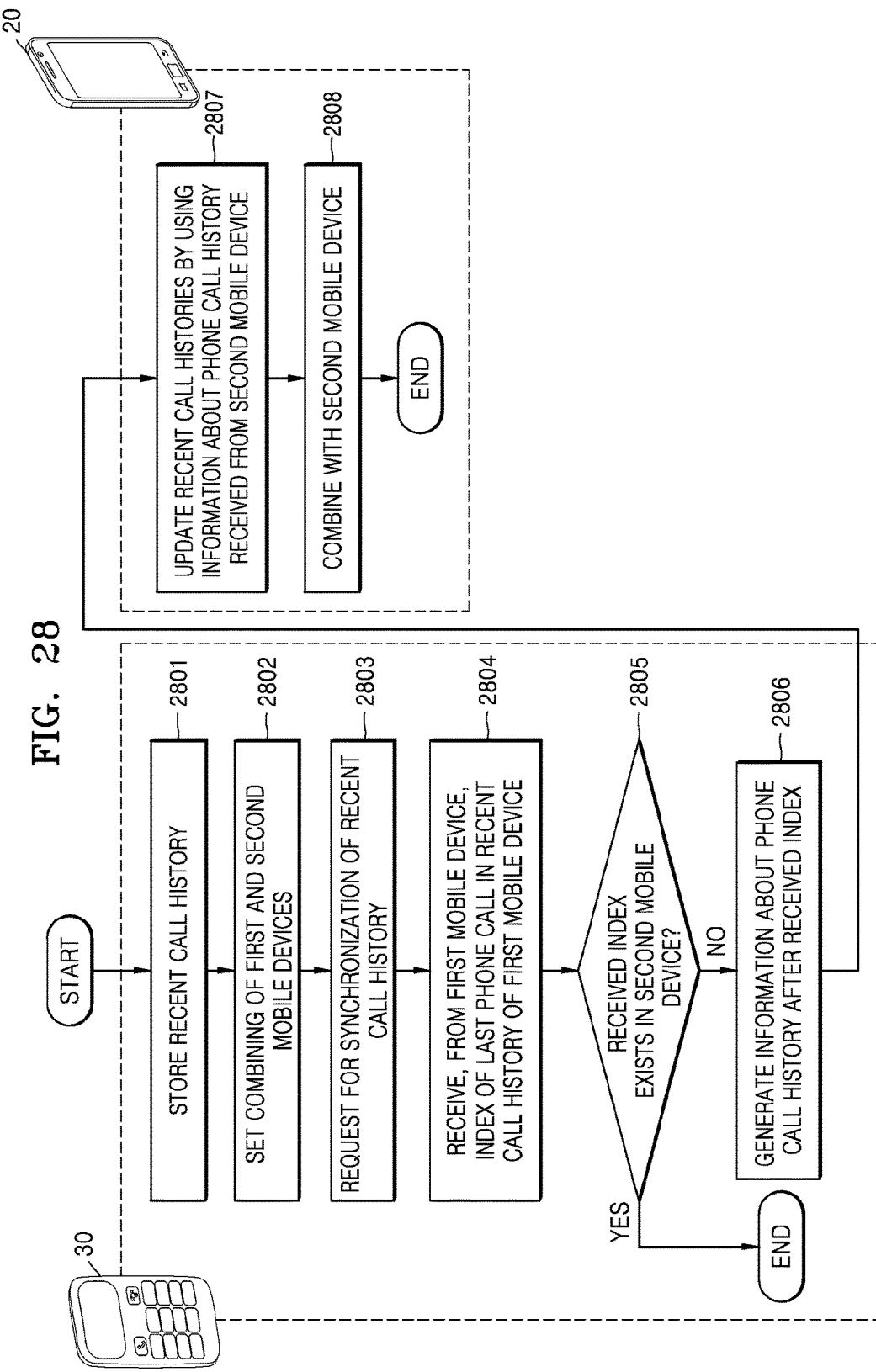
FIG. 28 is a flowchart of a method of synchronizing recent call histories when the first mobile device and the second mobile device are linked with each other, according to an exemplary embodiment.

FIG. 28 is a flowchart of a method of synchronizing recent call histories when the first mobile device 20 and the second mobile device 30 are linked with each other, according to an exemplary embodiment.

Referring to FIG. 28, the first and second mobile devices 20 and 30 may be linked when a user wants to use the first mobile device 20 (for example, a smart phone).

In operation 2801, the first mobile device 20 stores a recent call history about recent phone calls up to the last phone call while being separated from the second mobile device. 30.

In operation 2802, when the user inputs a request to link the first and second mobile devices 20 and 30, the second mobile device 30 sets connecting of the first and second mobile devices 20 and 30.

In operation 2803, the second mobile device 30 requests the first mobile device 20 for synchronization of a recent call history.

In operation 2804, the second mobile device 30 receives, from the first mobile device, an index of the last phone call in the recent call history stored in the first mobile device 20. Here, an index (or a sync index) may be ID information assigned to classify phone call records in the recent call history to manage the recent call history in the first mobile device 20. Meanwhile, not only the first mobile device 20, but also the second mobile device 30 may manage a recent call history of the second mobile device 30 using an index (or a sync index).

In operation 2805, the second mobile device 30 determines whether the index received from the first mobile device 20 is the same as an index of the last phone call of the second mobile device 30. In other words, the second mobile device 30 may determine whether the recent call histories of the first and second mobile devices 20 and 30 are different from each other based on the received index, or whether the recent call histories of the first and second mobile devices 20 and 30 need to be synchronized. When the indexes are the same, the method is ended since the recent call histories do not need to be synchronized. When the indexes are not the same, operation 2806 is performed.

In operation 2806, the second mobile device 30 generates information about a phone call history after the index received from the first mobile device 20. Such information includes information about a recent call history that exists only in the second mobile device 30 and does not exist in the first mobile device 20.

In operation 2807, the first mobile device 20 updates the recent call history of the first mobile device 20 using the information about the phone call history received from the second mobile device 30. Accordingly, the recent call histories of the first and second mobile devices 20 and 30 may be synchronized.

In operation 2808, the first mobile device 20 is linked with the second mobile device 30. In other words, the user may make or receive a call through the first mobile device 20 instead of the second mobile device 30.

According to another exemplary embodiment, the second mobile device 30 may receive, from the first mobile device 20, the recent call history of the first mobile device 20 after operation 2803, and update the received recent call history to the recent call history of the second mobile device 30. In this case, operations 2804 through 2806 may not be performed.

Figure 29:
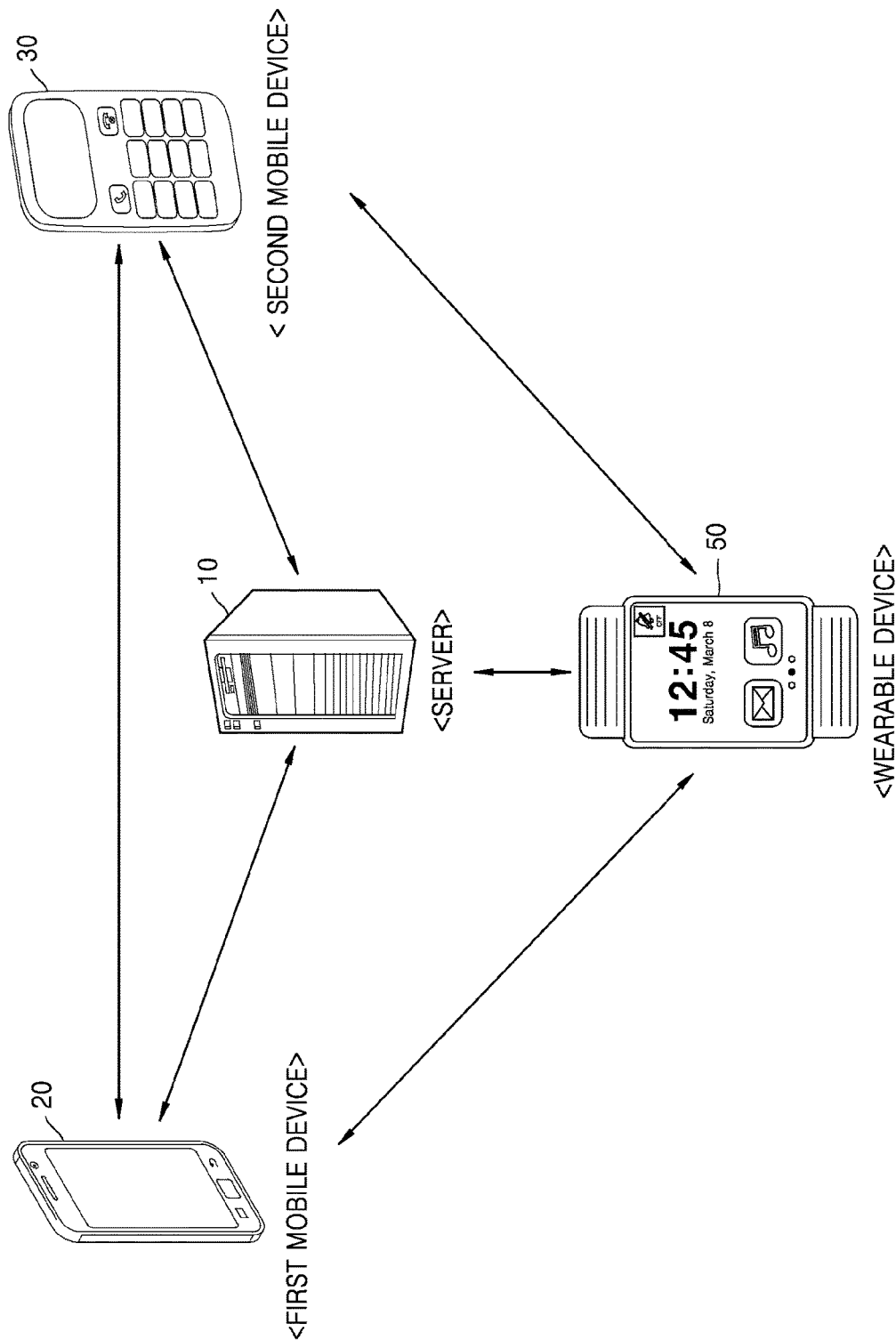
FIG. 29 is a diagram for describing a mobile communication system including a wearable device, according to an exemplary embodiment.

FIG. 29 is a diagram for describing a mobile communication system including a wearable device, according to an exemplary embodiment.

Referring to FIG. 29, the first and second mobile devices 20 and 30 are devices that share one phone number as described above with reference to FIG. 1. A wearable device 50 may be device of a standalone type or a companion type.

When the wearable device 50 is a standalone type, a phone number different from that of the first mobile device 20 (or the second mobile device 30) is assigned to the wearable device 50. However, the server 10 of the mobile carrier may map the phone number of the wearable device 50 to the phone number of the first mobile device 20 (or the second mobile device 30). Accordingly, in terms of the mobile communication system, the first mobile device 20 (or the second mobile device 30) and the wearable device 50 are managed as having different phone numbers, but in terms of a user of the first mobile device 20 (or the second mobile device 30) and the wearable device 50 or a third person, the first mobile device 20 (or the second mobile device 30) and the wearable device 50 may be viewed as sharing one phone number.

When the wearable device 50 is a companion type, a phone number is not assigned to the wearable device 50.

A method of linking a call using the wearable device 50 when the wearable device 50 is a standalone type will be described with reference to FIGS. 30, 31, 34, and 35. Also, a method of linking a call using the wearable device 50 when the wearable device 50 is a companion type will be described with reference to FIGS. 32, 33, 36, and 37.

Figure 30:
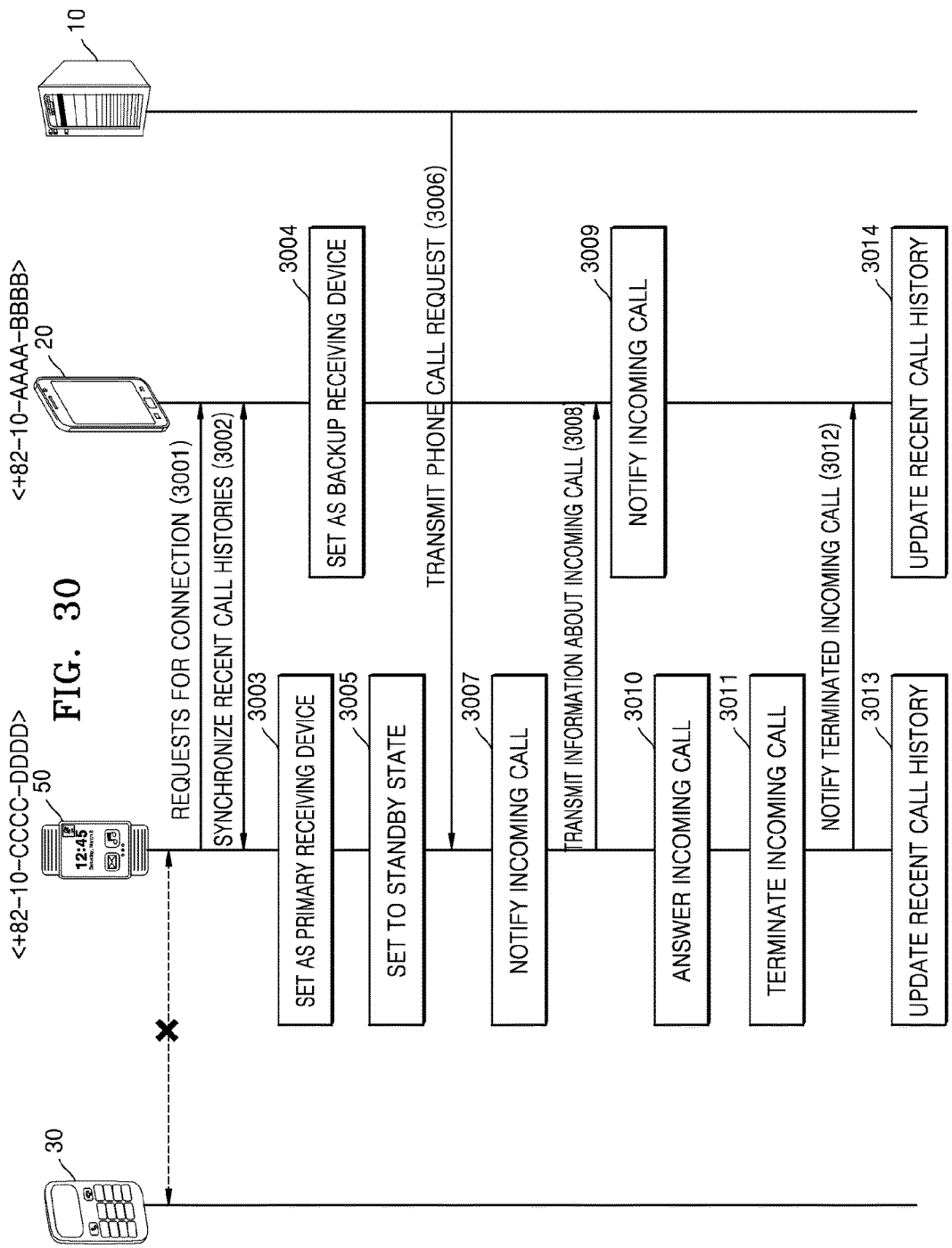
FIG. 30 is a timing diagram of a method of performing a phone call by a wearable device of a standalone type instead of the first mobile device, according to an exemplary embodiment.

FIG. 30 is a timing diagram of a method of performing a phone call by the wearable device 50 of a standalone type instead of the first mobile device 20, according to an exemplary embodiment.

Referring to FIG. 30, it is assumed that the wearable device 50 of the standalone type is connectable only to the first mobile device 20 and is not connectable to the second mobile device 30.

In operation 3001, the wearable device 50 requests the first mobile device 20 for a connection. Here, a method of connecting the wearable device 50 and the first mobile device 20 may include any one of various short-range wireless communication methods, such as Wi-Fi, Wi-Fi direct, Bluetooth, and NFC.

In operation 3002, the wearable device 50 and the first mobile device 20 synchronizes recent call histories. Here, the synchronizing of the recent call histories may be performed in the similar manner as that performed between the first and second mobile devices 20 and 30 described above with reference to FIG. 28.

In operation 3003, the wearable device 50 is set as a primary receiving device for receiving a call ahead of the first mobile device 20.

In operation 3004, the first mobile device 20 is set as a backup receiving device for receiving a call when the wearable device 50 is unable to receive a call.

In operation 3005, since the wearable device 50 is the primary receiving device, the wearable device 50 is in a standby state.

In operation 3006, when an external source (for example, a third person) requests a phone call, the server 10 of the mobile carrier transmits a phone call request to the wearable device 50 set as the primary receiving device. According to FIG. 30, a phone number of the first mobile device 20 is "+82-10-AAAA-BBBB" and a phone number of the wearable device 50 is "+82-10-CCCC-DDDD," and thus are different from each other. However, as described above with reference to FIG. 29, since the server 10 of the mobile carrier maps the phone numbers of the first mobile device 20 and the wearable device 50, and manages the devices so that a main phone number of the user of the first mobile device 20 and the wearable device 50 is "+82-10-AAAA-BBBB" that is the phone number of the first mobile device 20, and thus the external source (the third person) need not separately recognize "+82-10-CCCC-DDDD" as the phone number of the wearable device 50. In other words, the external source (the third person) makes a call to the first mobile device 20 or the wearable device 50 by using only the phone number "+82-10-AAAA-BBBB."

In operation 3007, the wearable device 50 notifies a user of an incoming call.

In operation 3008, the wearable device 50 transmits information about the incoming call to the first mobile device 20.

In operation 3009, the first mobile device 20 notifies the user of the incoming call.

In operation 3010, the wearable device 50 answers the incoming call according to the phone call request from the server 10 of the mobile carrier.

In operation 3011, the wearable device 50 hangs up when the incoming call is terminated.

In operation 3012, when the incoming call is terminated, the wearable device 50 notifies the first mobile device 20 of the terminated incoming call.

In operation 3013, the wearable device 50 updates a recent call history based on information about the terminated incoming call.

In operation 3014, the first mobile device 20 also updates a recent call history based on the information about the terminated incoming call.

Figure 31:
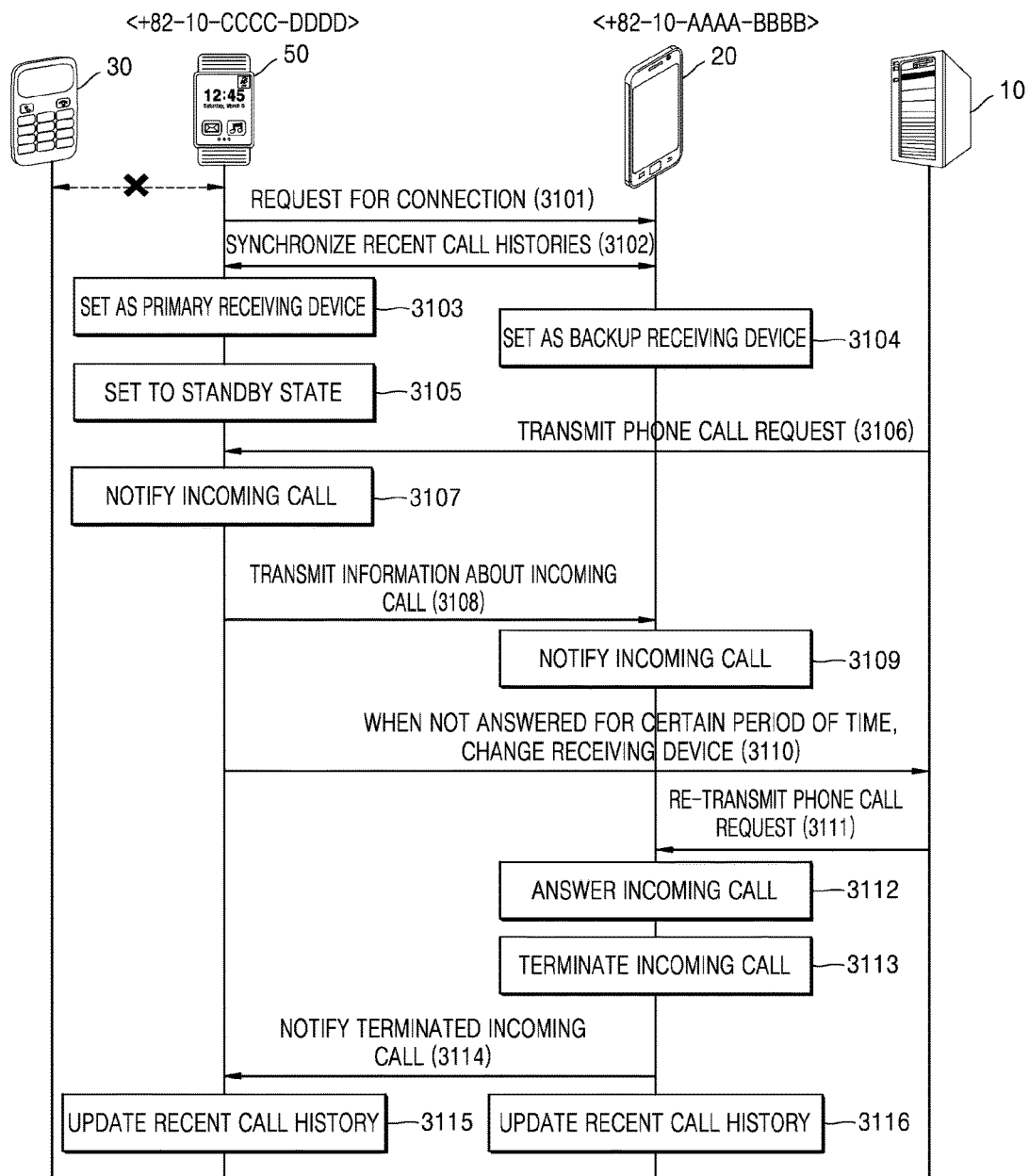
FIG. 31 is a timing diagram of a method of performing a phone call when the wearable device is unable to receive a call, according to an exemplary embodiment.

FIG. 31 is a timing diagram of a method of performing a phone call by the wearable device of the standalone type instead of the first mobile device, wherein the wearable device is unable to receive a call, according to an exemplary embodiment.

Referring to FIG. 31, it is assumed that the wearable device 50 of the standalone type is connectable only to the first mobile device 20 and is not connectable to the second mobile device 30.

In operation 3101, the wearable device 50 requests the first mobile device 20 for a connection.

In operation 3102, the wearable device 50 and the first mobile device 20 synchronizes recent call histories.

In operation 3103, the wearable device 50 is set as a primary receiving device for receiving a call ahead of the first mobile device 20.

In operation 3104, the first mobile device 20 is set as a backup receiving device for receiving a call when the wearable device 50 is unable to receive a call.

In operation 3105, since the wearable device 50 is the primary receiving device, the wearable device 50 is in a standby state.

In operation 3106, when an external source (for example, a third person) requests a phone call, the server 10 of the mobile carrier transmits a phone call request to the wearable device 50 set as the primary receiving device.

In operation 3107, the wearable device 50 notifies the user of the incoming call.

In operation 3108, the wearable device 50 transmits information about the incoming call to the first mobile device 20.

In operation 3109, the first mobile device 20 notifies the user of the incoming call.

In operation 3110, when the wearable device 50 does not answer the incoming call for a certain period of time, the server 10 of the mobile carrier changes a receiving device to the first mobile device 20.

In operation 3111, the server 10 re-transmits the phone call request to the first mobile device 20 that is set as the backup receiving device.

In operation 3112, the first mobile device 20 answers the incoming call according to the phone call request from the server 10 of the mobile carrier.

In operation 3113, the first mobile device 20 hangs up when the incoming call is terminated.

In operation 3114, when the incoming call is terminated, the first mobile device 20 notifies the wearable device 50 of the terminated incoming call.

In operation 3115, the wearable device 50 updates a recent call history based on information about the terminated incoming call.

In operation 3116, the first mobile device 20 also updates a recent call history based on the information about the terminated incoming call.

FIG. 32 is a timing diagram of a method of performing a phone call by the first mobile device 20 connected to the wearable device 50 of a companion type, according to an exemplary embodiment.

Referring to FIG. 32, it is assumed that the wearable device 50 of the companion type is connectable only to the first mobile device 20 and is not connectable to the second mobile device 30.

In operation 3201, the wearable device 50 and the first mobile device 20 are connected to each other via wireless communication.

In operation 3202, the first mobile device 20 is set to a standby state.

In operation 3203, when an external source (for example a third person) requests a phone call, the server 10 of the mobile carrier transmits a phone call request to the first mobile device 20. Since the wearable device 50 is the companion type unlike FIGS. 30 and 31, the server 10 of the mobile carrier may not transmit the phone call request directly to the wearable device 50.

In operation 3204, the first mobile device 20 notifies the user of the incoming call.

In operation 3205, the first mobile device 20 transmits information about the incoming call to the wearable device 50.

In operation 3206, the wearable device 50 notifies the user of the incoming call.

In operation 3207, the user of the first mobile device 20 answers the incoming call using the first mobile device 20.

In operation 3208, the first mobile device 20 notifies the wearable device 50 of the answered incoming call.

In operation 3209, the first mobile device 20 hangs up when the incoming call is terminated.

In operation 3210, when the incoming call is terminated, the first mobile device 20 notifies the wearable device 50 of the terminated incoming call.

In operation 3211, the wearable device 50 updates a recent call history based on information about the terminated incoming call.

In operation 3212, the first mobile device 20 also updates a recent call history based on the information about the terminated incoming call.

FIG. 33 is a timing diagram of a method of receiving a call made to the first mobile device 20 by the wearable device 50 of the companion type, according to an exemplary embodiment.

Referring to FIG. 33, it is assumed that the wearable device 50 of the companion type is connectable only to the first mobile device 20 and is not connectable to the second mobile device 30.

In operation 3301, the wearable device 50 and the first mobile device 20 are connected to each other via wireless communication.

In operation 3302, the first mobile device 20 is set to a standby state.

In operation 3303, when an external source (for example a third person) requests a phone call, the server 10 of the mobile carrier transmits a phone call request to the first mobile device 20. Since the wearable device 50 is the companion type unlike FIGS. 30 and 31, the server 10 of the mobile carrier may not transmit the phone call request directly to the wearable device 50.

In operation 3304, the first mobile device 20 notifies the user of the incoming call.

In operation 3305, the first mobile device 20 transmits information about the incoming call to the wearable device 50.

In operation 3306, the wearable device 50 the user of the incoming call.

In operation 3307, the user of the wearable device 50 answers the incoming call using the wearable device 50.

In operation 3308, the first mobile device 20 forwards the phone call request to the wearable device 50.

In operation 3309, the wearable device 50 hangs up when the incoming call is terminated.

In operation 3310, when the incoming call is terminated, the wearable device 50 notifies the first mobile device 20 of the terminated incoming call.

In operation 3311, the wearable device 50 updates a recent call history based on information about the terminated incoming call.

In operation 3312, the first mobile device 20 also updates a recent call history based on the information about the terminated incoming call.

FIG. 34 is a timing diagram of a method of performing a phone call by the wearable device 50 of the standalone type, instead of the second mobile device 30 that is a card-type phone, according to an exemplary embodiment.

Referring to FIG. 34, it is assumed that the wearable device 50 of the standalone type is connectable only to the second mobile device 30 and is not connectable to the first mobile device 20.

In operation 3401, the wearable device 50 requests the second mobile device 30 for a connection. A method of connecting the wearable device 50 and the second mobile device 30 may include any one of various short-range wireless communication methods, such as Wi-Fi, Wi-Fi direct, Bluetooth, and NFC.

In operation 3402, the wearable device 50 and the second mobile device 30 synchronizes recent call histories. The synchronizing of the recent call histories may be performed in the similar manner as that performed between the first and second mobile devices 20 and 30 described above with reference to FIG. 28.

In operation 3403, the wearable device 50 is set as a primary receiving device for receiving a call ahead of the second mobile device 30.

In operation 3404, the second mobile device 30 is set as a backup receiving device for receiving a call when the wearable device 50 is unable to receive a call.

In operation 3405, since the wearable device 50 is the primary receiving device, the wearable device 50 is in a standby state.

In operation 3406, when an external source (for example, a third person) requests a phone call, the server 10 of the mobile carrier transmits a phone call request to the wearable device 50 set as the primary receiving device. According to FIG. 34, a phone number of the second mobile device 30 is "+82-10-AAAA-BBBB" and a phone number of the wearable device 50 is "+82-10-CCCC-DDDD." However, as described above with reference to FIG. 29, since the server 10 of the mobile carrier maps the phone numbers of the second mobile device 30 and the wearable device 50, and manages a main phone number of the user of the second mobile device 30 and the wearable device 50 to be "+82-10-AAAA-BBBB," that is, the phone number of the first mobile device 20, the external source (the third person) may not be aware that "+82-10-CCCC-DDDD" is the phone number of the wearable device 50. In other words, the external source (the third person) makes a call to the second mobile device 30 or the wearable device 50 using only the phone number "+82-10-AAAA-BBBB."

In operation 3407, the wearable device 50 notifies the user of the incoming call.

In operation 3408, the wearable device 50 transmits information about the incoming call to the second mobile device 30.

In operation 3409, the second mobile device 30 notifies the user of the incoming call.

In operation 3410, the wearable device 50 answers the incoming call according to the phone call request from the server 10 of the mobile carrier.

In operation 3411, the wearable device 50 hangs up when the incoming call is terminated.

In operation 3412, when the incoming call is terminated, the wearable device 50 notifies the second mobile device 30 of the terminated incoming call.

In operation 3413, the wearable device 50 updates a recent call history based on information about the terminated incoming call.

In operation 3414, the second mobile device 30 also updates a recent call history based on the information about the terminated incoming call.

FIG. 35 is a timing diagram of a method of performing a phone call by the wearable device 50 of the standalone type instead of the second mobile device 30, wherein the wearable device 50 is unable to receive a call, according to an exemplary embodiment.

Referring to FIG. 35, it is assumed that the wearable device 50 of the standalone type is connectable only to the second mobile device 30 and is not connectable to the first mobile device 20.

In operation 3501, the wearable device 50 requests the second mobile device 30 for a connection.

In operation 3502, the wearable device 50 and the second mobile device 30 synchronizes recent call histories.

In operation 3503, the wearable device 50 is set as a primary receiving device for receiving a call ahead of the second mobile device 30.

In operation 3504, the second mobile device 30 is set as a backup receiving device for receiving a call when the wearable device 50 is unable to receive a call.

In operation 3505, since the wearable device 50 is the primary receiving device, the wearable device 50 is in a standby state.

In operation 3506, when an external source (for example, a third person) requests a phone call, the server 10 of the mobile carrier transmits a phone call request to the wearable device 50 set as the primary receiving device.

In operation 3507, the wearable device 50 notifies the user of the incoming call.

In operation 3508, the wearable device 50 transmits information about the incoming call to the second mobile device 30.

In operation 3509, the second mobile device 30 notifies the user of the incoming call.

In operation 3510, when the wearable device 50 does not answer the incoming call for a certain period of time, the server 10 of the mobile carrier changes a receiving device to the second mobile device 30, which is the backup receiving device.

In operation 3511, the server 10 re-transmits the phone call request to the second mobile device 30 that is set as the backup receiving device.

In operation 3512, the second mobile device 30 answers the incoming call according to the phone call request from the server 10 of the mobile carrier.

In operation 3513, the second mobile device 30 hangs up when the incoming call is terminated.

In operation 3514, when the incoming call is terminated, the second mobile device 30 notifies the wearable device 50 of the terminated incoming call.

In operation 3515, the wearable device 50 updates a recent call history based on information about the terminated incoming call.

In operation 3516, the second mobile device 30 also updates a recent call history based on the information about the terminated incoming call.

FIG. 36 is a timing diagram of a method of performing a phone call by the second mobile device 30 connected to the wearable device 50 of the companion type, according to an exemplary embodiment.

Referring to FIG. 36, it is assumed that the wearable device 50 of the companion type is connectable only to the second mobile device 30 and is not connectable to the first mobile device 20.

In operation 3601, the wearable device 50 and the second mobile device 30 are connected to each other via wireless communication.

In operation 3602, the second mobile device 30 is set to a standby state.

In operation 3603, when an external source (for example a third person) requests a phone call, the server 10 of the mobile carrier transmits a phone call request to the second mobile device 30. Since the wearable device 50 is the companion type, the server 10 of the mobile carrier may not transmit the phone call request directly to the wearable device 50.

In operation 3604, the second mobile device 30 notifies the user of the incoming call.

In operation 3605, the second mobile device 320 transmits information about the incoming call to the wearable device 50.

In operation 3606, the wearable device 50 notifies the user of the incoming call.

In operation 3607, the user of the second mobile device 30 answers the incoming call using the second mobile device 30.

In operation 3608, the second mobile device 30 notifies the wearable device 50 of the answered incoming call.

In operation 3609, the second mobile device 30 hangs up when the incoming call is terminated.

In operation 3610, when the incoming call is terminated, the second mobile device 30 notifies the wearable device 50 of the terminated incoming call.

In operation 3611, the wearable device 50 updates a recent call history based on information about the terminated incoming call.

In operation 3612, the second mobile device 30 also updates a recent call history based on the information about the terminated incoming call.

FIG. 37 is a timing of a method of receiving a call made to the second mobile device 30 by the wearable device 50 of the companion type, according to an exemplary embodiment.

Referring to FIG. 37, it is assumed that the wearable device 50 of the companion type is connectable only to the second mobile device 30 and is not connectable to the first mobile device 20.

In operation 3701, the wearable device 50 and the second mobile device 30 are connected to each other via wireless communication.

In operation 3702, the second mobile device 30 is set to a standby state.

In operation 3703, when an external source (for example a third person) requests a phone call, the server 10 of the mobile carrier transmits a phone call request to the second mobile device 30. Since the wearable device 50 is the companion type, the server 10 of the mobile carrier may not transmit the phone call request directly to the wearable device 50.

In operation 3704, the second mobile device 30 notifies the user of the incoming call.

In operation 3705, the second mobile device 30 transmits information about the incoming call to the wearable device 50.

In operation 3706, the wearable device 50 notifies the user of the incoming call.

In operation 3707, the user of the wearable device 50 answers the incoming call using the wearable device 50.

In operation 3708, the second mobile device 30 forwards the phone call request to the wearable device 50.

In operation 3709, the wearable device 50 hangs up when the incoming call is terminated.

In operation 3710, when the incoming call is terminated, the wearable device 50 notifies the second mobile device 30 of the terminated incoming call.

In operation 3711, the wearable device 50 updates a recent call history based on information about the terminated incoming call.

In operation 3712, the second mobile device 30 also updates a recent call history based on the information about the terminated incoming call.

As described above, according to one or more exemplary embodiments, since a user may use several mobile devices on a mobile communication system using one phone number without having to manage the several mobile devices having different phone numbers, a user owning several mobile devices may receive a mobile communication service via one of the several mobile devices based on his/her situation. Also, the inconvenience of managing different phone numbers of the several mobile devices may be reduced, and other users need not memorize different phone numbers.

One or more exemplary embodiments may also be realized in a form of a computer-readable recording medium, such as a program module executed by a computer. A computer-readable recording medium may be a non-transitory computer-readable recording medium. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium.

Also, herein, a "unit" may be a hardware component, such as a processor or a circuit, and/or a software component executed by a hardware component, such as a processor.

While certain exemplary embodiments have been shown and described, it will be understood by those of ordinary skill in the art that various changes in form and details may be made therein without departing from the spirit and scope of the present invention as defined by the following claims and their equivalents. Hence, it will be understood that the certain exemplary embodiments described above are not limiting. For example, each component described in a single type may be executed in a distributed manner, and components described distributed may also be executed in an integrated form.

The scope of the present invention is indicated by the claims and their equivalents rather than the detailed description, and it should be understood that the claims and all modifications or modified forms drawn from the concept of the claims and their equivalents are included in the scope of the present invention.

What is claimed is:

1. A second mobile device configured to share a phone number of a first mobile device on a mobile communication system, the second mobile device comprising:
   a communication interface configured to download a Subscriber Identification Module (SIM) information from a server when a call function of the second mobile device is activated;
   a subscriber identification module (SIM) configured to store the downloaded SIM information; and
   a controller configured to activate a two-phone mode of the second mobile device in response to receiving a user input, to establish a connection between the first mobile device and the second mobile device through short-range wireless communication while each of the first mobile device and the second mobile device is in the two-phone mode and to automatically activate the call function of the second mobile device when the call function of the first mobile device is being deactivated and the phone number of the first mobile device being assigned to the second mobile device, the two-phone mode indicating a mode for using two different mobile devices assigned with a same phone number,
   wherein the communication interface transmits a request for using the downloaded SIM information to the server, and the controller performs the call function of the second mobile device using a phone number of the second mobile device in response to receiving an approval from the server, the phone number of the second mobile device being the same as the phone number of the first mobile device,
   wherein the controller registers the second mobile device as a sub mobile device to the server based on comparison of functionalities between the second mobile device and the first mobile device, and wherein the controller synchronizes a recent call history of the second mobile device with the first mobile device by comparing sync indexes of the second mobile device and the first mobile device.

2. The second mobile device of claim 1, wherein the SIM information comprises subscription information of the second mobile device corresponding to the phone number on the mobile communication system on which the first mobile device and the second mobile device exist.

3. The second mobile device of claim 1, further comprising a storage having stored thereon device identification (ID) information having a different value from a device ID information of the first mobile device.

4. The second mobile device of claim 3, wherein
the device ID information of the first mobile device comprises at least one of a serial number and an international mobile equipment identity (IMEI) of the first mobile device, and
the device ID information of the second mobile device comprises at least one of a serial number and an IMEI of the second mobile device.

5. The second mobile device of claim 1, wherein
the communication interface is further configured to:
connect to the first mobile device using the short-range wireless communication, and
exchange information about an activation state of the call function of the first mobile device and an activation state of the call function of the second mobile device with the first mobile device, and
the controller is further configured to activate the call function of the second mobile device based on the exchanged information.

6. The second mobile device of claim 5, further comprising a user interface (UI) configured to provide a popup UI for setting an activation state of the call function of the second mobile device,
wherein the controller is further configured to, in response to a user input to set the activation state of the call function of the second mobile device to active being input through the popup UI, activate the call function of the second mobile device.

7. A method of providing, by a second mobile device sharing a phone number of a first mobile device, a mobile communication service, the method comprising:
activating, by the second mobile device, a two-phone mode of the second mobile device in response to receiving a user input and establishing a connection between the first mobile device and the second mobile device through short-range wireless communication while each of the first mobile device and the second mobile device is in the two-phone mode, the two-phone mode indicating a mode for using two different mobile devices assigned with a same phone number;
automatically activating, by the second mobile device, a call function of the second mobile device when the call function of the first mobile device is being deactivated and the phone number of the first mobile device being assigned to the second mobile device;
downloading, by the second mobile device, a Subscriber Identification Module (SIM) information from a server;
transmitting, by the second mobile device, a request to use the downloaded SIM information to the server; and
in response to receiving an approval from the server, performing, by the second mobile device, a call function of the second mobile device to which the phone number of the first mobile device is assigned using a phone number of the second mobile device when it is determined by the second mobile device that the call function of the first mobile device is deactivated, the phone number of the second mobile device being the same as the phone number of the first mobile device,
registering, by the second mobile device, the second mobile device as a sub mobile device to the server based on comparison of functionalities between the second mobile device and the first mobile device, and
synchronizing, by the second mobile device, a recent call history of the second mobile device with the first mobile device by comparing sync indexes of the second mobile device and the first mobile device.

\* \* \* \* \*